United States Patent
Judkins et al.

(10) Patent No.: US 7,321,298 B2
(45) Date of Patent: Jan. 22, 2008

(54) SKILLS BASED ROUTING METHOD AND SYSTEM FOR CALL CENTER

(75) Inventors: J. Andrew Judkins, Centerville, UT (US); Michael Shelton, Salt Lake City, UT (US); David Peterson, Riverton, UT (US)

(73) Assignee: Harris Corporation, Melbourne, FL (US)

( * ) Notice: Subject to any disclaimer, the term of this patent is extended or adjusted under 35 U.S.C. 154(b) by 198 days.

(21) Appl. No.: 11/247,646

(22) Filed: Oct. 10, 2005

(65) Prior Publication Data

US 2006/0109975 A1     May 25, 2006

Related U.S. Application Data

(62) Division of application No. 11/172,602, filed on Jun. 30, 2005.

(51) Int. Cl.
*G08B 29/00* (2006.01)

(52) U.S. Cl. .................. 340/506; 340/3.1; 379/219; 379/223

(58) Field of Classification Search .............. 340/506, 340/3.1; 379/219, 223
See application file for complete search history.

(56) References Cited

U.S. PATENT DOCUMENTS

| | | | |
|---|---|---|---|
| 5,465,286 A | 11/1995 | Clare et al. | |
| 5,546,455 A | 8/1996 | Joyce et al. | |
| 5,864,616 A | 1/1999 | Hartmeier | |
| 5,870,464 A | 2/1999 | Brewster et al. | |
| 6,011,843 A | 1/2000 | Hochman et al. | |
| 6,044,142 A | 3/2000 | Hammarstrom et al. | |
| 6,058,163 A | 5/2000 | Pattison et al. | |
| 6,118,865 A | 9/2000 | Gisby | |
| 6,163,607 A | 12/2000 | Bogart et al. | |
| 6,173,053 B1 | 1/2001 | Bogart et al. | |
| 6,324,282 B1 | 11/2001 | McIllwaine et al. | |
| 6,337,904 B1 | 1/2002 | Gisby | |
| 6,381,329 B1 * | 4/2002 | Uppaluru et al. | 379/266.04 |
| 6,404,857 B1 | 6/2002 | Blair et al. | |
| 6,404,883 B1 | 6/2002 | Hartmeier | |
| 6,405,033 B1 | 6/2002 | Kennedy, III et al. | |
| 6,424,709 B1 | 7/2002 | Doyle et al. | |
| 6,442,242 B1 | 8/2002 | McAllister et al. | |

(Continued)

OTHER PUBLICATIONS

U.S. Appl. No. 09/513,784, filed Feb. 25, 2000, Co-pending Application.

(Continued)

*Primary Examiner*—Daryl C Pope
(74) *Attorney, Agent, or Firm*—Duane Morris LLP

(57) ABSTRACT

A method and system of configuring the scripting of a call center includes an interactive voice response (IVR) server and automatic call distributor (ACD) server and associated graphical user interface contained on a computer screen of an ACD manager that is loaded on a call center computer. A script editor window is displayed as a result of user input as part of a graphical user interface for the call center. The script editor window includes a script display area. Script icons are representative of ACD and IVR scripting actions and are dragged from an action toolbar into the script display area. The script icons are linked based on user input in the order which represents the IVR and ACD scripting within the call center.

60 Claims, 48 Drawing Sheets

U.S. PATENT DOCUMENTS

| | | |
|---|---|---|
| 6,445,784 B2 * | 9/2002 | Uppaluru et al. ...... 379/220.01 |
| 6,449,270 B1 | 9/2002 | Miloslavsky |
| 6,459,697 B1 | 10/2002 | Neyman |
| 6,473,505 B1 | 10/2002 | Khuc et al. |
| 6,480,599 B1 | 11/2002 | Ainslie et al. |
| 6,480,710 B1 | 11/2002 | Laybourn et al. |
| 6,487,291 B1 | 11/2002 | Walker et al. |
| 6,493,446 B1 | 12/2002 | Cherry |
| 6,493,447 B1 | 12/2002 | Goss et al. |
| 6,493,695 B1 | 12/2002 | Pickering et al. |
| 6,587,556 B1 | 7/2003 | Judkins et al. |
| 6,603,854 B1 | 8/2003 | Judkins et al. |
| 6,707,904 B1 | 3/2004 | Judkins et al. |
| 6,763,104 B1 | 7/2004 | Judkins et al. |
| 7,003,088 B1 * | 2/2006 | Cope et al. ............ 379/221.14 |
| 2005/0163304 A1 | 7/2005 | Judkins et al. |

OTHER PUBLICATIONS

U.S. Appl. No. 11/172,602, filed Jun. 30, 2005, Co-pending Application.

* cited by examiner

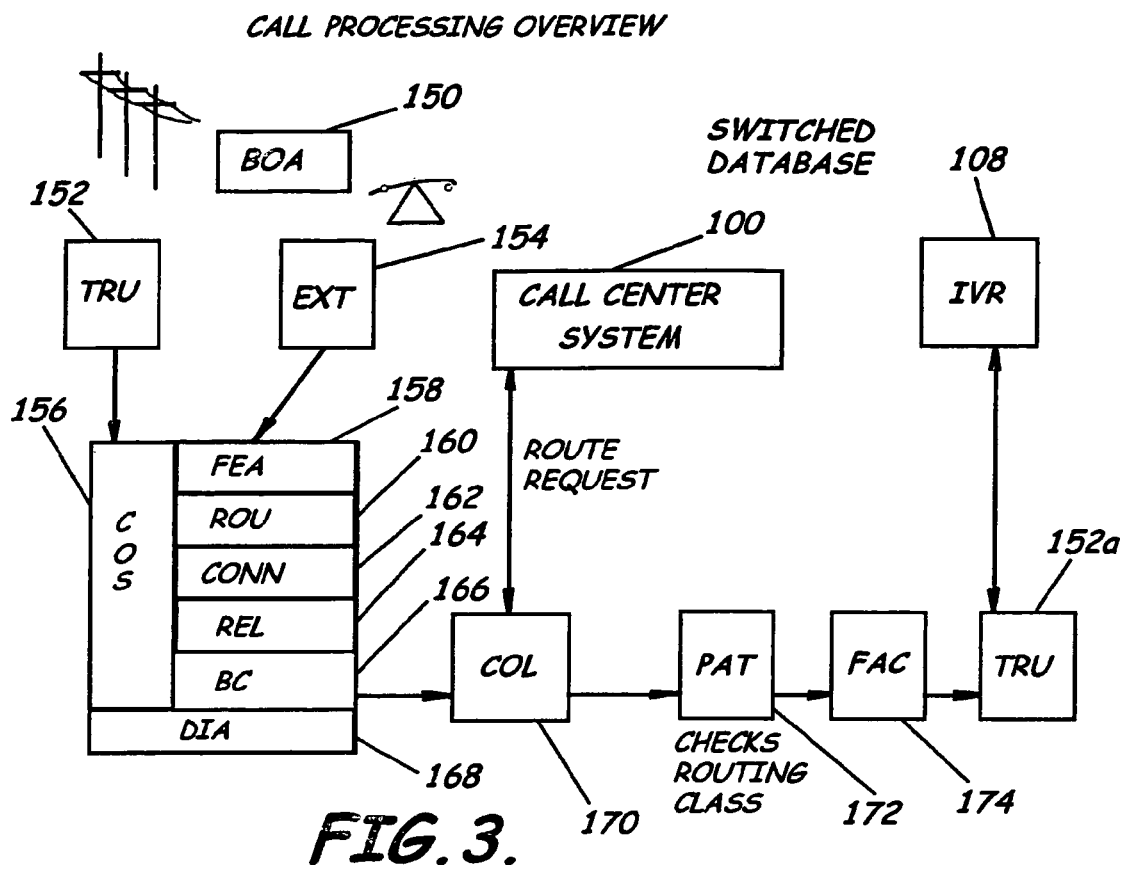
FIG. 3.
FIG. 4.
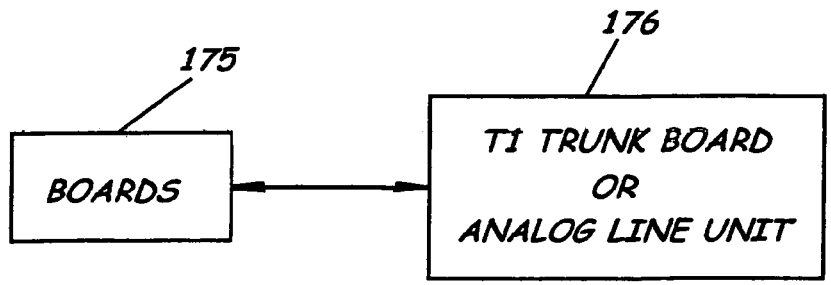

ROUTE REQUEST CONFIGURATION

```
A ...?System
HIL ...? Route
HILROUTE ...? ADD

Route Request Name .......... ROUTE-REQUEST-1

Profile Number ............... 39

Logical Device Name ......... LINKONE

Failure Destination .......... STA
```

*FIG. 5.*

SYSTEM DEVICE CONFIGURATION

```
A ...? System
SYSEDT ...? Device
SYSDEV ...? List

System Device ....................... L1

LINK type ........................... CALL-LINK

Link media Type ..................... LAN

HIL Link Failure Queue Timer ........ 5 seconds
```

*FIG. 6.*

SYSTEM LOGICAL DEVICE
CONFIGURATION

A ... ? System
SYSEDT ... ? Logical
SYSLOG ... ? List

Logical Device Name .......................... LINKONE

Logical Device Type .......................... CALL-LINK

System Device ................................ L1

HIL MESSAGE FORMAT (SERIAL)

*OpenLAN HIL Message Format*

| Field Name | Size | Description |
|---|---|---|
| Message Count | 16 bits | Number of HIL Messages in OpenLAN message. |
| Message Length | 16 bits | Length of the following HIL message. |
| Function Code | 2 bytes | Identifies HIL message. |
| Process Code | 1 byte | Identifies message subfunction. |
| Message Data | Variable | Info required by message. |
| Fill (message of odd size only) | 1 byte | Used only to change message of odd to even byte. |

*FIG. 9.*

HIL Signaled Circuits

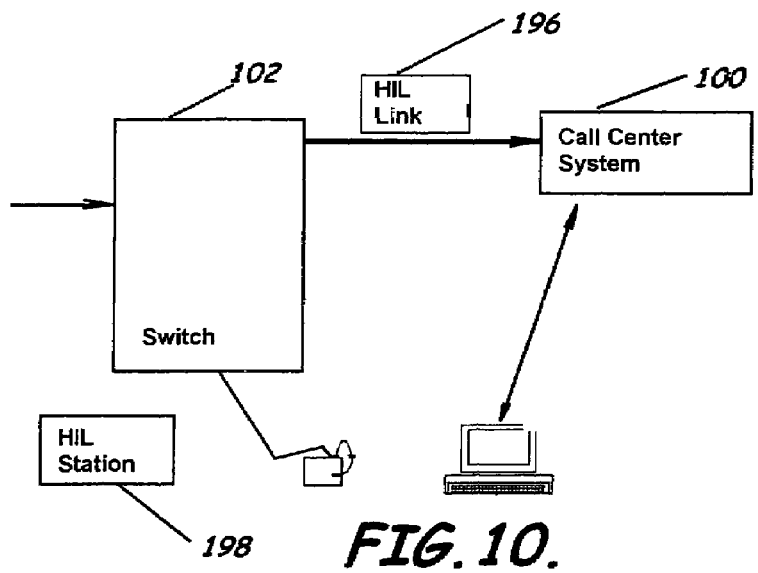

*FIG. 10.*

*HIL Stations*

| | |
|---|---|
| Extension Number | 2020 |
| Extension Type | HILSTA |
| Logical Device Name | LinkOne |
| Facility Number | 15 |
| Ringback Type | Silent |
| Circuit Location | 01-14-03 |
| Class of Service | 2 Dial |
| Signaling Type | DP* |

FIG. 11.

| | |
|---|---|
| Facility number | 15 |
| Trunk Group number | None |
| Outgoing COS number | 3 |
| Outpulse command | PRESENT 39 |
| | WPROGRESS 60 |

FIG. 12.

Manager Interface

Interface between call center Database Administrator and ClearView resource database and scripts.

- Database Tables:
  - Station Management
  - Agent Teams
  - Call Center Hours of Operation
  - Agent Skills
  - Call Disposition Tracking
  - Agent Extensions
  - DNIS Configuration

Call Center Hours of Operation o Setting Up Routing Schedules

○ Days and Times of Operation

○ Opening and Saving Route Schedules

Setting Up Standard Weekly Schedule

Open and Close Times

- Finishing Up

- Setting Holiday Hours
- Adding a Holiday

- Text Description
- Logical Expression

Identifying Parameters
Associated with Skills

○ Adding New Skills

Call Disposition Tracking

Creating a New DNIS

DNIS Name

405 — Maim 800

DNIS Skill

406 — Company ▼

*FIG. 35.*

Setting Up Routing
Features

Routing for dnis (0000)                                                        412    414

Step 1: Choose a routing profile that determines the open and close times for this DNIS.
Select Route ID  [1  ▼]
The following is the schedule in the selected route ID.

Closed September 20 through September 23
Monday through Friday 7:00 AM to 7:00 PM                                    416

Step 2: Select a routing script.
Routing Script Name. [Default In Queue ▼]  [EditScript]
                                                                              418

Step 3: Setup routing prioritization for the DNIS.
Initial Priority(0.0) [0.0]   Acceleration Function [Linear ▼]
Acceleration(1.0) [1.0]   Maximum Priority (100.0) [100.0]              424
                            [X Cancel]  [✓ Save]
                                                                            426
420         422

*FIG. 36.*

○ Adding New Agents

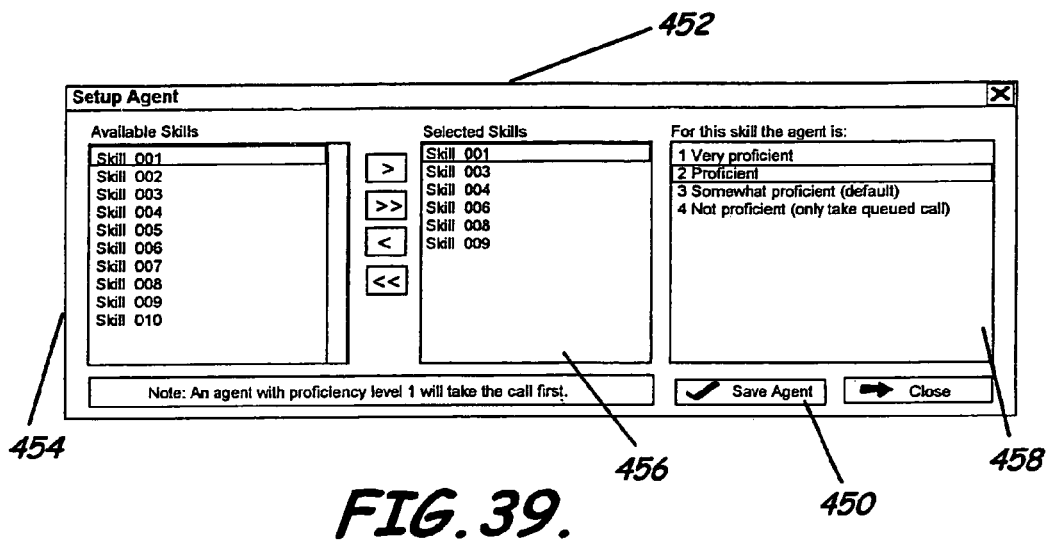
FIG. 39.
- Disabling an Agent
- Saving Agent Changes
FIG. 40.
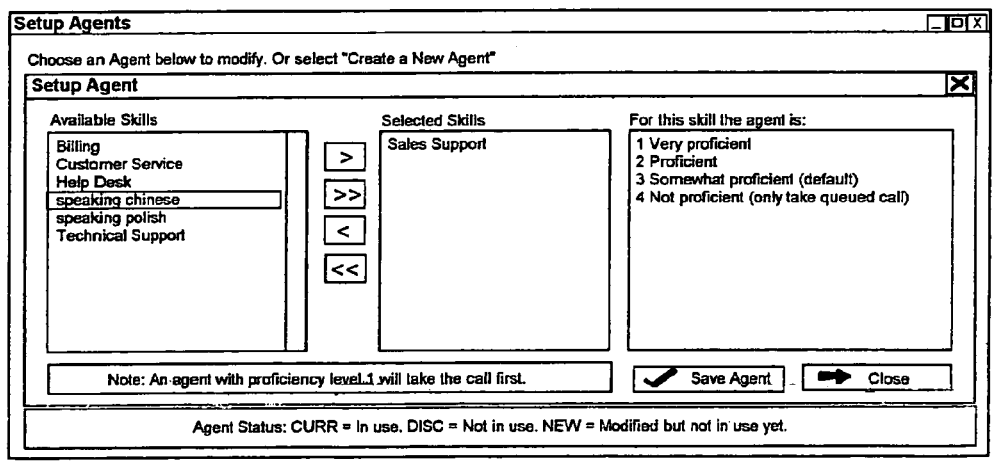

Main Screen

All functions accessed from menus or buttons on tool bar

File Menu

- New Real Time Dispaly
- New Historical Report
- New Printed Report
- Close Window
- Close All Windows
- Print Preview
- Exit ○ Cut
○ Copy
○ Paste
○ Refresh
○ Filter Properties
○ Graph Properties

512

514
516
518

View Menu

○ View Window Configuration
○ Save Window Configuration
○ Save Window Configuration As...
○ Delete Current Configuration
○ View Toolbars
○ Hide Main Menu
○ View Server Messages 520
522
524
526
528
532
534

- Cascade
- Tile
- Arrange Icons
- Minimize All
- Scroll Windows
- Set Scroll Windows Time...

*Real Time Reporting*

- Calls Answered
- Calls Abandoned
- Talk Time
- Agent Status
- Calls In Queue
- Agents in Queue

- Answer Chart
- Abandon Chart
- Talk Chart
- Agent Status Summary
- Agent Status Chart
- Calls Queued Trend
- Calls Queued by Skill Chart
- Agents Queued by Skill Chart
- Quick View of Calls and Agents

- Answer Chart

○ Talk Chart

○ Abandon Calls Chart

○ Agent Status Summary

| Agent Name | State | Time | Team |
|---|---|---|---|
| ☐ Eve | ACD | 0:11 | Cumulus 1 |
| ☐ Pat | ACD | 1:00 | Cumulus 1 |
| ☐ Dan | Outbound | 0:10 | Cumulus 1 |

| Call | Monitor | Record |

○ Agent Status Chart

○ Calls Queued Trend

○ Calls Queued by Skill Chart

- Agents Queued by Unit Chart

- Quick View of Calls and Agents

Historical Reporting

- Agent Productivity
- Agent Productivity by Hour
- Agent Time Sheet
- Call Statistics
- Bucket History
- Calls by Hour or Fifteen Minute
- Disposition Code (Call Log)
- Calls by Agent per Hour

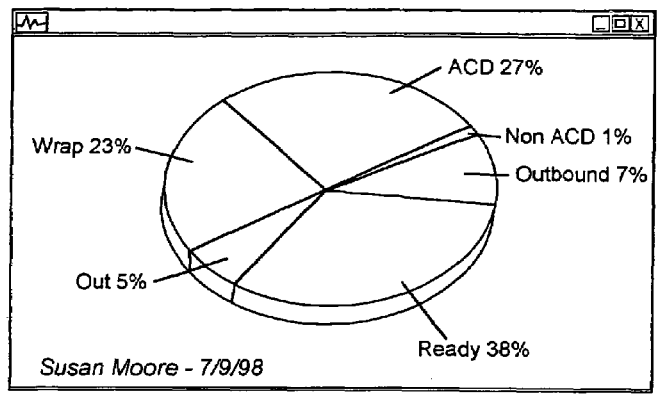
FIG.58.
- Agent Productivity by
FIG.59.
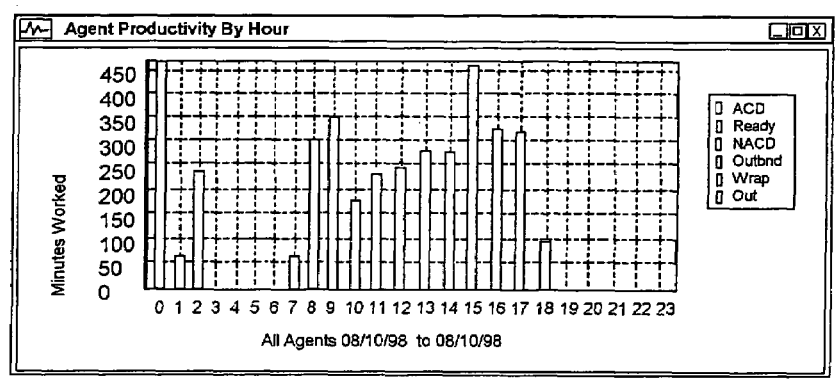

○ Bucket History

○ Calls by Hour or Fifteen Minutes

Stats Tab

- Total Calls (ACD, NACD, Outbound)
- Average Time for Each Type

Speed Tab

Time Tab

Pie chart of time spent in:
- ACD
- NACD
- Outbound
- Ready
- Wrap
- Out

SKILLS BASED ROUTING METHOD AND SYSTEM FOR CALL CENTER

CROSS REFERENCE TO RELATED APPLICATIONS

This application is a divisional application of Ser. No. 11/172,602, filed Jun. 30, 2005, which claimed priority as a reissue patent application to U.S. Pat. No. 6,587,556, filed on Feb. 25, 2000, and issued on Jul. 1, 2003.

FIELD OF THE INVENTION

This invention relates to the field of call centers, and more particularly, this invention relates to the field of call centers having automatic call distributors and interactive voice response units.

BACKGROUND OF THE INVENTION

Calls centers that use digital switching systems have become commonplace in businesses and institutions throughout the United States and the world. Often these call systems use separate and functionally different automatic call distributor {ACD) servers and interactive voice response (IVR) servers. The ACD allows routing of calls received via a switch to a plurality of different agents, depending on the predetermined standards defined by the call center system. Examples of these standards include routing based on DNIS or ANI. Some call center systems also have skills based routing on a limited scale.

In these prior art call centers, the IVR script is separately established under one control system, generally run on a processor that is operative and associated with the IVR server. On the other hand, ACD operation is scripted and controlled via a computer and processor that are associated with the ACD, but separate from any association with the IVR server. This is a complicated prior art system, and the lack of integration among any ACD and IVR servers and components makes for complicated call center administration. Additionally, the lack of functional integration among the ACD and IVR components, especially with scripting functions, makes call center set up time consuming, and makes real time reporting of call center operation and agent efficiency difficult. Also, this type of prior art call center system makes agent evaluation and call center evaluation less reliable.

In some prior art call center systems, the user sets up call routing first, and then pushes skills into the call routing. This type of routing and associated scripting is inefficient. Also, many call center systems use proprietary report generation software packages having different prepackaged report templates that cannot be customized with standard office products, such as commercially available SQL or other database products. "Snap shot" reports are thus not available or reliable enough to evaluate a call center performance in any complicated call center system using IVR and ACD servers. Thus, these call center systems are not dynamic, and do not effectively provide service to customers and callers. They also do not respond quickly to changing conditions in a manner to allow adequate real time report generation and the control and tracking of calls within the call center, whether in queue or being responded to by an agent. Any custom applications also are not readily exchangeable across different platforms and are not scalable for different solutions and thus, cannot meet diverse current and future call center demands.

SUMMARY OF THE INVENTION

It-is therefore an object of the present invention to provide a method and system of configuring IVR and ACD script flow efficiently in an integrated package.

A method of configuring the scripting of a call center is disclosed and includes an interactive voice response (IVR) server and automatic call distributor (ACD) server and comprises the step of displaying, as a result of user input, a script editor window on a call center computer as part of a graphical user interface for the call center. The script editor window includes a script display area. Script icons are representative of ACD and IVR scripting actions, and are dragged from an action toolbar into the script display area. The script icons are linked based on user input in the order which represents the IVR and ACD script flow within the call center.

In another aspect of the present invention, the script editor window includes a property display area that lists properties or scripting actions represented by icons. The method further comprises the step of highlighting a script icon that has been dragged into the script display area such that as a result of highlighting the script icon, the properties for the scripting action represented by the script icon are displayed within the script display area. A script flow can begin with a START script icon representing the start of script flow, and can terminate with a script icon that represents a terminating action for the script flow. The script editor window can further comprise a series of tabs that are selected for displaying a different set of icons within the action toolbar.

In still another aspect of the present invention, a method of configuring the scripting of a call center includes an interactive voice response (IVR) server and automatic call distributor (ACD) server, and comprises the step of displaying as a result of user input, a script editor window on a call center computer as part of a graphical user interface for the call center. The script editor window includes a script display area. Script icons that are representative of ACD and IVR scripting actions are dragged from an action toolbar into the script display area. The script icons are selected from a plurality of sets of script icons that are displayed within the command toolbar by selecting an action tab representative of a selected set of script icons. The script icons are positioned in the order corresponding to a script flow through the call center, such that if a previous action within the script flow is appropriate, a connection line is drawn between the previous script icon and newly added script icon, representing the respective actions of the script flow.

The method can also comprise the step of selecting a standard action tab for displaying script icons representative of one of at least (a) starting an IVR script, (b) capturing a dual tone multi-frequency (DTMF) digits, (c) playing sound files, (d) playing voice prompts, (e) evaluating an expression and branching a call flow direction based on the evaluation, (f) defining of branch nodes, {g) recording of speech, (h) terminating a script, and (i) dialing digits through a phone system. An advanced action tab can also be selected for displaying script icons representative of at least one of (a) transferring a call, (b) combining actions, (c) assigning the results of an expression to a variable, (d) executing a previously saved IVR script, (e) sending an external DLL hook routing, (f) sending data to an external program via a data pipe, (g) sending an e-mail message, and (h) sending a message to a pager.

A graphical user interface is contained on a computer screen of a call center computer and is used for configuring the scripting of a call center that includes the interactive voice response (IVR) server and an automatic call distributor (ACD) server. A script editor window has a script display window. An action toolbar contains script icons that represent respective ACD and IVR scripting actions. The script icons are dragged from the action toolbar into the script display window and linked together to represent IVR and ACD script flow within the call center.

BRIEF DESCRIPTION OF THE DRAWINGS

Other objects, features and advantages of the present invention will become apparent from the detailed description of the invention which follows, when considered in light of the accompanying drawings in which:

FIG. 3 is a block diagram of a switched database showing a call processing overview.

FIG. 4 is a block diagram illustrating the switch and call center system where boards are inserted within the shelves and slots of a switch for a T1 trunk or analog line unit.

FIG. 5 is a table showing an example of a route requesting configuration that can be used in the present invention.

FIG. 6 is a table showing an example of a system device configuration that can be used in the present invention.

FIG. 9 is an example of an open LAN HIL message format that can be used in the present invention.

FIG. 10 is a block diagram of the HIL signal circuits and the relation between the switch and call center system of the present invention.

FIG. 11 is a table illustrating an example of various parameters used for HIL stations of the present invention.

FIG. 12 is a table showing various facility numbers and trunk going numbers, outpost commands and outgoing COS numbers that could be used with the present invention.

FIG. 35 illustrates a window for entering a DNIS name and skill for a DNIS.

FIG. 36 illustrates a window for setting up routing properties of a DNIS.

FIG. 39 illustrates a window for assigning skills to an agent.

FIG. 40 illustrates a window as in FIG. 39, but on top of another screen.

FIGS. 58-65 are windows showing historical reports.

DETAILED DESCRIPTION OF THE PREFERRED EMBODIMENTS

Figure 1:
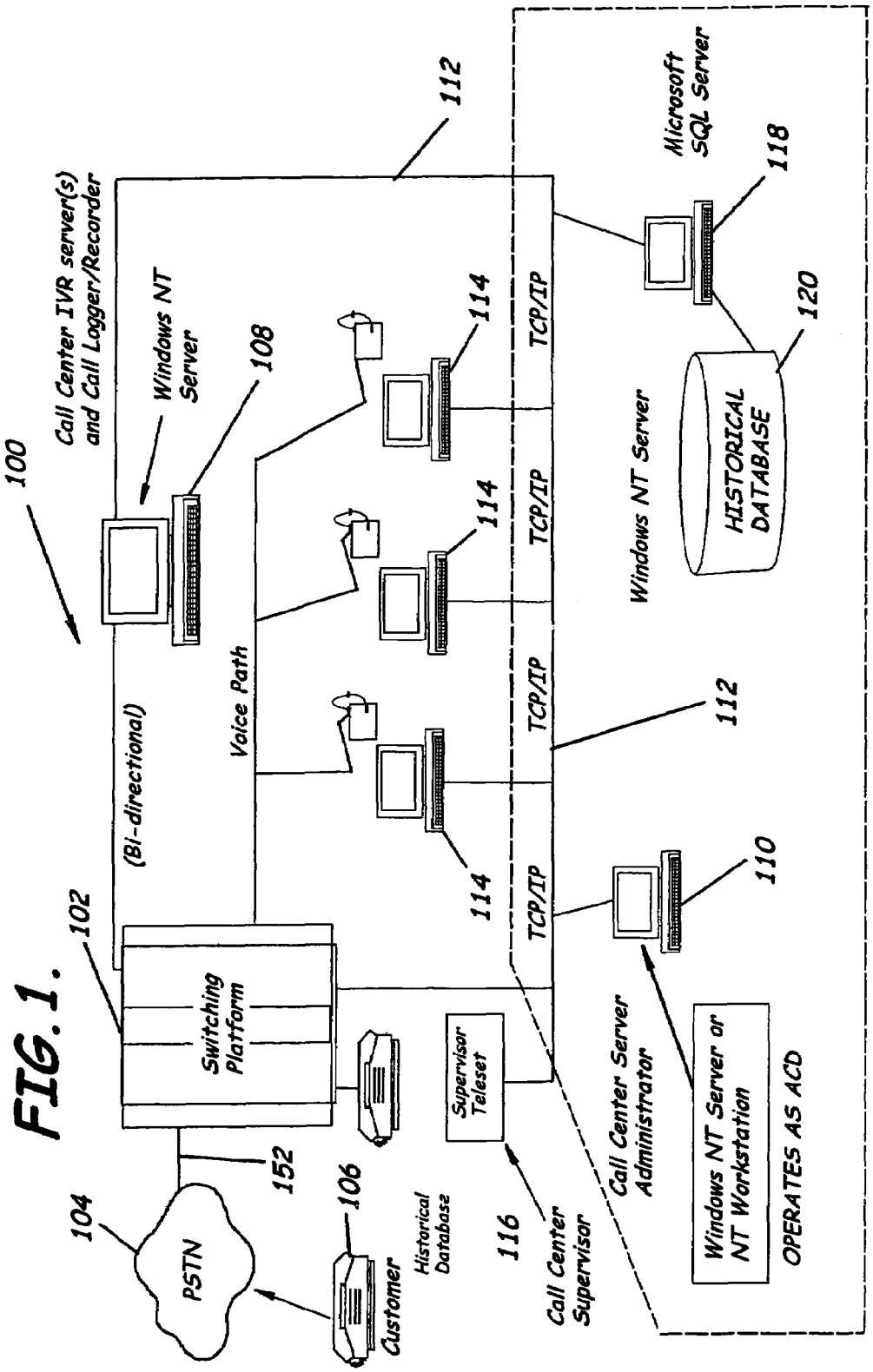
FIG. 1 is an overall block diagram of the call center system of the present invention, a switching platform, public switched telephone network and a customer calling into the call center system.

The system and method of the present invention is a PC-based and PBX integrated call center system, which maximizes the use of internal call center resources. FIG. 1 illustrates the basic components of the call center system of the present invention. As will be explained in greater detail below, the system combines an Automatic Call Distributor (ACD), a computer telephony interface (CTI), an Interactive Voice Response (IVR) system and support applications and features onto a single communications platform. The system uses skills-based routing and other intelligent queuing features to ensure that customers are reaching the best skilled and longest available resource within the call center environment. The system minimizes the number of interfaces required to incorporate and manage the call center system. It uses a client/server architecture that can leverage existing data communications networks and commercially available hardware and software components. The system combines software and a modular design incorporated within a highly scalable client/server architecture.

As shown in FIG. 1, the call center system 100 works in conjunction with a switching platform 102, which in one aspect of the present invention, could be a 20-20 switch as manufactured by Harris Corporation of Melbourne, Fla. The switching platform 102 is connected to a public switched telephone network 104 and customer 106. The call center system 100 includes an Interactive Voice Response (IVR) server 108, which also doubles as a call logger/recorder. An Automated Call Distributor (ACD) server 110 includes an ACD manager application and also acts as a call center server administrator. It is connected via TCP/IP links 112, in one aspect of the invention, to individual agent workstations 114, the IVR server 108, and a call center supervisor 116 with a teleset. The IVR server 108 has bidirectional communication with the switching platform 102 and ACD server 110. A Structured Query Language based (SQL) database server 118 is connected (with historical database 120) to ACD server 110 and IVR server 108 via TCP/IP link connection 112. Naturally, the server 118 could work as an ACD server because it also is a Windows NT server, as is server 110. The dashed line indicates the close association among the various servers and applications.

The construction editor where the user builds the IVR script by drag and drop and any ACD route editing have the same source codes as a compiled time directory. However, the engine that interprets the script, once a script is created, as when a call comes in, parses out the script.

The system of the present invention is an improvement over older, proprietary systems and open architecture client/server based systems. It can use worldwide, industry standard hardware and software components. It can be designed around a client/server architecture and reside on a Microsoft™ Windows platform. It includes skills based routing, routing to the longest available (idle) agent, and priority routing through a variety of configuration options available via the ACD manager software.

An integrated voice response software application operates with the IVR server 108. The IVR software application is used to set up and manage an interactive voice response system. The IVR software works with most telephone systems, and multiple scripts can be set up to work with multiple ports. The IVR option is embedded into the call center system 100 to provide continuity of all handling, database administration and reporting.

Figure 2:
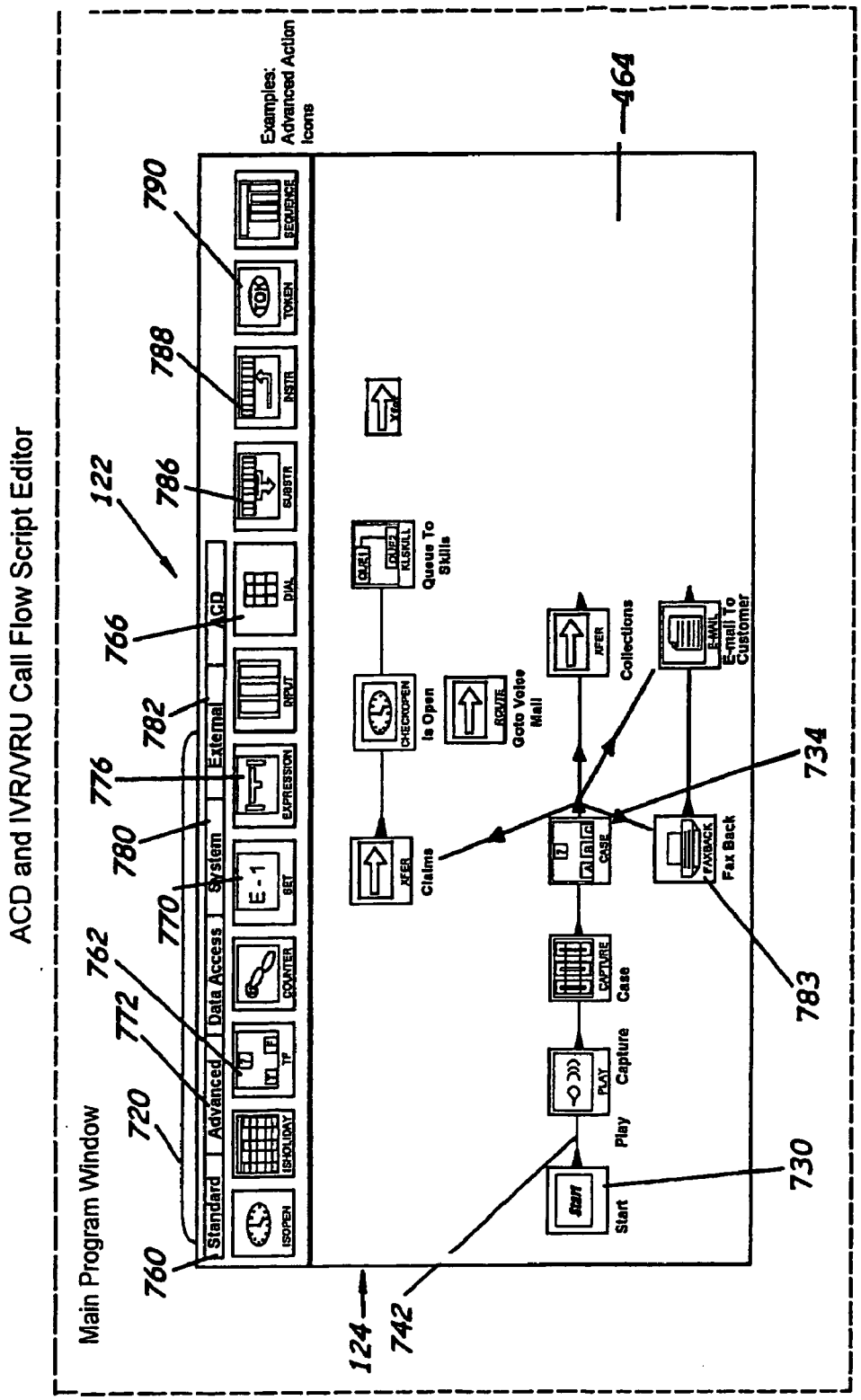
FIG. 2 is a portion of an open window showing the script construction editor that is used for scripting IVR functions and ACD functions and examples of advanced action icons.

Database administration of IVR is accomplished through an intuitive and user friendly drag and drop graphical user interface (GUI) 122, such as depicted in FIG. 2, which shows a portion of an open window used in a construction editor that constructs IVR and ACD routing scripts. In accordance with the present invention, the GUI tool used for IVR is the same tool used to administer an ACD routing database. Reporting for both systems is as simple as reporting for an individual component because all of the systems fall under a single reporting platform that logically links call records between each component.

Scripts for an IVR system and ACD routing are designed and maintained in the construction editor (FIGS. 2, 13 and 71 and 72). The construction editor 124 is a software platform using a graphical user interface that is opened as a window by selecting edit script from the file menu of a main program window. At the top of the construction editor is a series of tabs. Clicking on these tabs displays different sets of actions, as will be explained in detail later. The construction editor allows a user to build advanced IVR features that seamlessly integrate into the ACD system, construct custom voice mail application, and perform call recording. Each IVR server is capable of supporting up to 96 voice ports a piece.

The Computer Telephone Integration (CTI) contains developer tools and programming interfaces to allow development and integration of the system components, such as shown in FIGS. 1 and 3. It can reside as a node on a LAN or corporate WAN, and allows for existing disparate applications to communicate through a common interface as known to those skilled in the art. It also serves as an accessible networked link for new systems and applications to interface rapidly with the call center system components. The CTI can provide an interface between the call center system and a network environment that is CSTA, TSAPI and TAPI standard components, and translate various proprietary call control and telephony control commands, such as used with a Harris 20-20 switch, into a format that is widely accepted as the standard for call center applications.

Call control and telephony control messages within the system can be read, formatted and transmitted via a published set of API functions, which are then set to the host database systems and applications far processing. Messages are received from these systems and are translated back into a published format through the same mechanisms. This process opens up the call center system to both first and third party call control options for use with products, such as predictive or preview dialing systems. The system can support major domestic and international network interfaces: T1, E1, PRI, SS7, and Analog, and can include a fully implemented CTI link: CSTA, CT-Connect, and TAPI.

Figure 15:
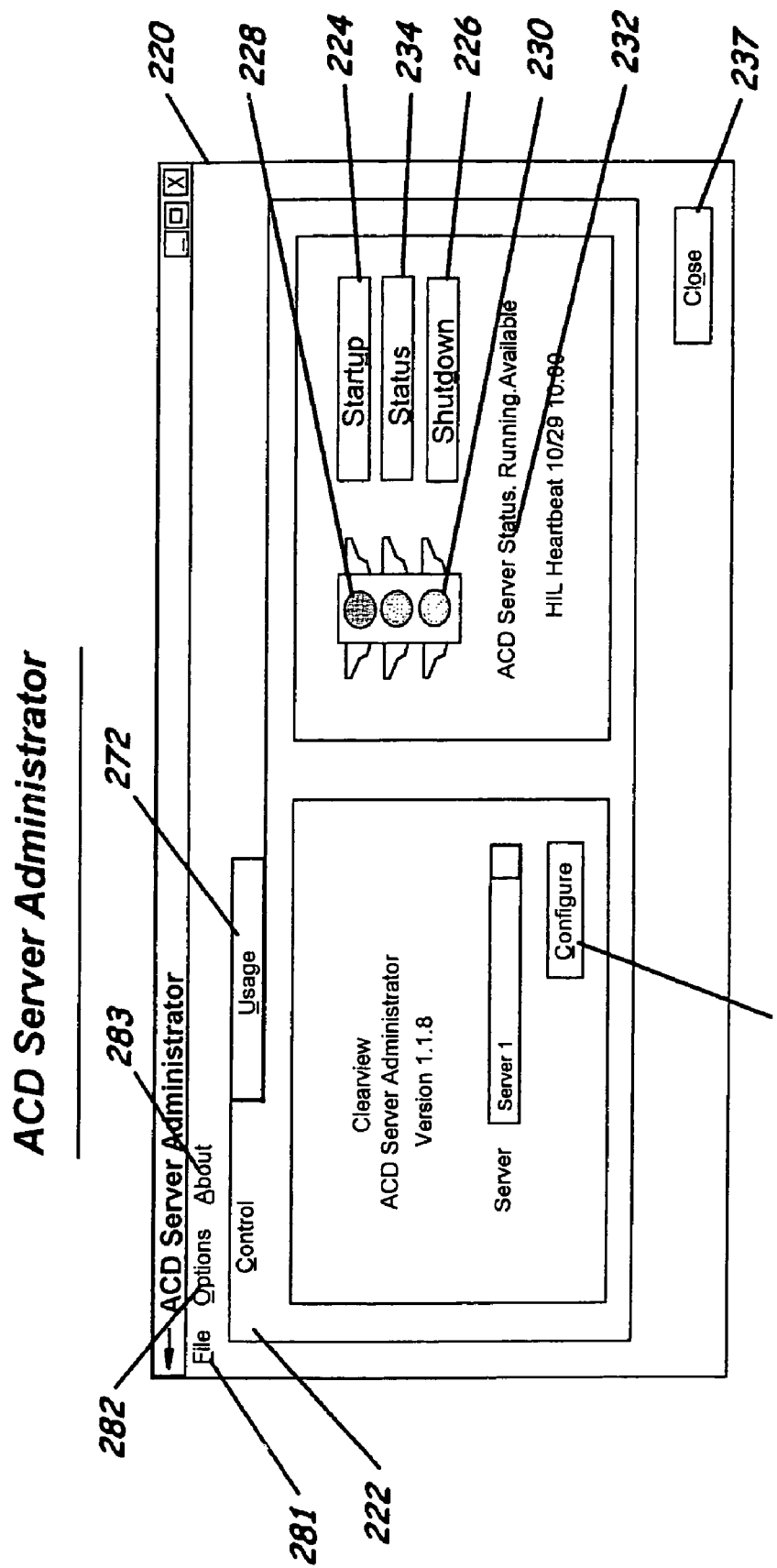
FIG. 15 shows an open window for the ACD Server Administrator application.
Figure 19:
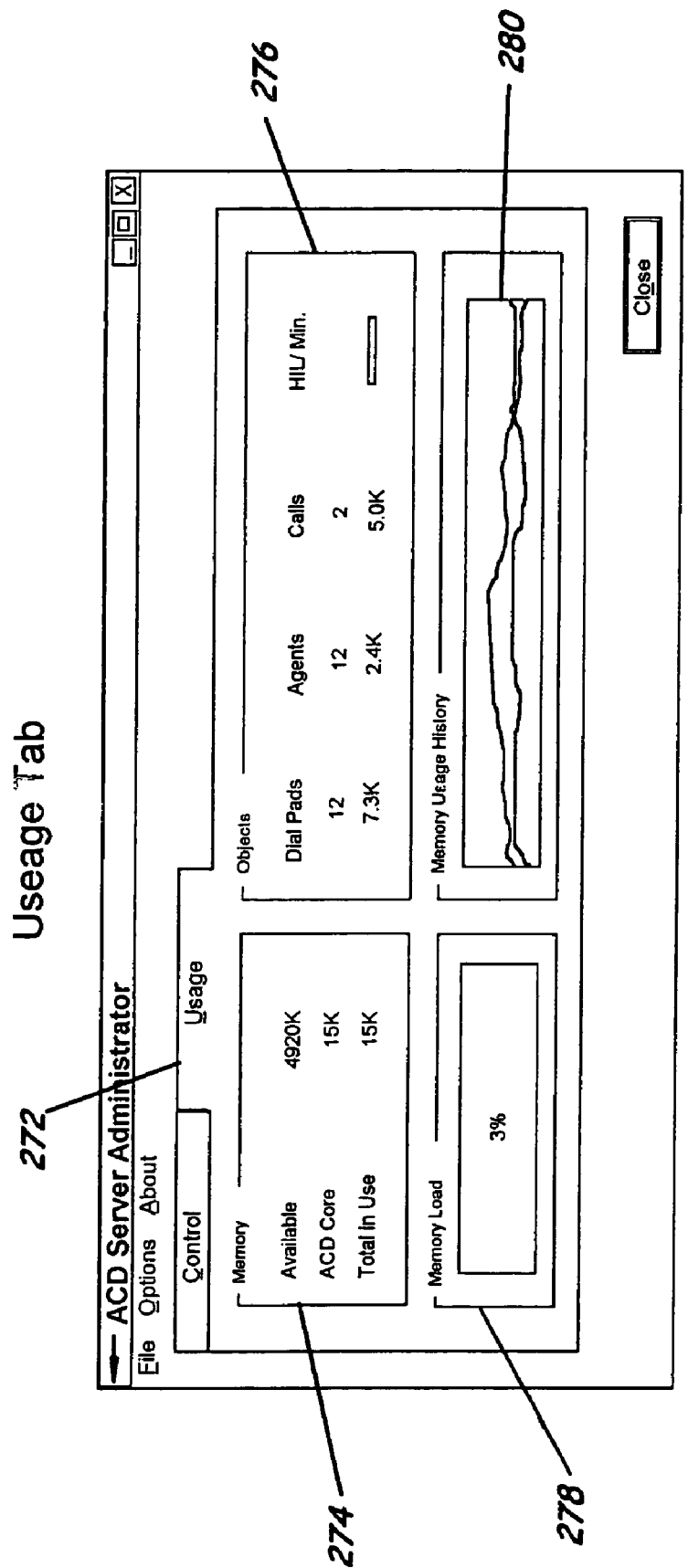
FIG. 19 shows the window reporting memory usage when the usage tab on the ACD server administrator application window is clicked.
Figure 19A:
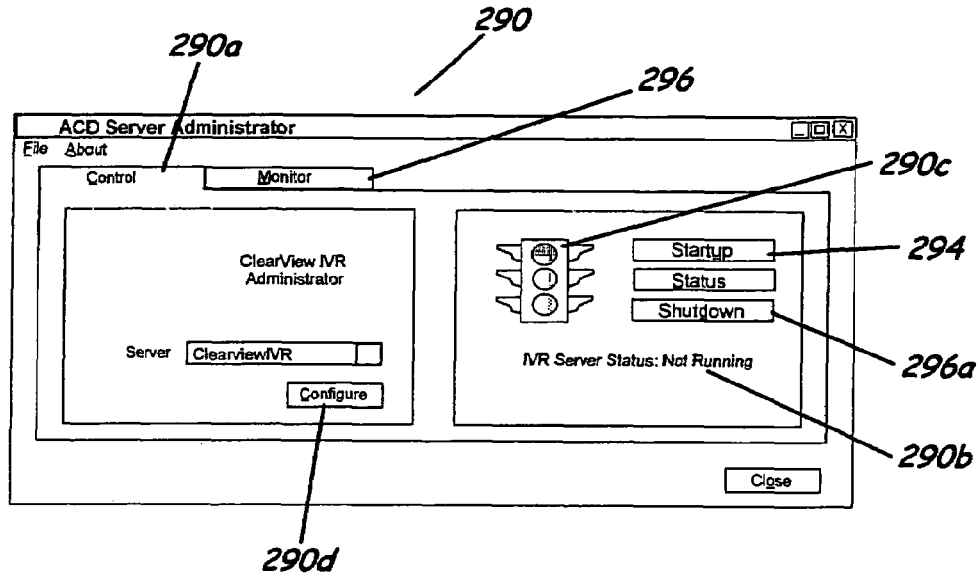
FIG. 19A illustrates an open window for the administrator application where the IVR server is selected for configuring the IVR.

As shown in FIGS. 15 and 19A, the various ACD servers and IVR servers can be configured via a respective ACD server administrator application and IVR server administrator application, where one or more servers that are used for the ACD and IVR can be configured by selecting appropriate servers through a drop down list.

The ACD server administrator serves as the interface 126 (FIG. 15) between the ACD server 110 and the call center's system administrator software forming the ACD server software. This application can be co-located on the ACD server 110 with the ACD server software, or can reside on a separate PC that is networked via a Local Area Network (LAN) or corporate Wide Area Network (WAN). From this application, the user can configure the system set-up and parameters, and monitor system performance, as will be explained later. The ACD server administrator 126 is the only interface direct to the ACD server itself.

By placing the ACD server administrator 126 on a corporate network, multiple instances of this application are able to interface with multiple call center system sites that reside on the same network. This capability allows for centralized system management and control, which further allows for database standards to be more easily used in dispersed sites. Centralized control can also offer the opportunity to reduce the number of database management resources and operations expertise required to administer the system. For sites that require localized control, the ACD server administrator 126 is equally accessible via a local LAN for that call center. The ACD server administrator facilitates access to the call center system tables.

Using the ACD server administrator 126, a database administrator or MIS personnel can open different windows to configure the parameters of the switching platform 102 and match up the switch features specific to the switching platform used to provide the switching matrix. This configuration ensures a seamless alignment between a switching matrix and system applications.

Figure 66:
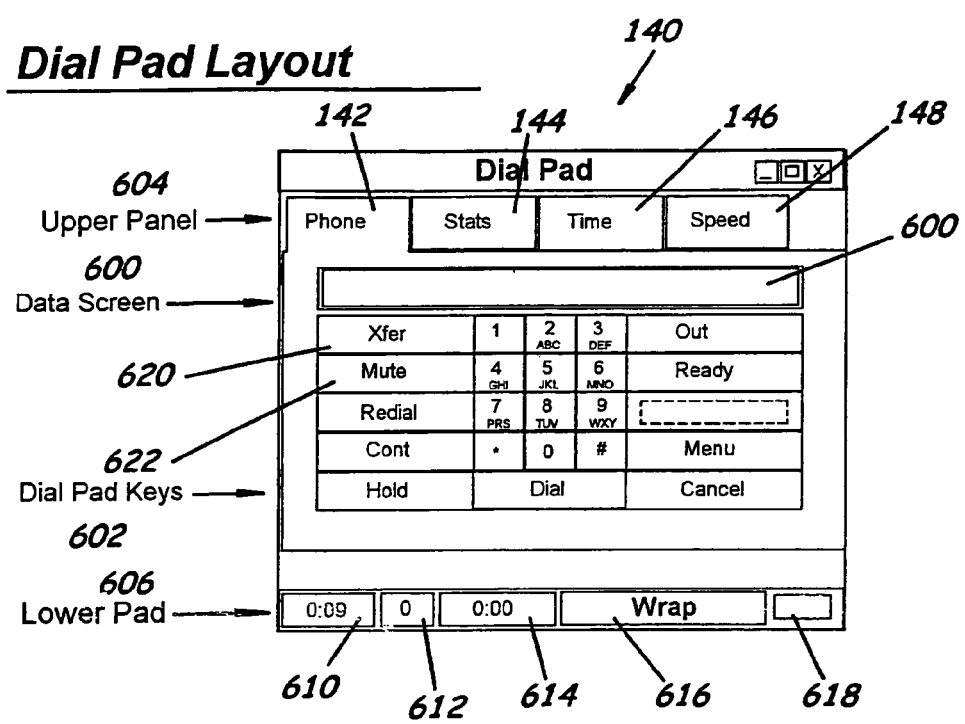
FIG. 66 illustrates a dial pad layout used in the dial pad software application.

Refresh rates can also be established through the ACD server administrator 126. Refresh rates for agent related statistics appear on an agent's dial pad (FIG. 66), and are configured from this application. In addition, the frequency at which call records are written into a historical database also are configured at this point. Control over refresh rates allows a database administrator to manage communications traffic on the network, ensure minimal impact to bandwidth, and provide valuable real-time statistics.

The ACD server administrator 126 also contains resource utilization tools (FIG. 19) that help a user monitor system memory use and availability, which clients are logged in, CTI link messages per minute, and historical memory loads on the system.

Figure 20:
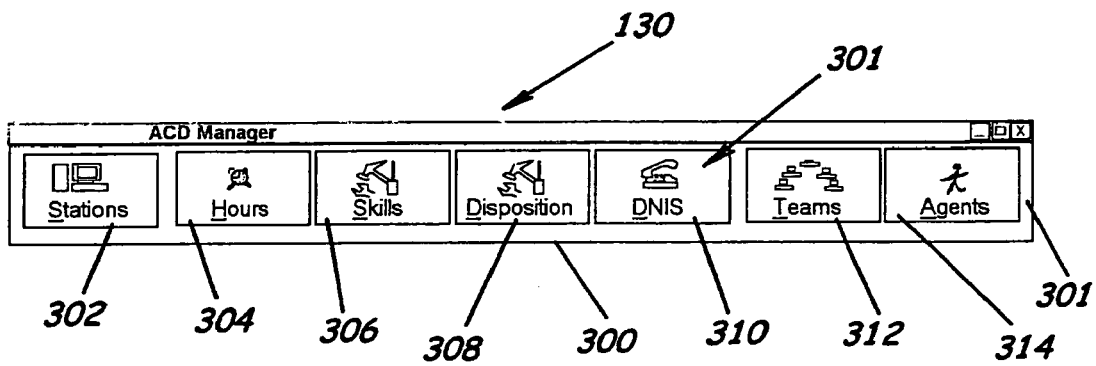
FIG. 20 illustrates the toolbar for the ACD manager interface.

The call center system ACD Manager application (FIG. 20) is the interface 130 between the call center administrator and the resource database and scripts. The ACD manager 130 can be loaded onto a desktop computer that is networked with the other component systems used in the call center system. From this application, a user is able to manage all database tables and scripts necessary to control call routing and customer handling requirements within the call center. The ACD manager uses a user-friendly Windows interface as illustrated in FIG. 20 (showing the main toolbar) that facilitates quick, seamless changes and requires minimal training requirements for administrators.

The primary database tables managed through the ACD manager 130 are: (1) station management; (2) call center hours of operation; (3) agent skills; (4) all disposition; (5) DNIS configuration; (6) agent teams; and (7) agents.

The call center system Supervisor 132 has software with an interface (FIG. 41), which provides management and operations staff with the real-time and historical information required to manage the efficiency of their individual agents, teams, or their call center. The Supervisor provides a comprehensive set of performance metrics that can be analyzed, interpreted and incorporated into management decisions, and operated through the graphical user interface 132, as illustrated.

The supervisor application 132 is designed to be installed on a standard PC workstation, allowing each supervisory manager or operations personnel to use their own personal computer for all of their business applications.

A sampling of the real-time and historical information available through the supervisor application is shown in FIGS. 48-65. The tabular and graphical presentation of data is presented preferably in multi-color format and provide for easy viewing and interpretation, allowing the manager to identify critical data points in a timely manner. Multiple screens can be viewed concurrently, providing a variety of information options that can address most standard call center reporting needs.

An agent dial pad (FIG. 66) is a software interface 140 that provides a graphical user interface (GUI) for the call center system and an agent. A voice path is provided to an agent via an analog line that feeds into a keypad/headset unit. The primary components of the agent dial pad can include a dial pad tab (phone) 142, statistics tab (stats) 144, time tab 146, and speed dial (speed) tab 148, as will be explained later. Agent scripting can also be provided and provide database driven scripts and screen pop applications for each call campaign. The dial pad interface 140 improves call handling times, reduces agent training times, and provides consistent service to customers.

Installation of the software of the call center system of the present invention typically will require that the switching platform 102 be installed first and that the appropriate network topology be in place to accommodate the host interface link (HIL) on LAN and network interfaces required by the different applications. IP addresses are required for each server as would be known to those skilled in the art. The total number of IP addresses required would ultimately depend on the number of servers and level of redundancy incorporated into the network topology. Power and space requirements would also be dependent on the total number of servers and level of redundancy required, as known to those skilled in the art.

Basic components of the switching platform 120 database are illustrated in FIG. 3. The switching platform uses components (shown by commonly known acronyms) used by those skilled in the art. These components include the BOA 150, TRU 152, EXT 154, Class of Service (COS) 156, FEA 158, ROU 160, CONN 152, PEL 164, BC 166, DIA 168, COL 170, PAT 172, FAC 174, TRU and IVR.

As shown in FIG. 4, the call processing through the switching platform 102 defines what type of circuit boards 175 are inserted into respective shelves and slots of the switch 102. These inserted cards operate with the T1 trunk board or an analog line unit 176.

The basic call flow of the switch software contained on the switching platform 102 can be described as follows with reference to FIGS. 1 and 3.

1. Calls enter the switch 102 from the public switched telephone network 104 on an incoming trunk 152.

2. Under this module, the first table that is looked at is the incoming class of service (COS) 156.

3. From this point, the system points to the collect and route 170. Depending on the dialed number collected, the collect/route routes the call to a route-request entry and this is sent to the call center system 100.

4. Otherwise, the call is routed from the collect/route (route pattern-facility-trunk group).

5. From the outgoing trunk group, the call is routed to an IVR server 108 so the customer may input digits for a particular need.

6. Once accepted from the IVR, the call is transferred back to the trunk's incoming class-of-service (COS) where once again it points to a collect/route (via dial-control class) so that it can be sent to a route-request destination.

A COS 156 includes a feature class table (FEA) 158, a routing class table 160, and a dial control class (DIA) 168. The Class of Service defines what internal and external privileges the phones and trunks have access.

Under the COS prompt of the switch, a particular COS is added. The feature class 158 defines a unique set of system features. This table is checked to see if dialed feature access is allowed (internal features). The routing class (ROU) defines outbound routing privileges. The routing class gets checked in the route pattern (PAT) 172 (outbound privileges).

The dial control class (DIA) 158 points to the first call processing table. When an extension (EXT) 154 or incoming trunk (TRU) 152 generates a service request (going off hook, or being seized from the outside CO), the COS first checks the dial control class to determine how to process the call. Normally in the call center system environment, it will point to a collect and route table.

Under the COL prompt of the switch, a collect and route name is defined. All possible digit sequences can be entered. This is most likely where collections such as NXX XXX XXXX=route-request-1 will be defined in order to get a call to the call center system. Also collections such as 1XXX=STA can be entered in order to dial from extension 1000 to 1999 as an example. 1XXX is the dialing range for extension access.

Under the PAT 172 prompt of the switch, a route pattern name can be defined. A route pattern gets the call out of the switch, such as either to an IVR 108, as is the case with the call center, or to an outside trunk connection 152*a*. There is an ordered list of routing options, which may include queuing, for outgoing call completion. By the routing class, a user can specify who can and cannot get routing out of the system. Also, day of week and time of day are configurable.

Under a fact prompt of the switch, a facility (FAC) 174 is defined. A facility points to a trunk group in order to get a call routed out of the system. For a HIL station, a facility states what profile of information to send to the host when dialed (e.g., profile 39 is used for HIL stations to send a packet of data to the host). For a facility pointing to a trunk group, commands such as SDI 15 are used to send up to 15 digits out of the system. These can be outpulsed on the trunk group via DTMF, in most cases.

Under the TRU prompt of the switch, a trunk group 152 is defined, A trunk group must all be connected to the same place (to the local CO or IVR) and will need an incoming COS and circuits defined as well.

The switch uses a route request as illustrated in FIG. 3. A call is received by the switch. Information is sent to the call center system 100 via a route request profile. The call center analyzes data and sends route update profile back to the switch. The call is routed to an agent according to new information (extension number) received. Each route request defines: (1) what profile the switch should use in its route request to the call center system; (2) the LAN link to which to send the message, if more than one; (3) timers for how long the switch should wait for an initial response message; and (4) failure destination to direct calls in the event of a LINK or call center outage. Normally these will be directed to a master number of a hunt group, with optics ready to answer these calls.

A route request configuration (FIG. 5) is operative with valid route request numbers, which are in the range from 1 to 20, corresponding to route-request-1 to route-request-20. The HIL protocol includes a set of predefined profiles that allow a user to define what call information is sent in route messages. The user can decide what types of information the host needs for different types of calls and can ensure that calls are routed to a route request that will contain the proper profile of information. The call center system 100 could use profile 39, which includes: dialed number, access code, authorization code (i.e., ANI), account code, initiating trunk group, initiating circuit, routing class, extension ANI, string and switch ID.

The logical device name is the name that. was previously configured in a SYSLOG module, as known to those skilled in the art, and will be assigned to a system device. The failure destination is marked as STA. If the link goes down, it can reroute the calls to a hunt group with non-HIL (host interface link) controlled phones (optics).

Communication between the switch and the call center system is established via the Host Interface Link (HIL), which in one aspect of the present invention, could be a LAN link The Ethernet control unit (or LAN gateway) installed in the switch acts as a gateway between the LAN protocol stack and TCP/IP. The system supports a maximum of 16 LAN HILs.

FIG. 6 shows a system device configuration table. A system device can be either a DCA or Link and entered as L0, L1, L2 because it will be used as a call link. An HIL link failure queue timer specifies the period of time that HIL links will queue messages for a given link after the link has failed and is now waiting for the link to recover. The range is 1-30 seconds.

A logical devices table (FIG. 7) defines logical names for devices configured in the system device table. The name a user assigns to a LAN link must be a user defined name. The user will use this name when configuring other tables in the switch for the call center application. The logical device name may be up to 10 characters long. There are certain reserved names that cannot be used. The valid logical device type to use is call link.

Figures 7, 8:
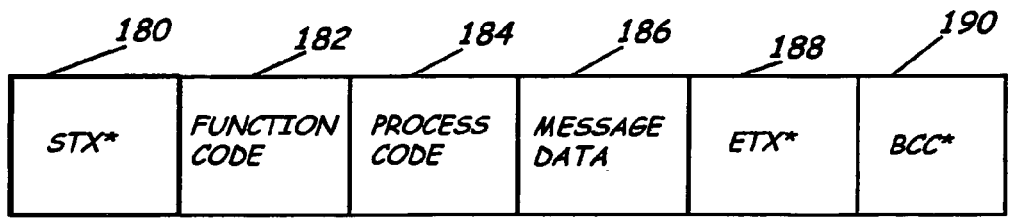
FIG. 7 is a table showing an example of a system logical device configuration that can be used in the present invention.
FIG. 8 is an example of an HIL message format for serial communication that can be used in the present invention.

An HIL message format used in serial cases is shown in FIG. 8. Basic message fields as known to those skilled in the art are shown, including STX 180, function code 182, process code 184, message data 186, ETX 188, and BCC 190. HIL messages are sent in the user-data field of open LAN messages. In LAN applications, STX, ETX and BCC fields are not used, and an open PAN HIL message format is used (FIG. 9). The function code is a two-byte field. It is the number that identifies the particular HIL message. The process code 184 is a one-byte field. It is a number required by some messages that identify a subfunction of the function. The message data 185 is a variable field size. It is variable information required by some message, as described in each message.

The HIL communication protocol includes messages that allow a host interface link 195 to become a signaling path for voice or data type telephony circuits. A line circuit (or trunk) under control of a host interface link is referred to as a HIL signaled circuit. A subset of that would be an HIL station 198.

In the basic switch process for the call center system operation of the present invention, calls are received by the switch. Information is sent to the call center system via HIL link. An idle agent is located. Update is routed back to the switch for idle station. This is how an agent gets the call. The application of an HIL signaled circuit involves agent stations where the call center system is responsible for delivering a call to an agent along with a screen of call related data on a separate terminal. In the case of the call center system 100, just how to answer the call will be displayed, unless the customer builds a screen pop. The tools are in place for this to happen, but it is not automatic. It allows the telephone to become a universal terminal. Ready, wrap and event are states that the agent may be in.

FIG. 11 illustrates a basic set up for a HIL station and FIG. 12 illustrates a facility. The valid extension type is HILSTA, which is a call center host interface link controlled extension. The logical device name must be previously configured in the SYSLOG module and must already be assigned to a system device. Essentially, it is where the HIL packet will be sent when a HIL station gets dialed. The facility is used for the presentation of the HIL profile that will be sent to the call center system when this station gets dialed. The facility must have been previously configured.

Calling a HIL station is similar to calling a normal station. Ring back is given to the caller during the call presenting phase. However, for some applications, it is not desirable for the caller to hear the ring back. Silence is a preferred option. The circuit location is an available port on an analog line unit in the switch. A class of service (COS) can be assigned and it enables an HIL station to place a call, as well as receive (a normal analog type of COS). The signaling type does not matter because it is ignored and an HIL process code is used instead.

The facility table shown in FIG. 12 defines what call data is sent to an HIL station. When configuring the facility, the answer NONE can be answered at the trunk group table and YES entered at the HIL facility prompt. An outgoing COS can be assigned which could be a normal outgoing reliable COS that are used for trunk facilities. The present 39 is actually profile 39 and the profile number controls what information the system includes in the present message. Profiles 1-40 are valid, but the COS center system of the present invention in one aspect could use 39 at this time. The weight progress 60 indicates how long to wait for a progress message from the host.

A default router IP address could be the IP address of the default router which is attached to the same network segment as the Ethernet control unit (ECU). For example, an IP address could be entered using a dotted decimal format as known to those skilled in the art. Any valid "0.0.0.0" indicates that a default router is not available. A Subnet Mask could identify any network/subnetwork scheme used on the LAN segment to which the ECU is attached. The IP address is entered using the same format. The SYS LAN configuration can use an ECU configure to provide TCP/IP. An HIL broadcast port can also be configured.

In order to save agents and operator time, callers can first be sent to the IVR 148. As an example, callers can enter the digit "1" for a given type of service or a "2" for some other type of request. Once the IVR collects the appropriate request, it will transfer the call back to the switch so that it can then transfer it over to the call center system. Here the appropriate skill (based on the service that the caller requested), for a given agent can be matched and the call center system will send the appropriate process code back for an agent's HIL station.

Data can be entered and updated with a Structured Query Language (SQL), which works as an interface to access data on the database system, and includes object-oriented technology, as known to those skilled in the art. In the client/server environment, the user's front-end application interfaces to a database management system with a typical back-end server. The call center system 100 of the present invention has the SQL server 118 (FIG. 1), which allocates space for a database on a hard drive. Memory allocation can be changed and the number of user connections changed also.

The ability of the call center IVR 108 to retrieve and update remote data is accomplished via data access actions (FIG. 13), shown as a data access tab 200 on the GUI of the interface 124 forming the construction editor. These actions are capable of integrating with other databases (i.e., Paradox, Oracle, SQL server, or any ODEC compliant database) or with the active ACD server 110. Data access icons are used to access the SQL server 118. There are four basic SQL commands: {1) select; (2) insert—place a new record; (3) update—update an existing record; and (4) delete.

There are also various SQL server actions that can be available with the present invention.

SQL SELECT—Selects a single row of data from an SQL compliant database and returns a row or record back to the user. SQL select is designed to work with ACD.

Parameters:

| | |
|---|---|
| Params | Any valid SQL select statement. If the query returns more than one row, only the first row will be returned. The returned records are stored in variables matching the field names. If no rows are available, or if the query fails, the failure destination will be followed if present. |
| Results: | |
| Failure | Specifies a destination to branch to if the operation returns no data. |

SQLEXEC—Executes an SQL statement on an SQL compliant database that does not return a result data set.

Parameters.

| | |
|---|---|
| Params | Any valid SQL statement that does not return records. |
| Results: | |
| Failure | Specifies a destination to branch to if the operation fails. |

Question: Can you access more than 1 record out of SQL?

Answer: There are two ways: SQL cursor and SQL next.

SQLCURSOR—Selects multiple rows of data from an SQL compatible database. SQL sets the pointer at the first record it returns.

Parameters:

| | |
|---|---|
| Params | Any valid SQL select statement. The query is expected to return more than one row, and therefore, the query will remain "live" after this method is invoked, when no more rows are available, a variable named OEF is set to true and the failure destination is followed if present. |

-continued

| | |
|---|---|
| Results: | |
| Failure | Specifies a destination to branch to if the operation returns no data. |

SQLNEXT—Advances the record of a previous SQL cursor. Allows you to more back and forth between SQL arrays.

| | |
|---|---|
| Parameters: | There are no parameters for this action. |
| Results: | |
| Failure | Specifies a destination to branch to if the operation returns no data or there are no more records to access. |

SQLCLOSE—Terminates a multi-row query opened with SQL CURSOR before all the rows have been retrieved.

| | |
|---|---|
| Parameters: | There are no parameters for this action. |
| Results: | |
| Failure | Specifies a destination to branch to if the operation returns no data, |

The ACD software is operative with the ACD server 110. The ACC server 110 is operative with the call center system to allow skills-based routing and routing to the longest available (idle) agent. Priority routing can be through various configuration operations with look-ahead routing and web-enabled call center. Skill-based routing allows a customer to be routed to the best available agent to handle the call. The ACD calls can be delivered based on agent skill and call priority.

Calls can be routed to agents who are best qualified to manage that call. Each agent can be assigned one or more skills that he/she has been trained to do via a setup skills window 210 shown in FIG. 39, which can be accessed through the ACD Manager 130. Additionally, the agent that has obtained a level of proficiency for that skill based on training, experience, proficiency and competency can be chosen.

An incoming call can be routed to the agent who has the highest proficiency and the skill required for that call. If there is more than one agent who equally qualifies, then the agent that has been available the longest time can take the call. Agents can be available to take calls for several skills at the same time. For example, an agent who speaks both English and Spanish can be available simultaneously to take a call requiring either language.

The ACD Manager 130 allows a user to prioritize calls based on the number dialed (DNIS), the number dialed from (ANI), and the length of time in queue. The call center system 100 can escalate the priority of a call after it has been in the queue. For example, the user can change the priority of a call from one to two after it has been in queue for five minutes, where priority is higher as numbering increases.

The ACD Manager 130 can also allow look-ahead routing that reflects the ACD's ability to intelligently network with other, geographically disbursed call center systems of the present invention. Using ISDN-like signaling via a telecommunications or other network, multiple call center systems can be networked to allow incoming calls or calls currently in queue to be intelligently rerouted to a remote site with available agents. The level of intelligence greatly enhances the interoperability of multi-site call center environments and improves agent utilization, reduces call queue times and improves customer satisfaction by providing seamless service to customers in a timely fashion.

The ACD Manager 130 of the present call center system can be linked to a business' corporate website to allow customers to access the call center through various multimedia options. Using e-mail or call me buttons within a business website, customers can queue inquiries to agents that can, in turn, respond in a manner similar to that of a voice call. Reports and charts can be printed from the web browser and reports can be built.

The call center system 100 of the present invention includes the ACD server administrator 126 and its associated graphical user interface (FIG. 15), which allows the user to control and configure all aspects of the call center system and monitor server activity. Because the main call center system server has no user interface in one aspect of the present invention, the ACD server administrator can be thought of as the control panel that allows a user to interface with a main server.

The ACD server administrator 126 serves as the interface between the ACD server 110 and a call center's system administrator, such as the type known to those skilled in the art. This application can be co-located on the ACD server with any ACD server software, or can reside on a separate PC that is networked via a local area network (LAN) or corporate wide area network (WAN). From this application, the user can configure the system setup and parameters and monitor system performance. The ACD server administrator 126 is the only interface that is direct to the ACD server 110 itself.

Figure 16:
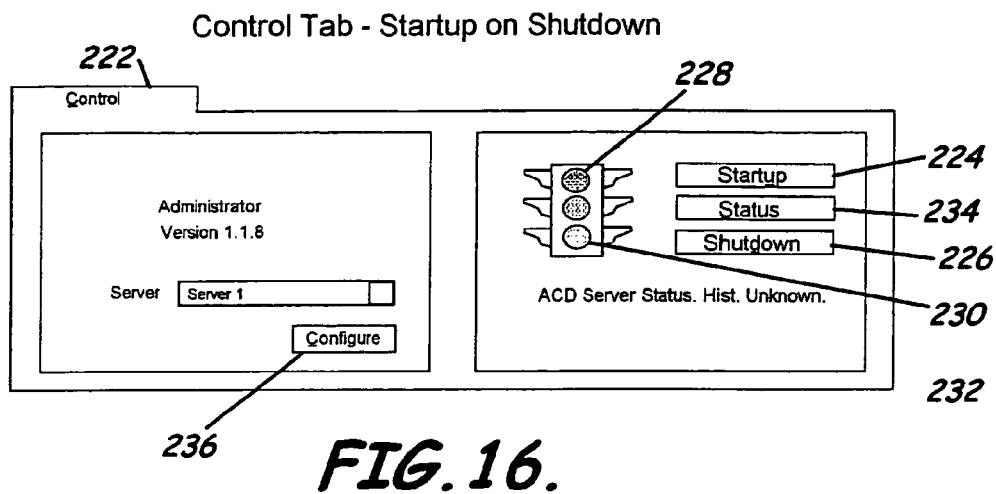
FIG. 16 shows an open window having greater details of the ACD server administrator application.

As shown in FIGS. 15 and 16, showing an open ACD server administrator window 220 as part of the ACD server administrator application 125, a control tab 222 allows user functionality, allowing a user to select and configure the server, such as where the call center system server is installed on so as to start and stop the server. To start up or shut down the server, the user can click the start up or shut down buttons 224, 226. The GUI includes a red (off) 228 or green (on) 238 light, which indicates the server status. The written text 232 below the lights also show the status of the server. If the user has switched to a different server, the user can click the status button 234 to update the screen to the status of the new server.

The configure button 236 can set various parameters and options for the server. After making the appropriate changes, the user clicks an apply box, then clicks OK for the changes to take effect, as in a standard Windows™ environment. The user selects close 237 to exit the configuration screen without saving.

Figure 17:
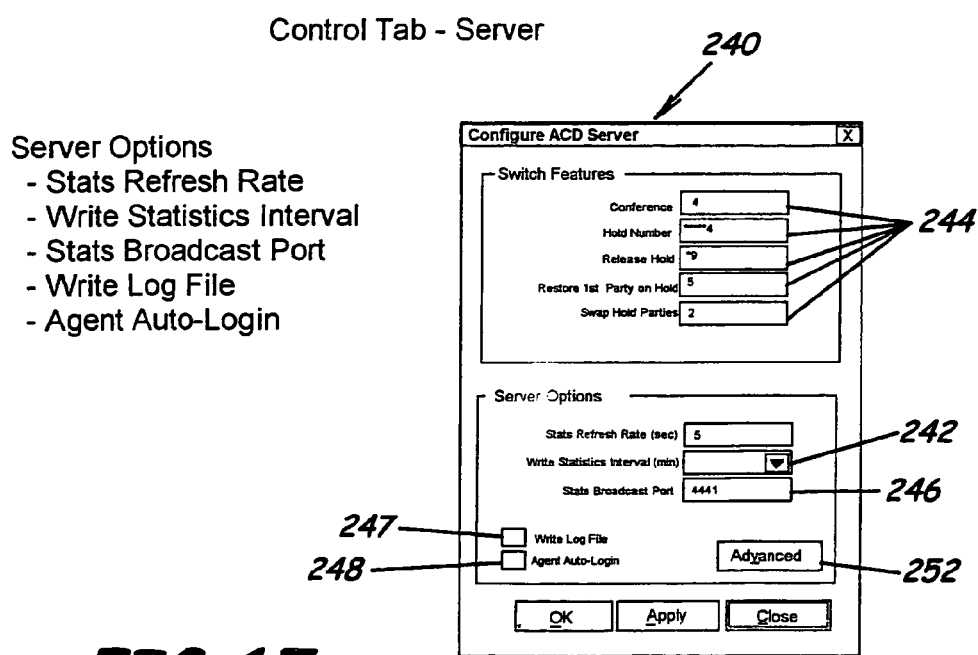
FIG. 17 shows an open window used for configuring the ACD server.
Figure 55:
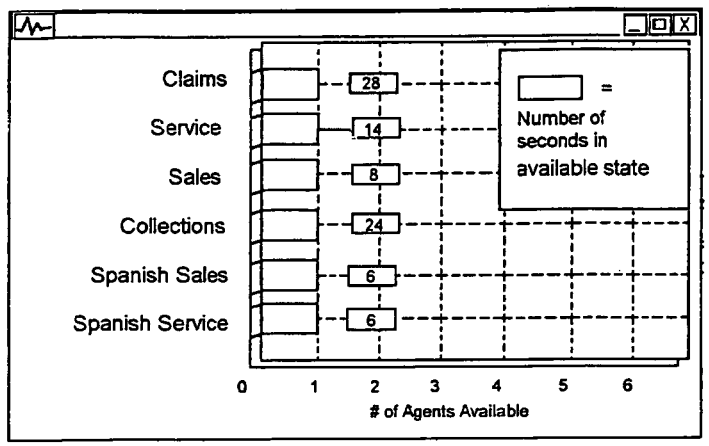
Figure 56:
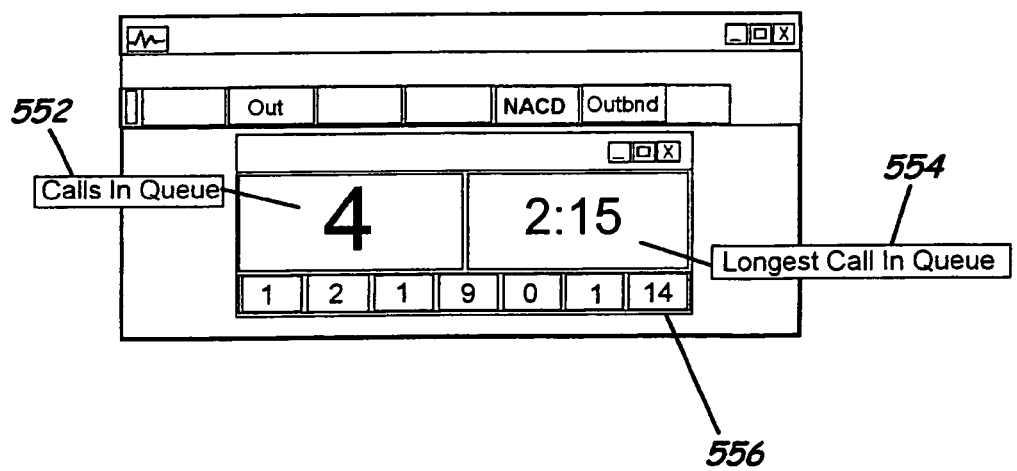

FIG. 17 illustrates an open window 240 for the configure option after clicking the configure button 235. From the drop-down list 242, a user can select the amount of time, in minutes, the user wants the server to write statistics to the database, which can be used by other system components (e.g., the Supervisor application) for reporting purposes. Other data entry lines 244 are illustrated. The IP port 246 where tale statistics are broadcast is entered. A log file 247 can also be written of all server activity. This is generally only used for debugging purposes, but includes all server activity. With agent auto-login 248, agents will be automatically logged into the server when they start the dial pad application (FIG. 55). The server can use the agent's user name to determine an identity for auto-login.

Figure 18:
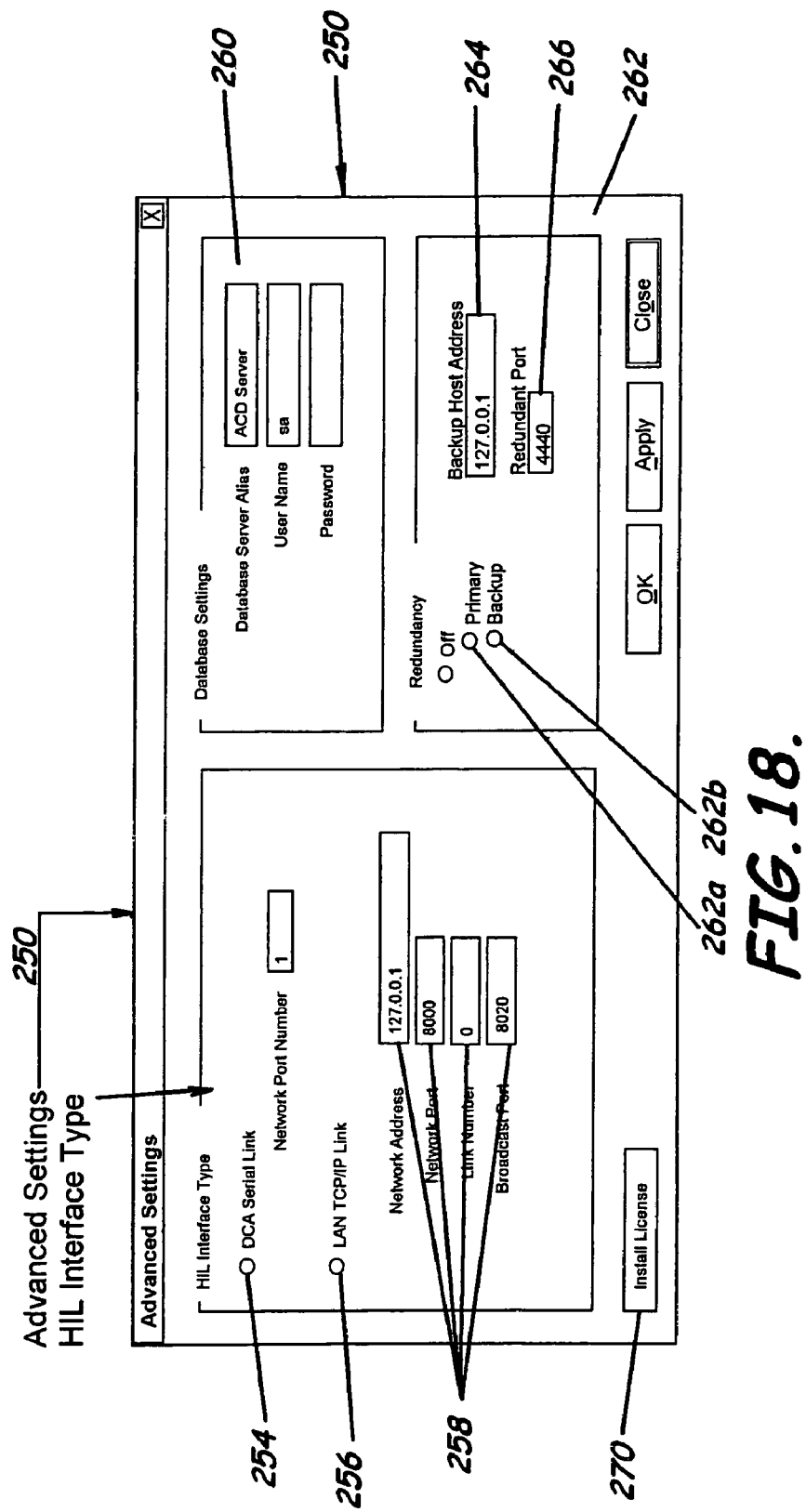
FIG. 18 shows an open window for advanced settings for the ACD server administrator application.

An additional window screen 250 of advanced settings (FIG. 18) is provided by clicking the advanced button 252 located in the configure ACD server window 240. These advanced settings can include the HIL interface type and the type of link used to connect to the switch, such as the DCA serial link 254 or LAN TCP/IP link 256. Because a serial link is slower, a DCA serial link is only used for a small call center system. If a call center has more than 25 agents, a LAN TCP/IP link can be used. The user also sets all the parameters listed within data entry lines 256 based on the switch. The network address is the IP address. The network port is the known port.

Database settings 260 can also be established with a database server alias, which is a EDE alias for connecting to the SQL server. A user name field is optional, but could be used to restrict access to the database. A default value could be SA for the system administrator. Passwords can also be entered such as a user name in a previous field, but would not be needed to access the database. The control tab could also include redundancy 262, which can include primary or backup servers 262a, 262b, as well as a backup host address 264 having the IP address of the backup host and a redundancy port 266, which is the IP port to allow communication between servers. An install license button 270 can be clicked to open a window that allows the entering of license keys. The usage tab 272 (FIG. 19) can be checked to show server memory. The memory block 274 could show the amount of available memory, the total memory and a total memory in use. An object block 276 could show the amount of dial pads and agents in use and the number of calls currently being handled, and the amount of HAM that each is using. The HIL/MIN reading is the number of messages transferred to the switch per minute. A memory load block 278 could show the reading in percentage of the server's memory currently being used. A memory usage history 280 could show a graph of the memory load on the server.

Various menu items in the server administrator application (FIG. 15) can be clicked, such as known to Windows™ users, including a File/exit menu 281 that allows the exiting of the administrator program. An Options menu 282 can notify the server of new DNIS records where each time a new DNIS record is added, the server becomes aware of the new DNIS. The About menu 283 could list the version and copyright information about the call center system administrator.

Various switch parameters can also be included where the database administrator or MIS personnel can configure the switch feature specific to the switching platform used to provide the switching matrix. This could allow a seamless alignment between the switching matrix and the call center system applications.

As shown in FIG. 17, refresh rates can also be established through the ACD server administrator application via the configure window 240. Refresh rates far agent-related statistics can appear on the agent's dial pad and can be configured from this application. In addition, the frequency at which call records are written into the historical database is also configured at this point. Control over refresh rates allows a database administrator to better manage communications traffic in the network, and minimally impact the bandwidth, while continuing to provide real-time statistics.

Figure 19B:
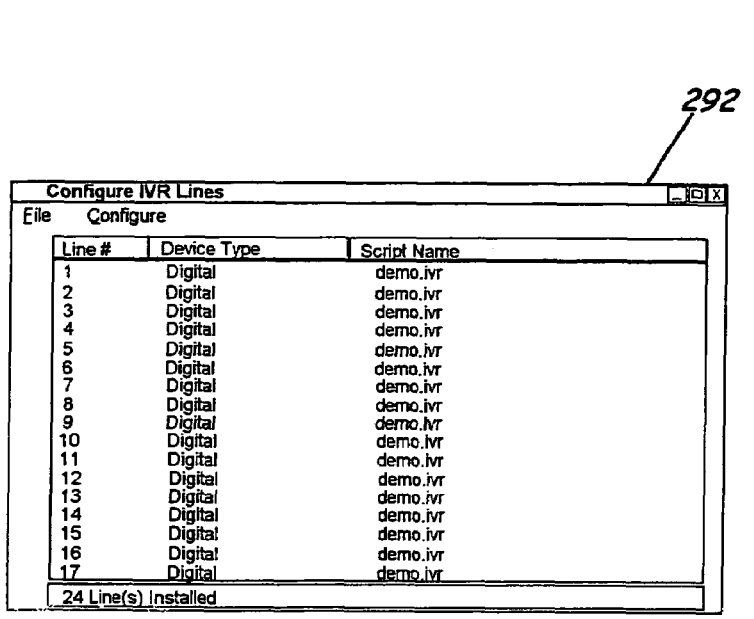
FIG. 19B illustrates an open window for configuring the IVR lines.

FIG. 19A illustrates how an IVR administrator application can be used to configure the IVR administrator. The IVR administrator application is similar to the ACD administrator application upon initial startup, except the IVR server will be configured. As the interface to the IVR server, the IVR administrator application is used to do the following: (a) configure the IVR server; (b) install IVR licenses; (c) start the IVR server; (d) monitor lines; and (e) stop the IVR server. The IVR administrator application can be opened by double clicking on an IVRAdmin.exe icon located in the main window to open the IVR administrator window 290, as illustrated in FIG. 19A. An IVR server administrator dialog will appear with the control tab 290a selected. The IVR server can now be configured by typing the name of the NT workstation (or server) in the server field and pressing enter. The IVR server status field 290b under the stoplight 290c on the IVR administrator window 290 changes to read: "Not Running," and the configure button 290d becomes enabled. The NT server name can be found by right clicking on Network Neighborhood icon on the Windows NT desktop, and selecting properties. The name in the computer name field of the identification tab is the NT server name. The user then clicks the configure button to open the configure IVR lines window 292, as illustrated in FIG. 19B.

The user then clicks on the File menu and chooses a Select Number of Lines option. The number of lines is entered on the user system, which is capable of supporting, and clicks ox. This number is dependent on the hardware and the number of purchase licenses. The correct number of lines is entered in accordance with the following table.

| Type of Card | No. of Lines |
| --- | --- |
| 8-port analog card | Enter 8 |
| 16-part analog card | Enter 16 |
| 24-port E1[1] card | Enter 24 |
| 130-port E1[1] | Enter 30 |

Figure 19C:
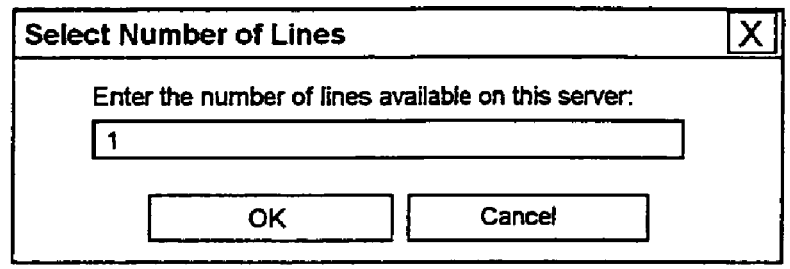
FIG. 19C illustrates an open window for the number of lines available on the IVR server.
Figure 19D:
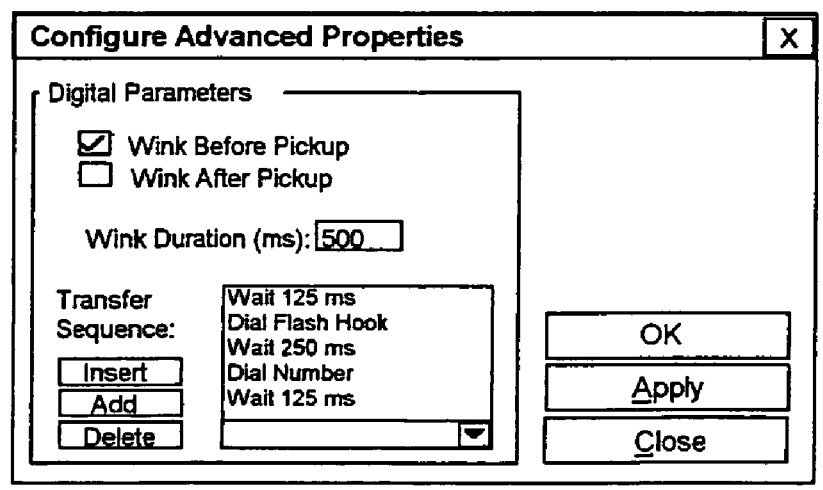
FIG. 19D illustrates an open window for configuring IVR advanced properties.

Scripts are then assigned to lines. In most cases, the user will probably assign the same script to all lines. To assign the same script to all lines, the user selects the Configure menu and chooses a "Select All Lines" option. To assign different scripts to lines, a user highlights the line(s) to assign a script. The user then selects configure and clicks on the "Set Script for Lines" option to open the dialog to assign a script to line(s). The user selects the script that the user wishes to assign to the line(s) and clicks on the open button. The user repeats if the user is assigning different scripts to other lines. The user selects the file menu and chooses the "Save and Close" option. The user selects the configure menu and clicks on "Select All Lines". The user selects the configure menu and clicks on "Select as Digital" and then selects the file menu and chooses the "Save and Close" option. The configure button is clicked and the configure menu is selected. The user then chooses the "Advanced" option to bring up the configure advanced dialog, as illustrated as an example in FIGS. 19C and 19D.

The following table illustrates various advance configuration fields.

| Field | Description | Default Configuration |
|---|---|---|
| Wink Before Pickup | A wink is a brief cycling of bit states on the digital line - equivalent to toggling the phone off hook, then back on. Check this field to issue a wink before answering the incoming call. | Checked |
| Wink After Pickup | This is equivalent to toggling the phone off hook, then back on. Check this field to issue a wink after answering the incoming call. | Unchecked |
| Wink Duration | Controls the delay before or after the wink surrounding the actual answering of the call. If "Wink Before Pickup" is on, the wink will occur followed by (if the default value is used) a Sao ms delay before picking up the call. The half second delay in this case prevents the phone switch from Misinterpreting the wink, Transfer Sequence Allows you to finely tune the timing of a call transfer to another number. The default configuration should work in most cases. If you have trouble with the transfer, try changing the waits around the flashhook (this simply means the phone is toggled on hook, then back off) Use the add, delete and insert buttons along with the options in the drop down menu (see list below) to change the transfer sequence instructions: wait x ms; dial flashhook dial number hangup pickup set DTI bits | 500 wait 250 ms dial flash hook wait 250 ms dial number wait 125 ms (i.e., waits ¼ Sec, issue the flash hook, wait ¼ sec, dial the new number, wait ⅛ sec, then hang up) |

The user then clicks close. For advanced configuration changes to take effect, the IVR must be shut down and restarted.

Figure 19E:
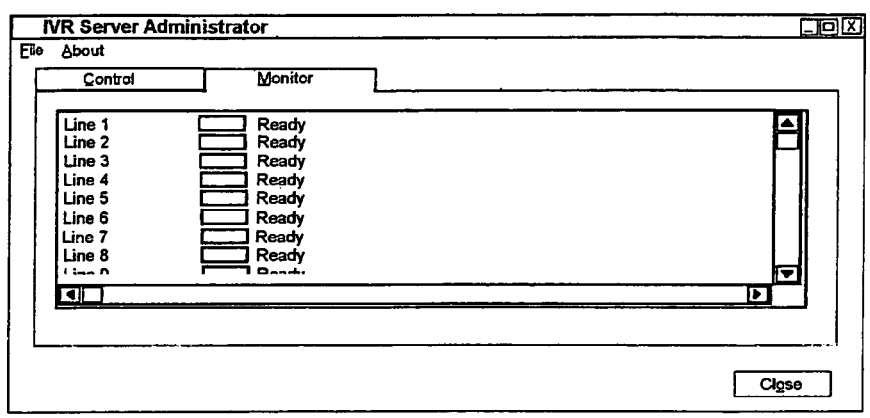
FIG. 19E illustrates an open window that is opened by the monitor tab for monitoring the status of each line in the call system center.

A call center system license is installed and the IVR server started. The IVR server is configured before trying to start it. To start the IVR server, the control tab is selected in the IVR administrator window. The startup button 294 is clicked. The stoplight icon 294c will change from red to green and the IVR server status below the icon will change to Running The user can monitor the status of each line in the call system center by opening up the monitor tab 296 in the IVR administrator window as illustrated in FIG. 19E. The following table illustrates details of the status of the lines.

| IVR Administrator Monitor Tab | |
|---|---|
| Status of Line | Meaning |
| red/Startup | port is not ready/in process |
| green light/Ready | the port is ready |
| green/idle | a script has been played at least once |
| yellow light/active | a script is being played |

The IVR server can be shut down by clicking on the shutdown button 296a. The stoplight icon 290c will change from green running) to yellow (stopping) to red (not running).

The status button is used to refresh the IVR administrator application so the user can be sure the user is seeing the current status. For example, if the server was stopped and restarted through either the control panel or a remote administrator, the user can click on the status button to see if the server is running, and then click on the monitor tab to find out what the status is of each of the lines. When clicking on the status button, the stoplight icon will momentarily display yellow, then change to reflect the current status of the IVR administrator.

The call center system ACD manager 130 application (FIG. 20) is the interface between the call center software operating as a database administrator and the call center system resource database and scripts. Like other applications, the manager 130 can be loaded onto a desktop computer that is networked with the other call center system computers and associated applications. From this application, a user is able to manage the database tables and scripts necessary to control call routing and custom handling requirements within the call center system 100. The ACD manager 130 uses a user-friendly Windows interface 300 that facilitates quick, seamless changes and requires minimal training requirements for administrators. Database tables are entered by clicking on the appropriate tab/buttons in the toolbar 301: station management 302, call center hours of operation 304, agent skills 306, call disposition tracking 308, DNIS configuration 310, agent teams 312 and agent. extensions 314.

Figure 21:
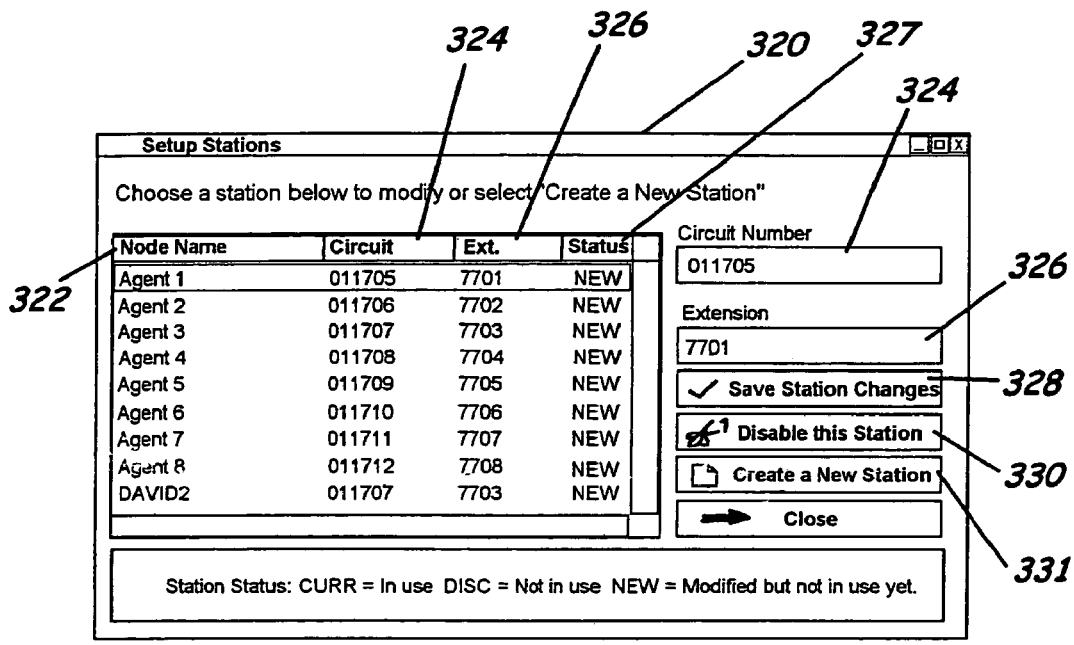
FIG. 21 illustrates a set of station window when the station's button is pushed on the toolbar of the ACD manager.

Clicking the station management button 302 opens a setup stations window 320 {FIG. 21), which allows a user to modify or disable call stations. Circuits, extensions and other criteria can be specified. The node name 322 and TCP/IP name can be entered. The circuit number 324 and extension 326 can be entered into the appropriate fields. The circuit number is the location where the computer links with the telephone system. The extension is the actual telephone extension of the station.

Once all information is entered, the status column 327 of the new station will be NEW, signifying that it has been set up but is not in use yet. If needed, the user can continue adding additional stations. When all necessary changes have been made, the user clicks Save Station Changes 328. The status field of all new stations will now be CURR.

To modify an existing station, the user clicks on a station represented by Agent 1, Agent 2, Agent 3 . . . in the node name column 322 to select it, and changes the circuit number or extension number, as needed. To make a station inactive, the station is highlighted and the user clicks "Disable This Station" 330. The status will read DISC, signifying that particular station is not currently in use. The user can reactivate a station by highlighting it and clicking Enable This Station, which will change its status back to CURR. New stations can be created by clicking on the new stations button 331.

Figure 22:
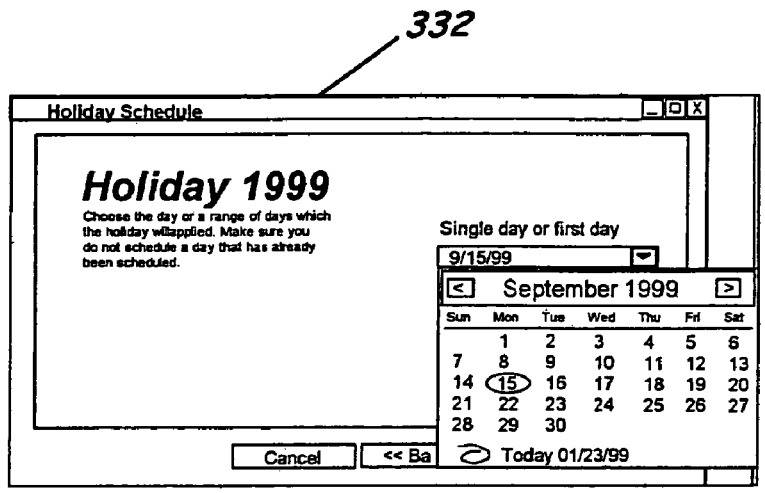
FIG. 22 illustrates details of a window used for a holiday schedule.
Figure 24:
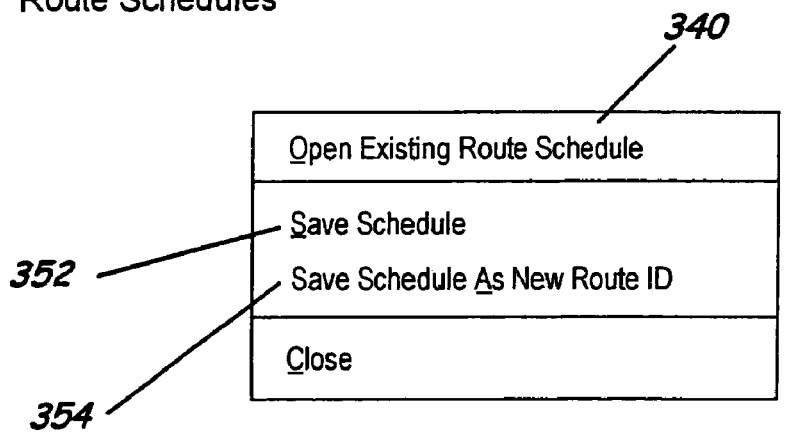
FIG. 24 illustrates an opening and saving of route schedules open window obtained by the file menu of FIG. 23.

Routing schedules can also be applied to each DNIS in the call center. Different hours can be set for each day of the week, for a range of days, and for holidays. These schedules could include the days and times that the call center is open and accepting calls. The user may also need to occasionally adjust these hours, as well as set up separate holiday hours. FIG. 22 shows a holiday schedule open window 332. All of this can be done in the DNIS open/close routing schedule dialog box or window 334, which is opened by clicking the hours button 304 (FIG. 20). This is referred to as a "routing schedule," because all calls are routed to live agents or voice mail/recordings based on the hours a user sets for each route ID. A user would set up different route ID's, based on needs, and then apply each route ID to one or more DNIS numbers, and use these route ID's as "schedules" about when to be open or closed. The file menu 336 on a DNIS open/close routing schedule window 338 can be selected to open a drag down menu 340 (FIG. 24). An open existing route schedule box 342 is opened (FIG. 25).

Figure 23:
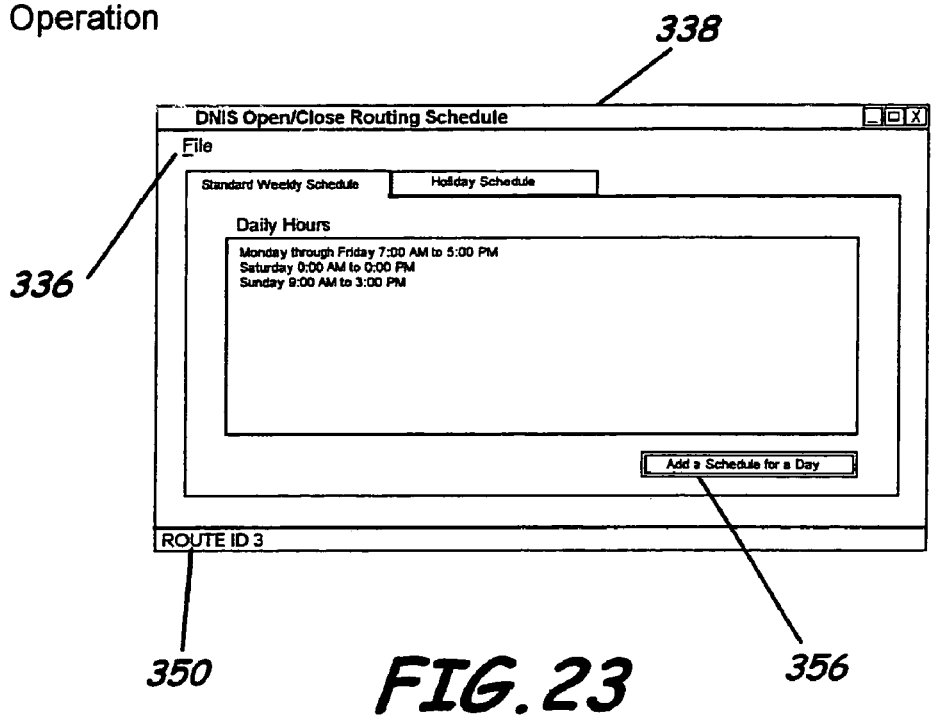
FIG. 23 illustrates a window for open/closed routing schedules of the DNIS.
Figure 25:
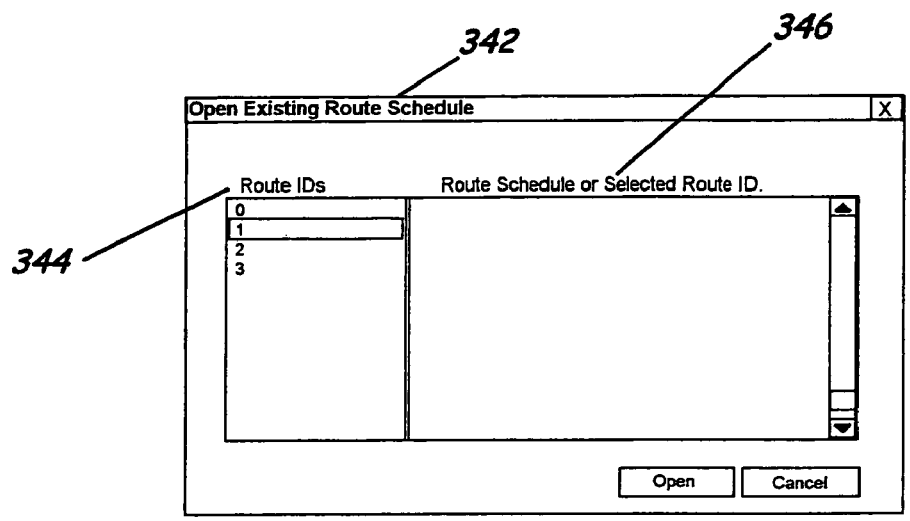
FIG. 25 illustrates a window used for opening existing route schedules and entering data.

In FIG. 25, route ID numbers 344 are listed on the left, and the route schedule 346 for the selected (currently highlighted) ID appears on the right in a dialing box for an open existing route schedule. The route ID number 350 will appear in the lower left corner of the routing schedule dialog box 338 (FIG. 23). The save schedule 352 (FIG. 24) will save changes to a route ID.

The save schedule as new route ID 354 will save the currently open route ID as a new route ID. The next available number will be used as the ID number.

Figure 26:
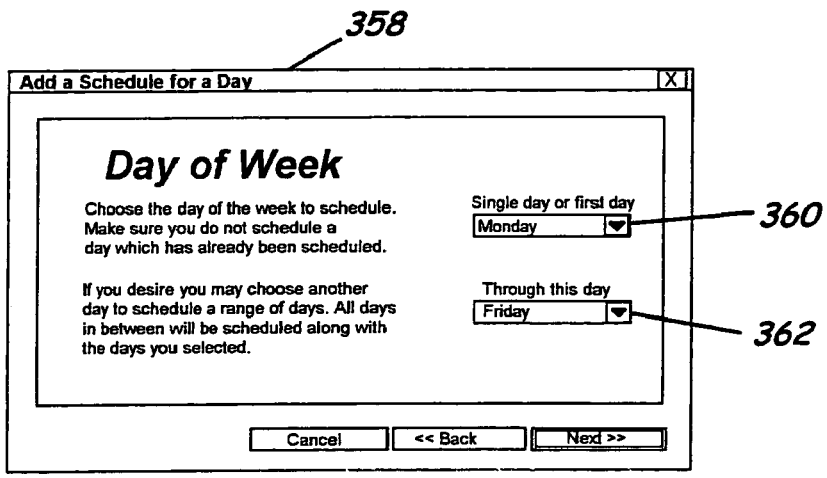
FIG. 26 illustrates a window for entering a schedule for a day of week.

It is possible to set up a regular (non-holiday) schedule by clicking on the Add a Schedule For a Day button 356 (FIG. 23). This will open the day of week dialog box 358 (FIG. 26), where one can choose one particular day, or set a range of days using the drop-down list boxes 360. If a user chooses a range of days, then the two days will be chosen, along with all the days in between.

Figure 27:
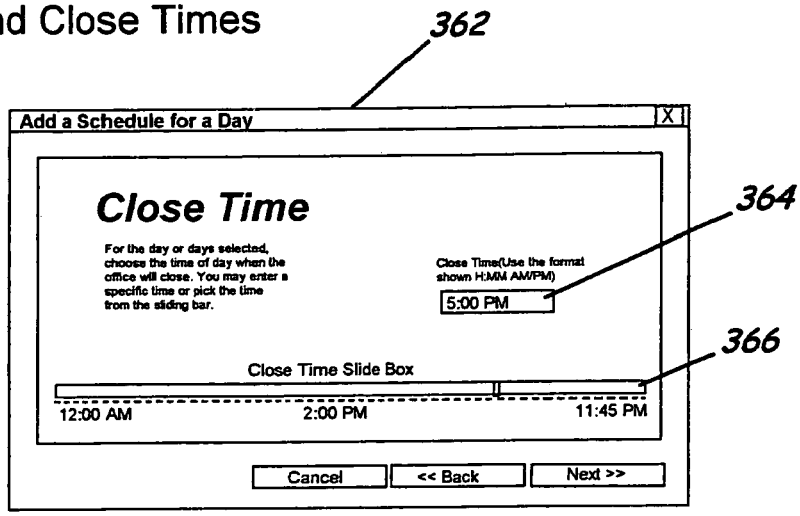
FIG. 27 illustrates a window for closing time.
Figure 28:
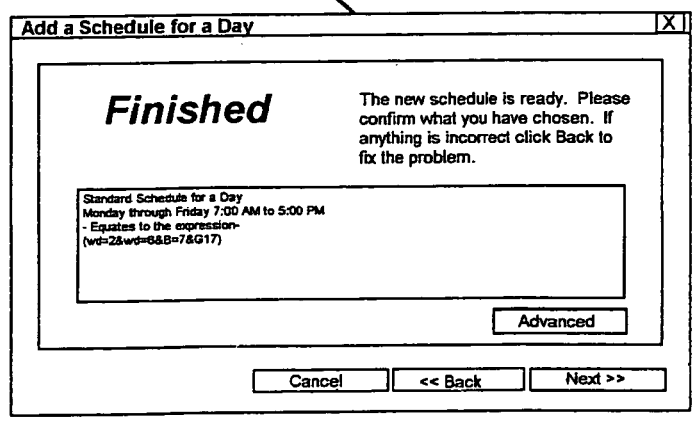
FIG. 28 illustrates a window for finishing data entry.

An open time and close time dialog box 362 (FIG. 27) allows a user to set the time the call center opens and closes. The user can specify the times by either typing in a specific time in the upper field 364, or by moving a slider 366. When moving the slider, the respective open and close time fields will change accordingly, in fifteen-minute increments. A finished dialog box 368 (FIG. 28) allows confirmation of the entries, and will appear in the main screen.

Figure 29:
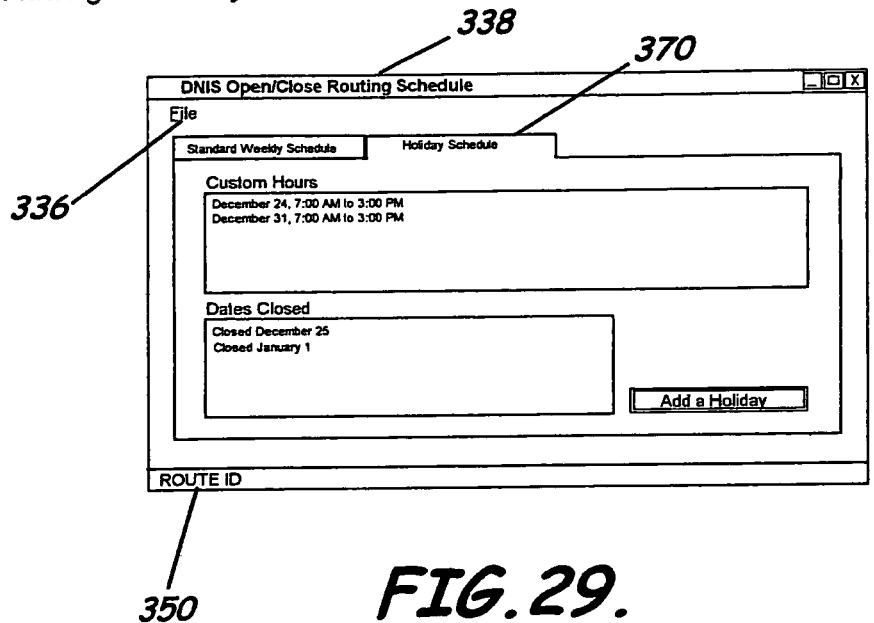
FIG. 29 illustrates a window for entering holiday hours.
Figure 30:
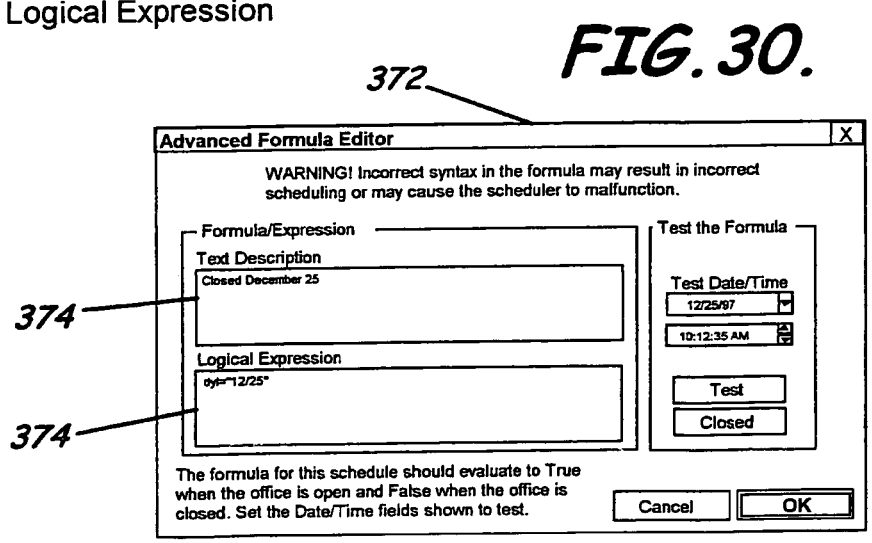
FIG. 30 illustrates a window for entering logical expressions through an advanced formula editor.

After the daily hours of operation are set, a user can also enter special hours for days that require adjusted hours of operation, such as by clicking holiday schedule tab 370 (FIGS. 23 and 29). This feature is especially useful for holidays, but can be used for other days, such as a regular staff meeting, when a user needs to deviate from the normal call center hours. If needed, the user can even set the call center to be completely closed on certain days. The day or range of days applying to the call center operation can be entered, as well as the month. A calendar can display a month at a time. A finished screen can confirm changes for the settings. An open time can also be set, such as in fifteen-minute increments. This can all be accomplished using menu-driven screens. It is also possible to use an advanced format editor dialog box 372 (FIG. 30), where entries, such as opening and closing dates and times, are entered via logical expressions in text boxes 374.

Figure 14:
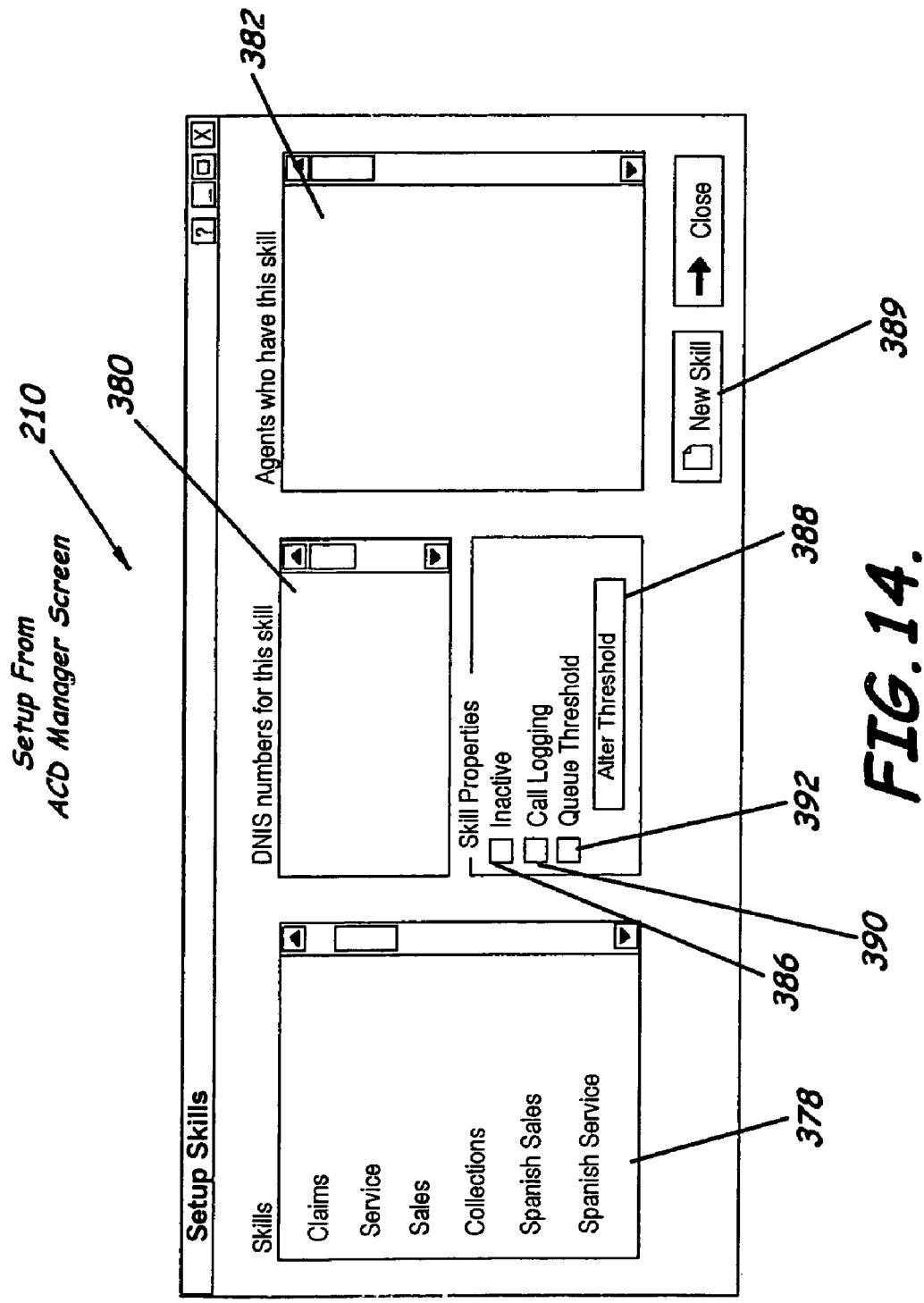
FIG. 14 shows an open window for set up skills used in the ACD manager.
Figure 31:
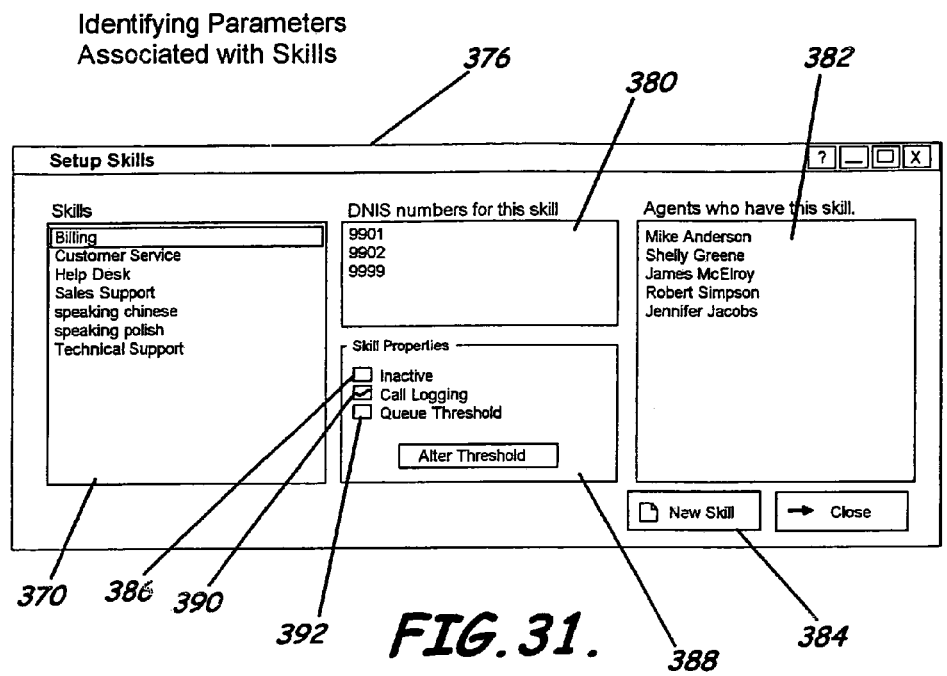
FIG. 31 illustrates a setup skills window for entering skills of agents.

Skills are also set up for each of the various calls the call center system receives. Set up can be done by clicking the skills button 305 on the manager main screen 300 (FIG. 20). The set up skills window 376 will open, listing any skills 378 the user has already set up, along with DNIS numbers 380 and agents 382 assigned to each skill (FIGS. 14 and 31).

Figure 32:
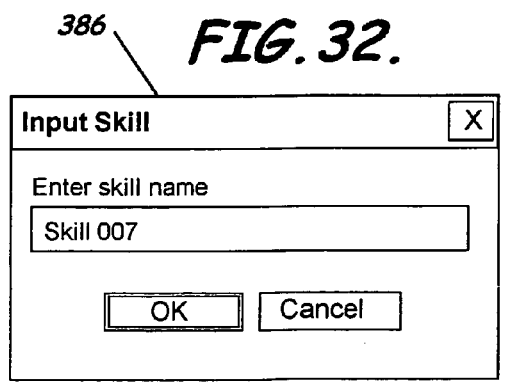
FIG. 32 illustrates a window for entering new skills that can later be assigned to one or more agents.

To add a new skill, the user clicks the New Skill button 384. The user enters the name of the skill in the input skills dialog box 386 (FIG. 32) that appears and clicks OK. The user can use any descriptive name or numbering system the user wants in order to designate the skills used in the call center system 100. The DNIS numbers 380 and agents 382 for new skills need to be set up separately, using the DNIS 310 and agents 314 buttons of the main screen.

To make a skill inactive, the user highlights the appropriate skill and checks the inactive skill box 386 of the skill properties section 388. The skill will remain inactive until the user unchecks this box. To initiate call logging, a user highlights the appropriate skill and checks the call logging box 390 of the skill properties. Call logging 390 saves all important information for that skill. This information can then be used for reporting statistical purposes. This includes: DNIS, ANI (caller ID), agent, length in queue, time call was received, and length of call. Call logging must be checked in order for dispositions to work.

Queue threshold 392 allows the user to set a limit to the amount of calls that can be in the queue at one time. Once this limit is reached, additional callers will either get a busy signal or can be routed elsewhere. The upper threshold is the maximum number of calls allowed in queue. once this limit is reached, the queue must get below the lower threshold before additional calls will be allowed in queue.

Figure 33:
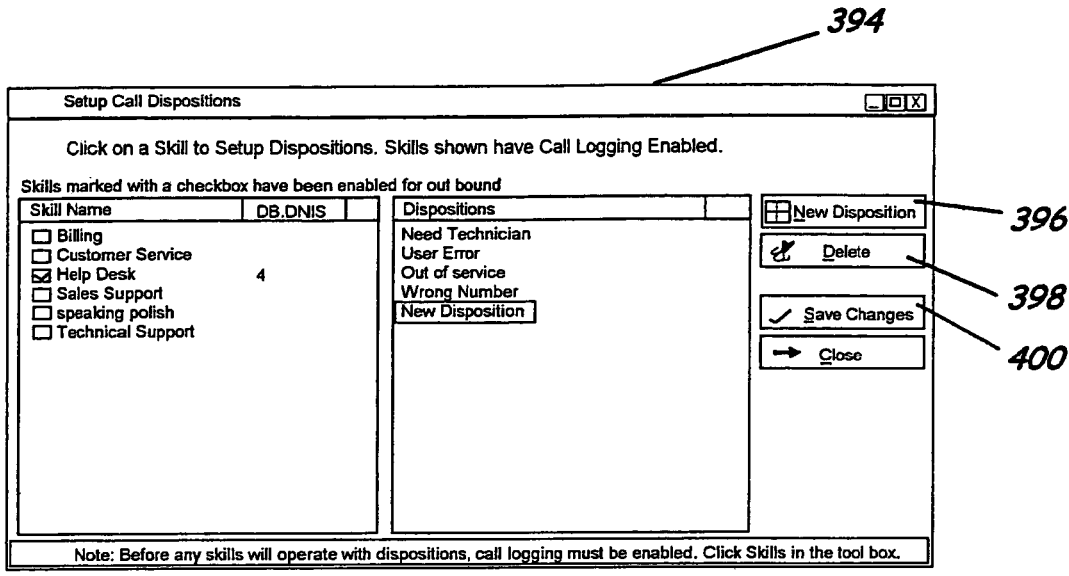
FIG. 33 illustrates a setup window for call disposition tracking.

Dispositions are a method of tracking calls. Each time a call is received, the agent can select a disposition, such as a placed order or wrong number. This gives the user a record of the calls received for each skill. The disposition 308 button of the main screen 300 (FIG. 20) is pressed and the set up call disposition window 394 opens (FIG. 33). To add a disposition for a skill, the user first highlights a skill, then clicks the New Disposition button 396 and enters a descriptive name. To delete a disposition, the user highlights it and clicks the delete button 398. The user must click save changes 400 before closing or all changes will be lost upon closing. In order for dispositions to work, call logging must be checked for that particular skill. This is done via the skills button 306 on the main toolbar 301 as described before with reference to FIG. 20.

The DNIS button 310 of the main screen 300 toolbar 301 opens the setup DNIS dialog box or window 402, where a user can create, modify, setup routing features and disable the various DNIS numbers used in the call center system.

Figure 34:
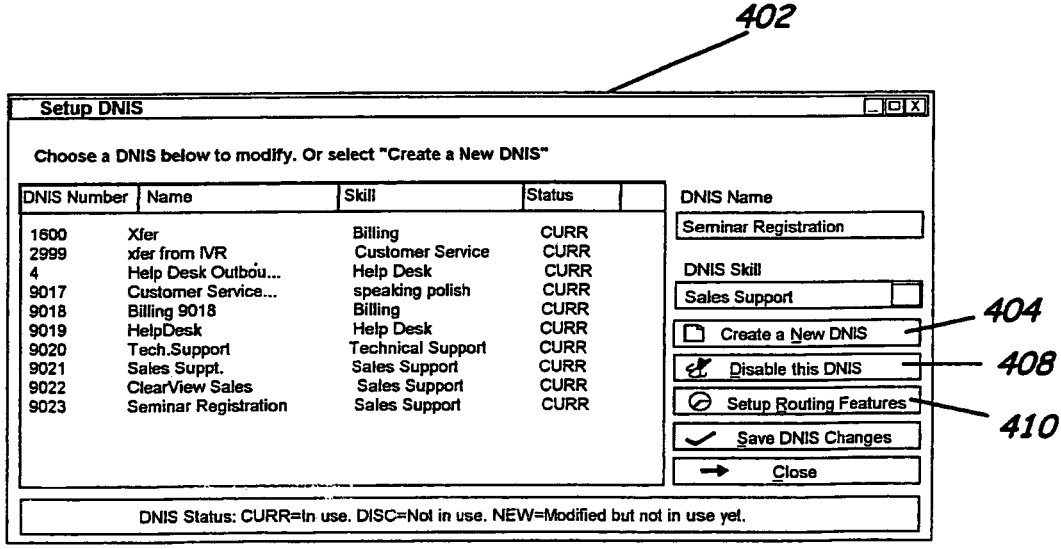
FIG. 34 illustrates a setup window for configuring a DNIS for in-bound calls and assigning it to a skill.

DNIS (i.e., dialed number identification service) refers to the number that the caller dialed. For example, if there is a toll free 800 number and a local number that customers can call, each of these two numbers is referred to as a DNIS. Each number that can be dialed to reach the call center is a DNIS. Each DNIS number can have routing options (route IDs) assigned to it, and each DNIS can be assigned to one or more skills as illustrated in FIG. 34.

To create a new DNIS, the user clicks the Create a New DNIS button 404. This opens a wizard (not shown in detail) that will walk the user through the entire process of creating a DNIS. Each step of the wizard includes a description and help panel to assist the user. The user could enter the necessary information in each step and click Next to move to a subsequent step and then Finish, as well known to Windows™ users. The DNIS number that will identify calls of this type is entered in a text box. Up to ten digits may be used. This number will usually correspond to the number dialed. It is common to only use the last four digits of the number.

The user then enters a name to identify the DNIS, such as in the box 445 shown in FIG. 35. This is the name that will appear on dial pad's status bar (FIG. 66) when a call of this type is received. Up to forty characters may be used. In some cases, it is helpful if the user uses the name that would be used in the phrase, "thank you for calling _____. May I help you?"

A DNIS skill associated with the DNIS can be selected from drop down list, such as shown in FIG. 35. The user should have already created a skill for this DNIS using the Skills button 305 of the main toolbar 301. If not, the user will go back and create a skill before proceeding. The skill controls what agent can take what skills. It is common to have several DNIS numbers for each skill and several skills for each agent.

The hours the DNIS will be in operation can be selected by choosing a route ID from a list. Route ID's are set up.

Clicking the setup routing features 410 (FIG. 34) opens a routing for DNIS window 412. The routing script decides how the manager will handle and route calls that are in queue. The user can select an existing routing script from a drop down list 414, or create a new one by clicking a Create New Script, such as from a main file menu. A script can be very simple (e.g., check the hours of operation then route to the next available agent). Some scripts, however, can be extremely complex, incorporating input from the caller and routing the call based on the caller's needs. Further details of the routing script are set forth later in this description.

The relative routing priority of a call type can be selected. Calls with higher priority will be placed ahead of lower priority calls in the queue. The default settings will raise a call's priority by a factor of one each minute. This can be increased by setting the initial priority and the acceleration to higher numbers. The acceleration function can also be increased. Linear, Exp and Exp2 are each progressively more aggressive. Priority settings are relative to calls in queue. Finish is then clicked to save the new DNIS.

Two modifications can be made to a DNIS from the main setup DNIS dialog box, which are the DNIS name and DNIS skill as shown in FIG. 35. Additionally, if a user created a new DNIS, the user can assign a name and skill to that DNIS.

The DNIS name can be highlighted to change and the user enters a descriptive name in the DNIS name field 405. The DNIS skill is chosen from the DNIS skill drop down list 405 that the user wishes to assign to this DNIS. If a DNIS is no longer used, the user can disable it by highlighting the DNIS and clicking the Disable This DNIS button 408 (FIG. 34). The status will change to DISC. If a user needs to re-enable a DNIS, the user highlights and clicks the Enable This DNIS button. The DNIS's status will change to CURR, signifying it is an active DNIS.

The call center ACD manager application also allows a user to set up the routing of calls for each DNIS. For example, the user can set a particular announcement to play for a certain DNIS when callers are on hold during open hours, and set that same DNIS to be routed to a particular extension when calls are received during closed hours. A user selects the Setup Routing Features button 410 in FIG. 34, and the routing dialog window (box) 412 (FIG. 36) is opened, where a user can choose a routing profile and script, and sets the routing prioritization for the DNIS.

The user can choose the route ID required for the DNIS from the drop down list 414. The schedule for each DNIS is based on the route IDs the user sets up using the Hours button. Since each DNIS may have different hours of operation, the user can set several route IDs to meet the user's needs. The user may also select always open or N/A (outbound DNIS), if appropriate.

In this step, the user needs to decide how the manager will handle and route calls that are in queue. The user can choose an existing routing script from the drop down list 416, or select one from the list and click the Edit Script button 418 to edit the script or create a new one.

The user selects the relative routing priority of a call type. Calls with higher priority will be placed ahead of lower priority calls in the queue. The default settings will raise a call's priority by a factor of one each minute. This can be increased by setting the initial priority 420 and the acceleration 422 to higher numbers. The acceleration function can also be increased. A drop down list 424 for acceleration function can be established with a maximum priority value 426. Linear, Exp and Exp2 are each progressively more aggressive.

Figure 37:
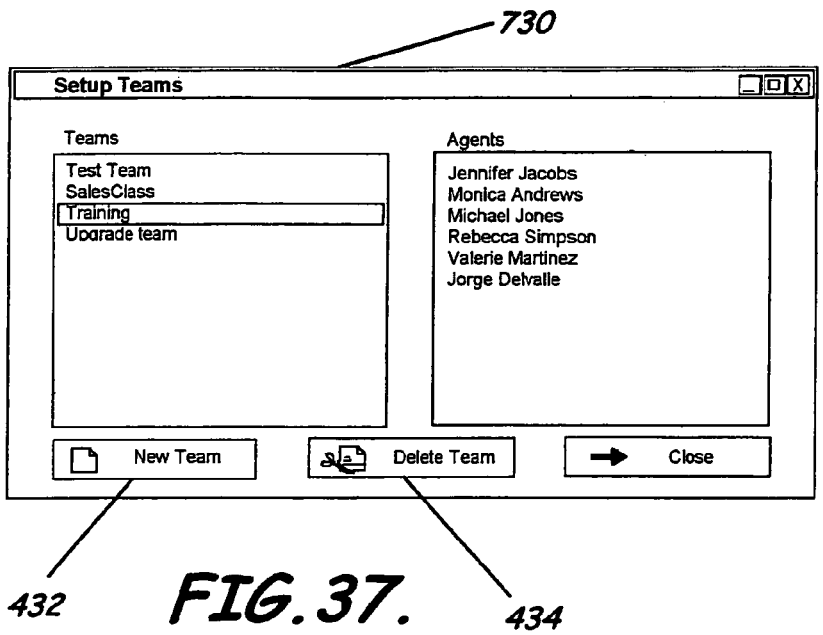
FIG. 37 illustrates a setup window for adding and removing teams.

The ACD manager also allows for skills based routing. Agents can be set into groups of similar skills as teams by clicking on the teams button 312 on the toolbar 301 and a setup teams window 430 opens (FIG. 37), i.e., a dialog box. Teams are used mainly for reporting purposes and do not affect call routing. while it is not required that a user use this feature, it is very helpful in organizing the call center system. In the dialog box 434, the user can view the present teams, add new teams and delete unused teams. If the user highlights a team listed in the left side of the screen, the agents assigned to that team will appear on the right side of the screen. The user cannot add and delete agents from this screen. That is done by clicking the agents button 314 on the toolbar 301 of the main screen (FIG. 2D).

To add a new team, the user clicks the New Team button 432 and enters the name of the new team in a data entry field (not shown), then clicks OK. The new team name will appear in the setup teams dialog box. To delete a team that is no longer used, the user highlights the team name and clicks the Delete Team button 434. This will not delete any of the agents assigned to the team. However, any agents that were assigned to that team will need to be reassigned to another team.

Figure 38:
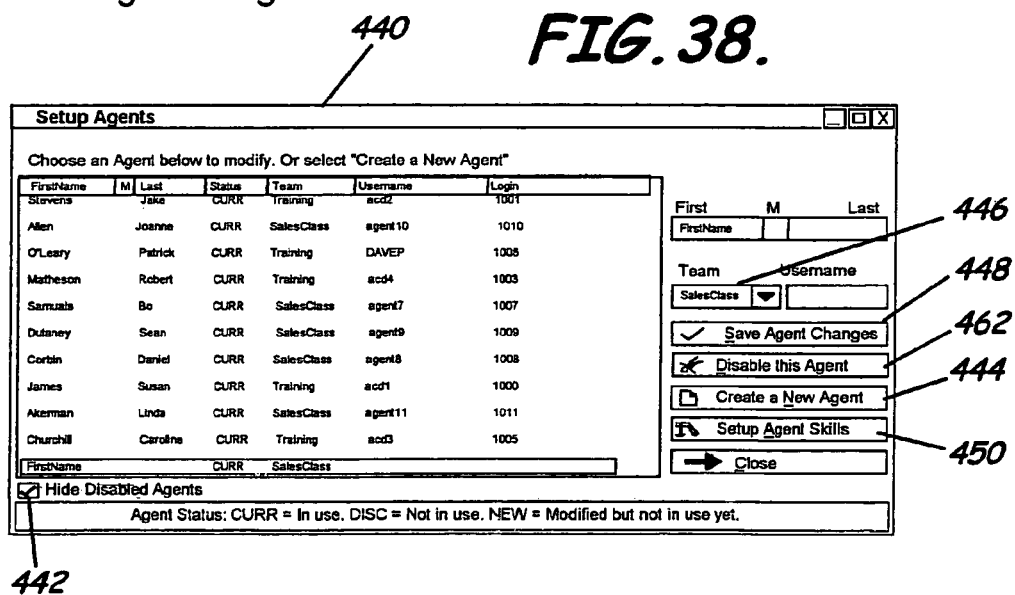
FIG. 38 illustrates a window for adding and setting up new agents.

The final step is to set up all the agents by clicking the agents button 314 on the main toolbar 301. The setup agents screen 440 (FIG. 38) allows the user to add, disable and modify agents and setup the skills for each agent. The user will need to return to the setup agents screen as often as the agents in the call center change and learn new skills. All agents are listed alphabetically on this screen along with their status, team, user name and login.

The status of each agent will be listed as follows
CURR—A current active agent.
DISC—An agent that has been disabled and is no longer in use.
NEW—A new agent that has just been added or modified, but is not yet in use.

To change the view so that only NEW and CURR agents are shown, the user clicks the hide disabled agents field 442. To add a new agent, the user clicks the Create a New Agent button 444. A new unnamed agent will appear at the bottom of the list with a NEW status. The user enters the first name, middle initial (if needed), and last name. The user then chooses a team from the team drop down list 446 and finally enters the agent's user name. The user name is the agent's network login name. The agent's login will be entered automatically after the user clicks Save Agent Changes 448, and the user exited and re-entered the setup agents screen.

To choose an agent's skills and proficiency levels, the user highlights an agent and clicks the Setup Agent Skills button 450. An additional window 452 {FIG. 39) will open where this information can be entered. All available (current) skills that have been added appear in the left field 454. The user may need to scroll down to display all skills. Any of these skills can be added to this agent. Any skills that have previously been assigned to this agent will appear in the center field 456.

To add a skill, the user highlights the skill in the available skills field and clicks the single right arrow. To remove a skill, the user highlights the skill in the selected skills field and clicks the single left arrow. To remove all selected skills from this agent, the user clicks the double left arrow.

For each selected skill, a proficiency level needs to be selected. The proficiency levels are: (1) very proficient; (2) proficient; (3) somewhat proficient (default); and t4} not proficient. The user highlights a skill in the selected skills field and chooses a proficiency level from the field on the right 458. An agent with a level 1 proficiency will be the first to receive a call for any skill. If all agents with level 1 proficiency for a particular skill are on calls, then the first available agent with a level 2 proficiency for that skill will receive the call and so forth down to level 4. Calls will only be routed to agents with level 4 proficiency if there are no other agents available for that skill. After all changes have been made to an agent's skill, the user clicks the Save Agent button 450. If the user closes the screen before saving changes, all changes will be canceled.

When an agent is no longer in use, the user can highlight the agent and click the Disable This Agent button 462 (FIG. 38) such that an agent can be disabled (FIG. 40). The agent's status will change to DISC. The call center system will not completely delete an agent because the agent is still used for reporting and statistical purposes, even after the agent is disabled.

To construct an IVR application or script, the user assembles actions together in a logical order. The actions define what the script does and what the results are for various input parameters. For example, a series of actions may ask a caller to input an account number and a PIN, then compare the entered information with a database to ensure it is correct.

There now follows a brief description of the construction editor for IVR script construction with ACD routing. A more detailed description is set forth later. As shown in the construction editor window 124 of FIG. 13, the first action of a script is always START. Subsequent actions are chosen based on what the user wants the script to do. Each action is connected to at least one next action that determines what happens after the action is completed. Some actions also have additional result actions attached, including a failure result that determines what to do if the action fails.

Figure 13:
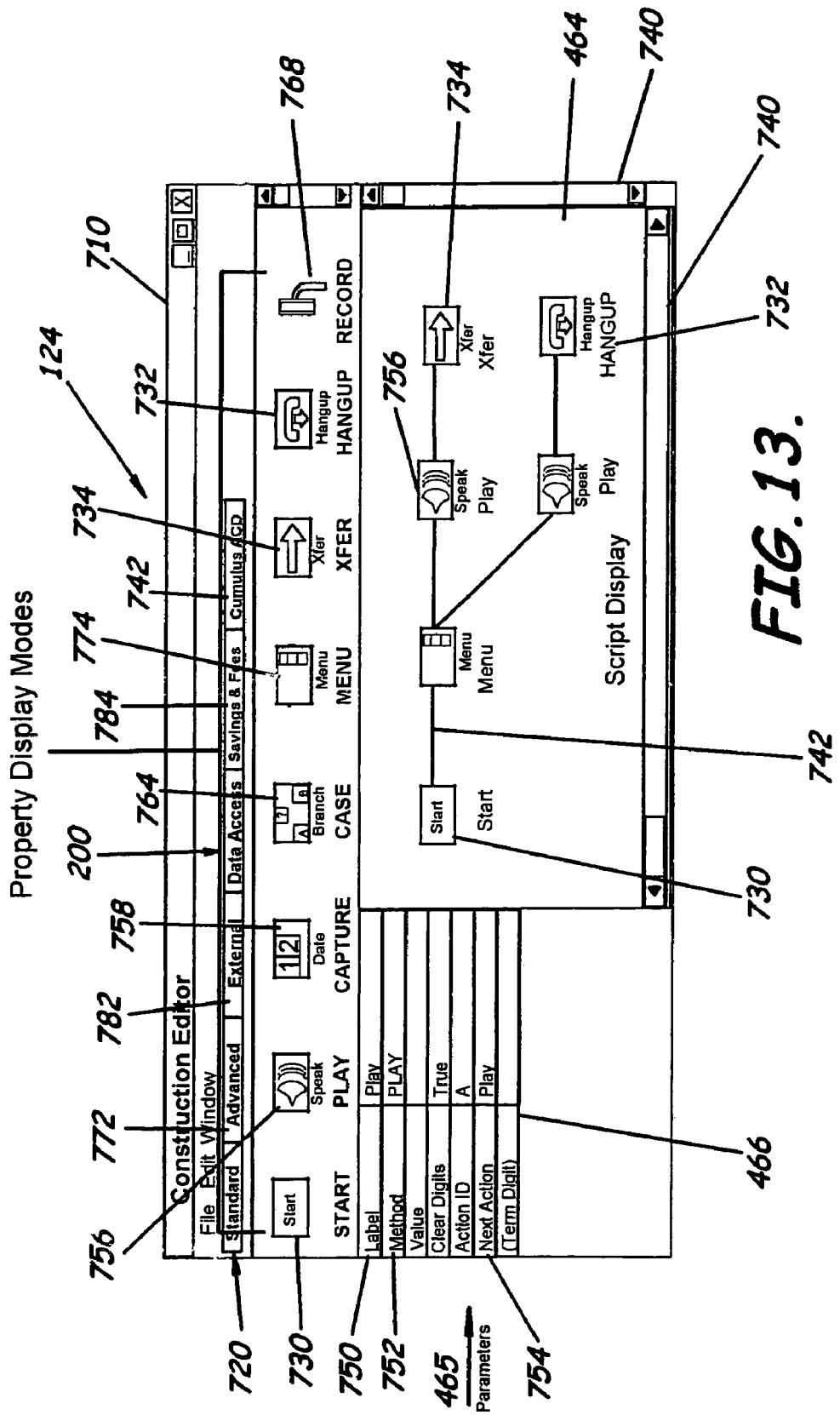
FIG. 13 is another example of the construction editor showing various standard icons and the script display having connected icons for an IVR and ACD script.

Scripts for the IVR system are designed and maintained in the Construction Editor 124 (FIG. 13). The Construction Editor is opened by choosing "edit script" from the file menu on the main screen. At the top of the construction editor is a series of tabs. Clicking on a respective tab displays different sets of actions as will be explained later. The bottom area of the screen has a script display window 464, which displays the script and the parameters for each action used in the script. To use the construction editor, the user selects and drags an action from the top area to place it in the bottom area defining the script display 454. When an action in the bottom area is highlighted (selected), a list of parameters 465 appears in the left screen portion 466. These must be set up correctly in order for the script to work. A coloring scheme is also possible. When one action is linked to another in the script display, a blue or red line will connect the two icons.

Blue Line—The path or direction that the script will follow is from left to right.
Red Line—Signifies right to left.
Dashed Lines—Used to indicate result action paths and follow the same color conventions as solid lines.

To attach an action's next or result action, the user drags the source action and drops it an the destination action. This will open a dialog box where the user can select conditions for the branch (shown figure). The default next action is automatically selected.

To attach an alternate result action, the user selects the resulting condition from the dialog. Each action has its own set of possible resulting conditions. If a condition other than the default has already been assigned, the condition will appear shaded but is not disabled. When an action results in a condition that is not attached, the default action will follows.

To unlink an action from a destination action, the user right clicks over the icon and selects "remove link." A sub-menu appears listing any attachments. The user selects the attachment to remove.

Figure 41:
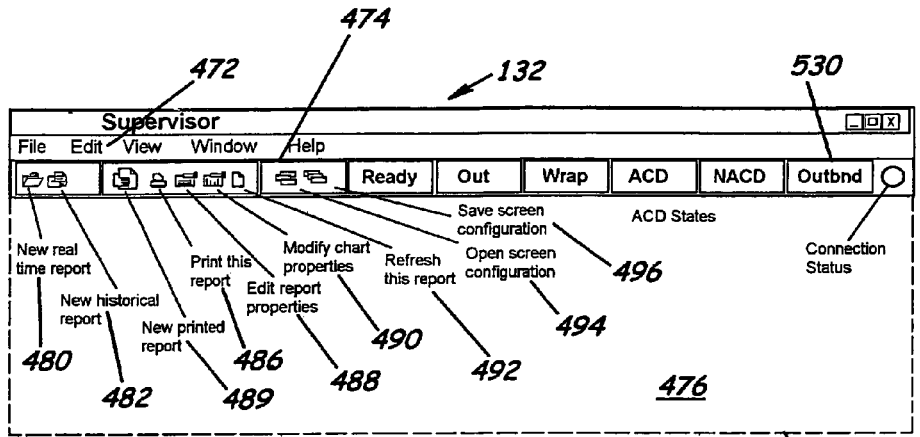
FIG. 41 illustrates the main screen for the ACD supervisor application with the various toolbars and menus.

The call center system 100 of the present invention uses a Supervisor interface 132 as shown in FIG. 41, which gives managers the tools and information they need to analyze and manage the call center. The supervisor interface 132 can be operative with the supervisor server 116 that communicates with ACD server 110. The supervisor 132 has three main functions: (1) present real time displays of call center activity and productivity; (2) generate custom historical displays and reports for analytical processing and decision support; and (3) measure and grade call center functions and produce exception reports based on results.

The supervisor function also works in conjunction with the call center system to allow customers, i.e., callers, to rate directly the agents and call center. For example, on a small percentage of calls, on all calls, or on whatever percentage is desired, the caller is prompted to stay on the line after the call to rate the agent and call center service. The agent handles the call, which can also be recorded. This recording can be established in the script flaw. After the agent completes the transaction, the agent disconnects and the call is automatically transferred back to the IVR server to allow the customer to rate the service. For example, the IVR server may prompt the caller to press a 1'1" if the agent and call center operation have been excellent, or press any number between 1 and 5, where 5 would be terrible service and operation. If the customer presses "5" for terrible, the call can immediately be "barged" or directed to a supervisor located at the supervisor station where the supervisor then can orally question the caller for further information concerning the terrible service. At the same time, the supervisor can obtain historical and real time reports via the ACD and SQL server and associated database such that the supervisor can "instantaneously" see how callers are rating the service.

Figure 41A:
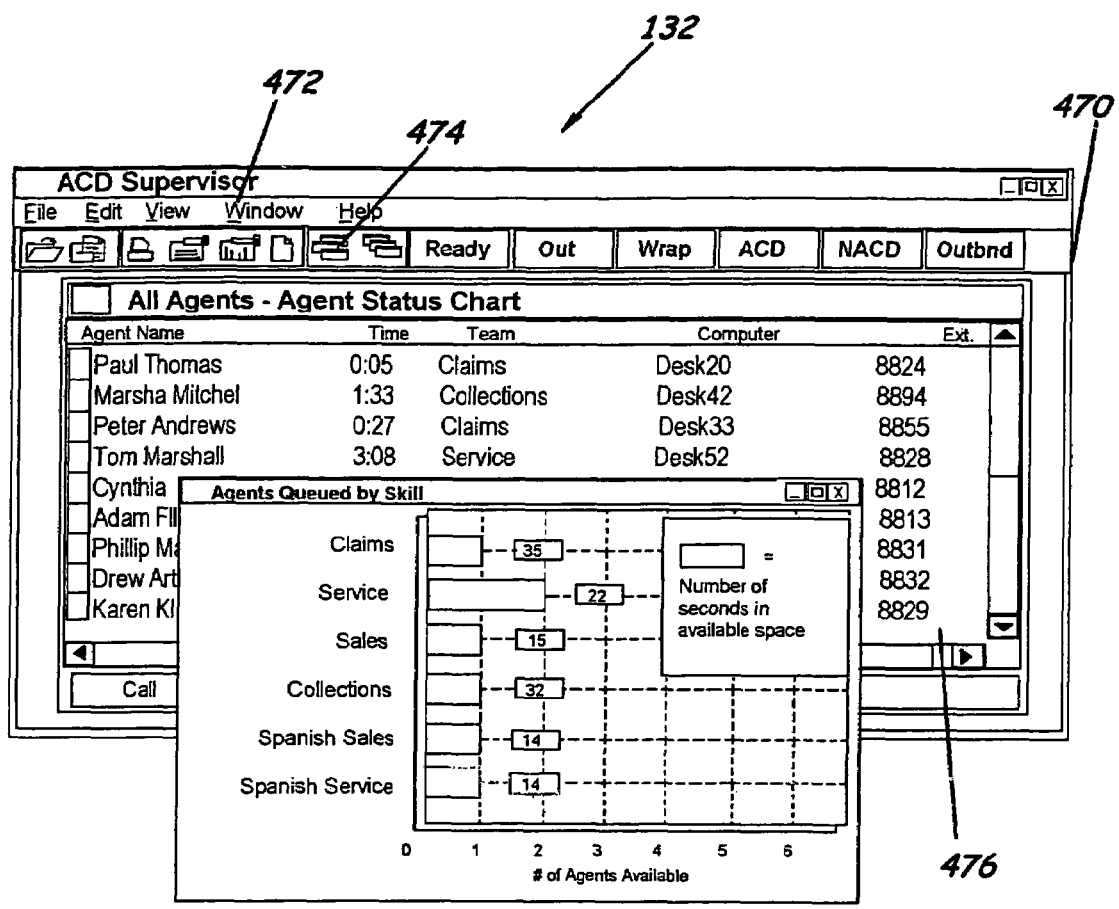
FIG. 41A illustrates the main window for the ACD supervisor, together with an open window for the agents queued by skill chart.

The main screen 470 for the supervisor graphical user interface has a series of pull-down menus 472, a toolbar 474 at the top and a large window 476 for displaying information below the toolbar, as shown in FIGS. 41 and 41A. FIG. 41A shows several windows displaying different reports and graphics open at the same time. All functions can be accessed from the menus 472 or from the buttons on the supervisor toolbar 474. When the mouse cursor is moved over a button, a tool tip will appear, giving a short description of that button. Toolbar buttons include: new real time report 480; new historical report 482; new printed report 484; print this report 486; edit report properties 488; modify chart properties 498; refresh this report 492; open screen configuration 494 and save screen configuration 496.

Figure 42:
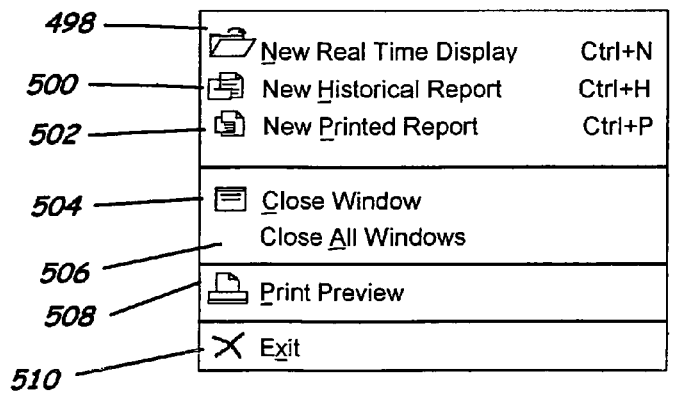
FIG. 42 illustrates the File menu for the ACD supervisor application.

The pull-down file menu includes a series of different functions as shown in FIG. 42. The new real time display function 498 displays various on-screen reports that show a real time reference of activity, updated every two seconds. To use this feature, click on the button, then choose a report from a list that appears. This feature can also be accessed by clicking the New Real Time Report button 480 on the toolbar.

The new historical report function 500 displays on-screen historical reports showing activity over a user-definable time period. For example, it is possible to track pre-holiday call volume by displaying a report of all calls that were received for a particular skill between Thanksgiving and Christmas. This feature can also be accessed by clicking the New Historical Report button 482 on the toolbar.

The new printed report function feature 502 is operative to allow reports to be printed in graph format. The close window function 504 closes the currently highlighted window. The close all windows function 506 closes all currently open windows. The print preview function 508 displays a preview of the currently selected report and allows you to print the report as it is displayed. This feature can also be accessed by clicking the Print This Report button on the toolbar. The exit function 510 exits the application.

Figure 43:
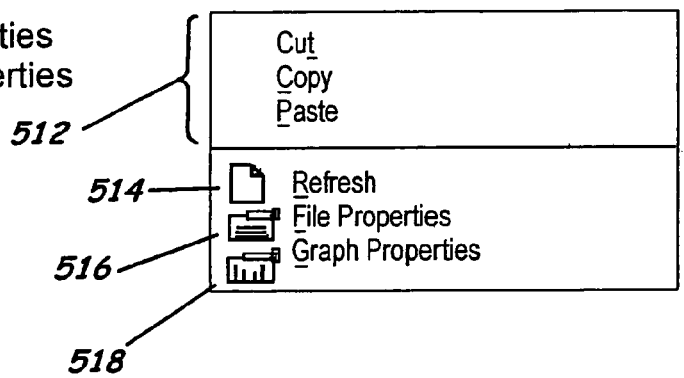
FIG. 43 illustrates the Edit menu for the ACD supervisor application.

The edit menu (FIG. 43) includes various functions and tools to edit entries. The cut, copy and paste functions 512 are standard windows features. The refresh function 514 updates the currently highlighted report to reflect the most recent activity. This feature can also be accessed by clicking the Refresh This Report button 492 on the toolbar. The filter properties function 516 changes the properties of the currently highlighted report. The properties that can be changed are different depending on which type of report is highlighted. These properties include items such as the skills, DNIS's or agents to be displayed, the time period to display (for historical reports), and which data to display. This feature can also be accessed by clicking the Edit Report Properties button 488 on the toolbar.

The graph properties function 518 changes the way the reports are displayed. The different types of display includes items such as the type of chart to use (bar, pie, Gantt, etc.), the style of the chart (31D, 2D, etc.), the colors of the chart and many other properties. This feature can also be accessed by clicking the Modify Chart Properties button 490 on the toolbar.

Figure 44:
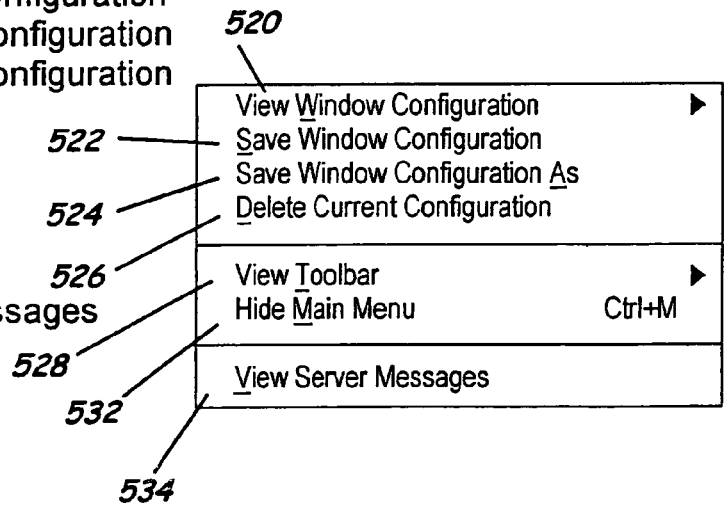
FIG. 44 illustrates the View menu for the ACD supervisor application.

The view menu (FIG. 44) has several advantageous functions. The View Window Configuration function 520 opens a list of previously saved window configurations. The user chooses the configuration needed from a fly out menu. This feature can also be accessed by clicking the Open Screen Configuration button 494 on the toolbar 474.

The Save Window Configuration function 522 saves the currently displayed window configuration. If it has not been previously saved, the user will be prompted to give it a name. If it has previously been saved, then any new changes made will overwrite the previous configuration. This feature can also be accessed by clicking the Save Screen Configuration button 495 on the toolbar.

The Save Window Configuration As . . . function 524 saves the currently displayed window configuration using a new name. It is used if an existing configuration has been altered and it is desirable to save it without writing over the original configuration. The delete current configuration function 525 deletes the current configuration. The view toolbars function 528 hides or displays the two toolbars. The standard toolbar includes the nine buttons that activate various features as described above. The ACD states toolbar 530 (FIG. 41) is a legend showing the colors that each ACD state will be displayed within the various report charts, such as Ready, out, Wrap, ACD, NACD and Outbound. The hide main menu function 532 removes the main menu from the screen, leaving more room to display reports. The view server messages function 534 displays a real time report of server activity used for debugging purposes.

Figure 45:
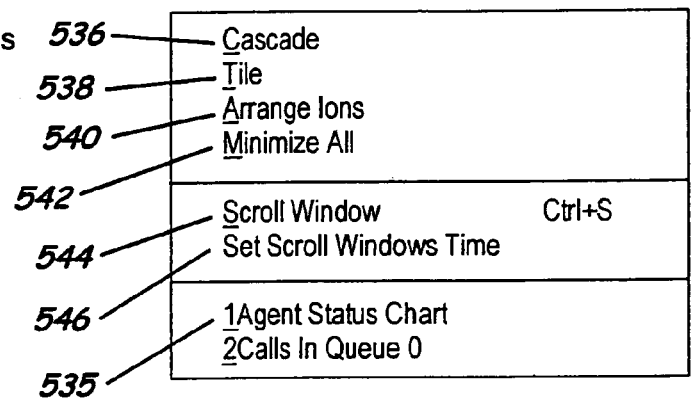
FIG. 45 illustrates the Windows menu for the ACD supervisor application.

The window menu (FIG. 45) also has several functions for the Supervisor. The window menu gives options for displaying any windows that are open. At the bottom of this menu is a list of all open windows. A check mark 535 is displayed next to the active window. An inactive window can be brought to the foreground by choosing it in this menu. These functions are often used in many different Windows™ applications.

The cascade function 536 displays all windows in a cascading manner with all title bars showing. This allows a user to quickly click from one window to the next. The tile function 538 uses all available space on the screen to tile all open windows. This allows a user to see all windows without clicking from one to the next. Arrange icons function 540 can be made operative by clicking the small "–" in the top right corner of the window, which will minimize the window to an icon state, as is known to Windows™ users. Choosing arrange icons will arrange all icons into rows on the bottom of the screen making it easy to choose between the available open windows.

The minimize all function 542 minimizes and arranges all open windows. The scroll windows function 544 scrolls between the open windows. This feature is useful it too many windows are open to easily fit on the screen. When scrolling, each window will be brought to the foreground for a set period of time (see next item), before scrolling to the next window. The set scroll windows time. . . function 546 sets the amount of time, in seconds, that each window will be displayed before scrolling to the next.

As noted before, the call center Supervisor server 316 of the call center system of the present invention communicates with the ACD server 110 via a TCP/IP link. The ACD server can send out updates every 1-5 seconds (by default) describing status changes of agents and incoming calls. The Supervisor server 116 through the Supervisor software application calculates and stores the information for viewing. The following real-time monitors can be available (Viewed by team, agent, DNIS, skill or entire call center): calls answered; calls abandoned; talk time; agent status; calls in queue; and agents in queue.

The Supervisor application 132 allows a user to open as many of these views as they desire. For example, the user may need to have an answer chart open for customer service, technical support, order entry English speaking and order entry Spanish speaking. The Supervisor will remember which views have been used and automatically re-open them on start up. To save screen space, the Supervisor application can be set to scroll through reports. To do so, the user selects the reports to be viewed and sets the scroll timer. The timer will scroll through each report, presenting a view of each report in sequence.

Figure 46:
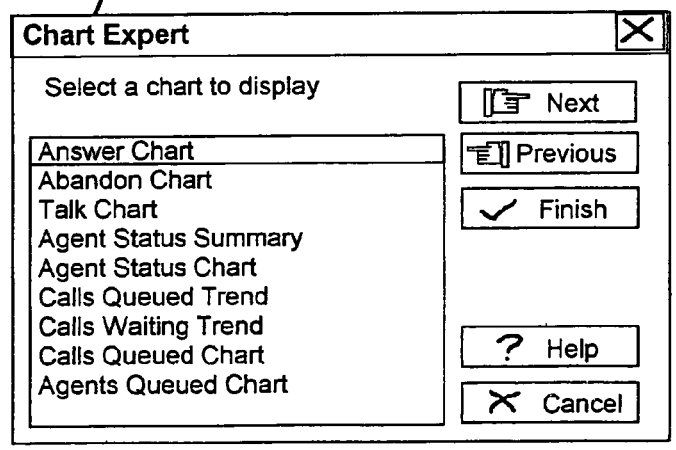
FIG. 46 illustrates one version of a chart expert window used for real-time reporting of various events of the call center system.
Figure 47:
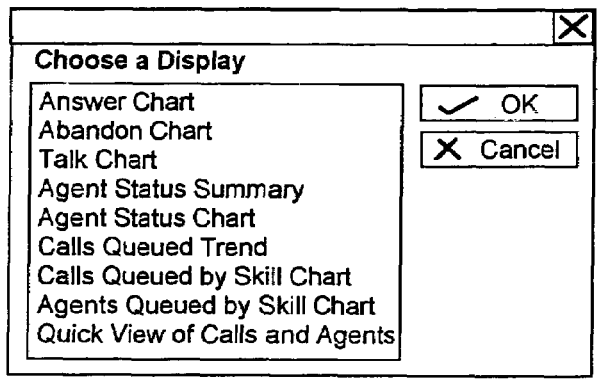
FIG. 47 illustrates another version of a chart expert window for selecting various charts.
Figure 48:
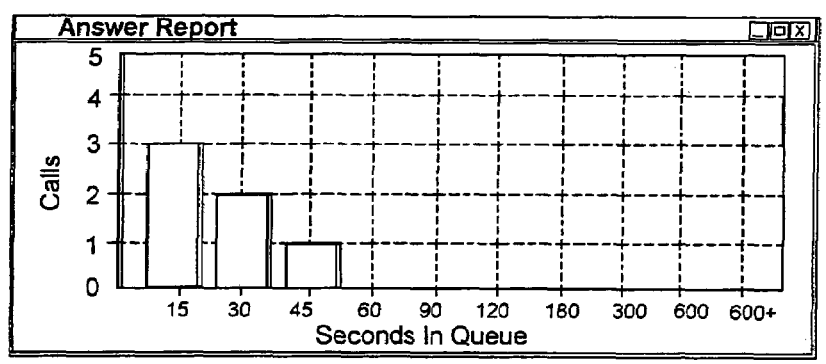
FIGS. 48-56 illustrate windows having charts and real time reports.
Figure 49:
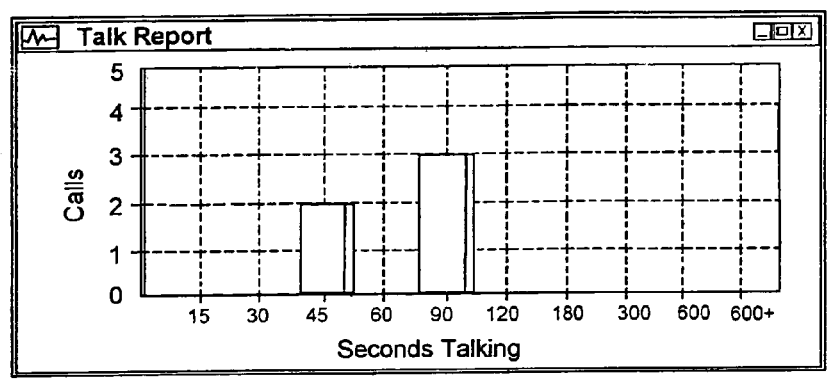
Figure 50:
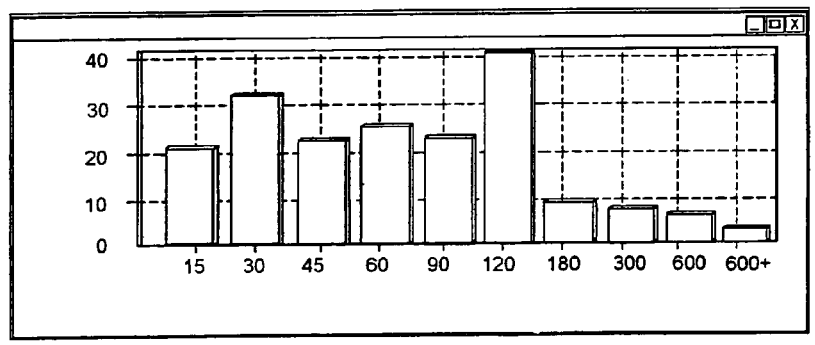
Figures 51, 52:
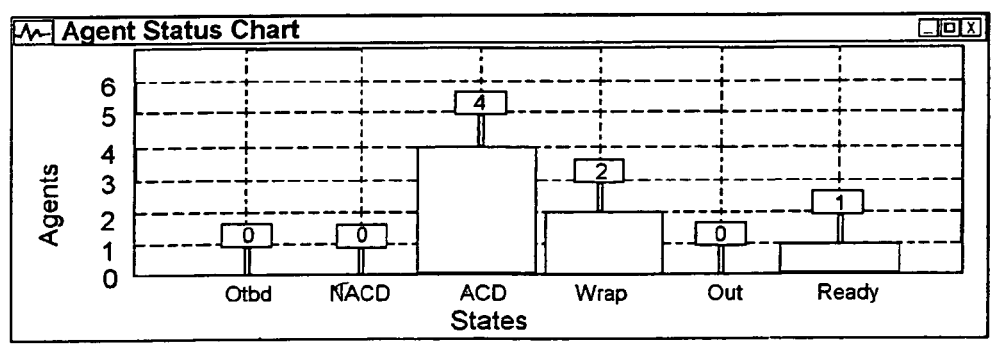
Figure 53:
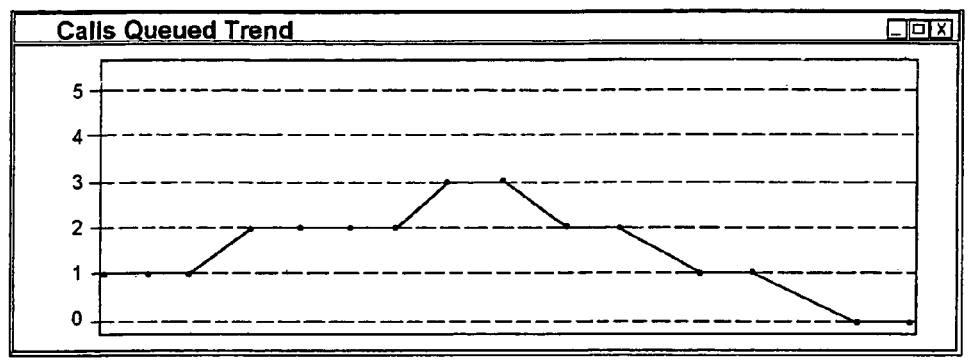
Figure 54:
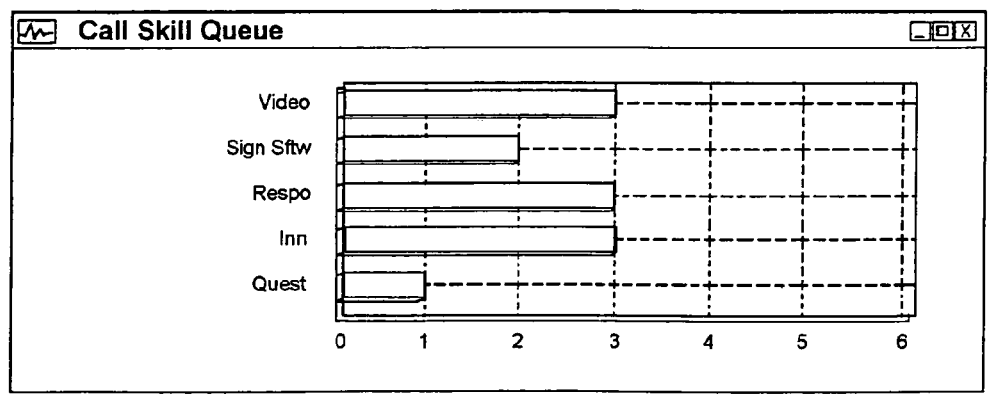

When the user clicks the New Real Time Report button 480 on the toolbar or chooses new real time display (Ctrl-N) in the file menu, a dialog box entitled Chart Expert 550 (FIGS. 46 and 47) will open having reports, which can be displayed. The user highlights the report needed, and selects OK to display the report. The reports are: answer chart; abandon chart; agent status summary; agent status chart; calls queued trend; calls queued by skill chart; agents queued by skill chart; and quick view of calls and agents.

The answer chart (FIG. 48) displays the length of time the calls received over the previous fifteen minutes were in queue before they were answered. The talk chart (FIG. 49) displays the talk time of current calls. The abandon calls chart (FIG. 50) displays the length of time that calls received over the previous fifteen minutes were in queue before they were abandoned. Displays the talk time of current calls. The agent status summary (FIG. 51) displays each agent's name, current state, amount of time in the current state, team and other information. The agent status chart (FIG. 52) displays the amount of agents in each of the various states. The calls queued trend chart (FIG. 53) displays the number of calls in the queue over the previous 2~minutes. The calls queued by skill chart (FIG. 54) displays number of calls in queue for each skill. The agents queued by skill chart (FIG. 55) displays how many agents are in queue for each skill.

The Supervisor application of the present invention allows a menu window entitled quick view of calls and agents (FIG. 56), which displays a simplified view of calls and agent status. The large number in the upper left displays the number of calls in queue 552. The time figure in the upper right displays the length of time that calls have been in queue 554. The row of numbers 556, preferably colored, displays how many agents are in each state. The colors can correspond to the color legend on the ACD states toolbar 530 as described before. A number, preferably black, at the far right of the row displays the total number of agents logged on.

The Supervisor application of the present invention, every 15 minutes (or as configured with the switch) has the ACD server write out statistics to the historical database 124 of the SQL server 118. Managers are able to view, drill, filter the presentation of these statistics and retrieve reports from this database using the same flexible supervisor platform that provides the real-time reporting.

Figure 57:
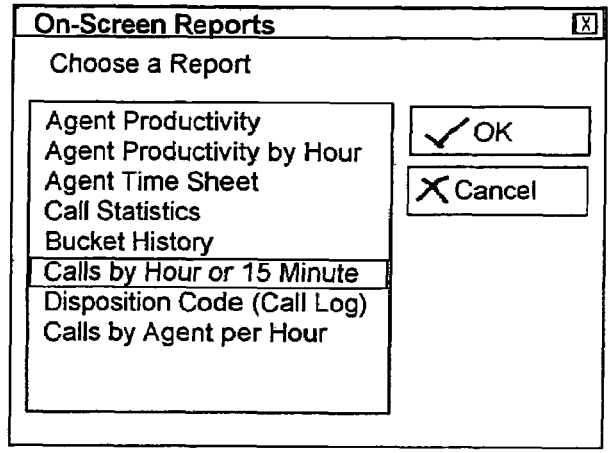
FIG. 57 is a window showing a list of historical reports.
Figures 60, 61:
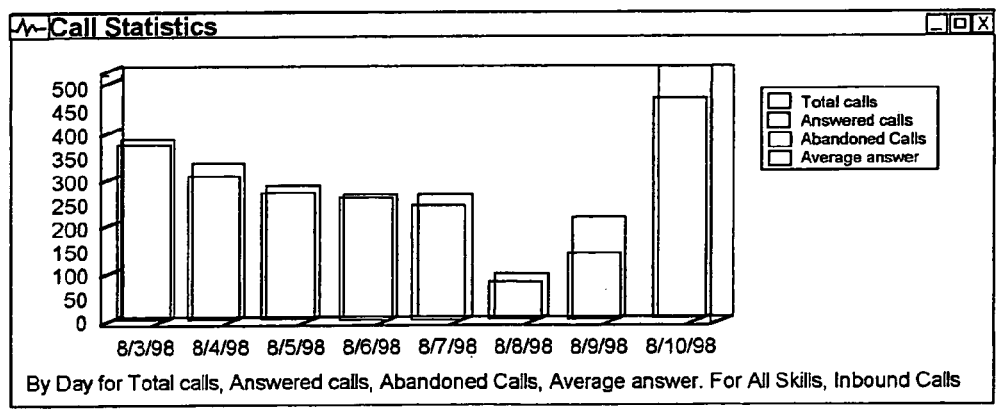
Figure 62:
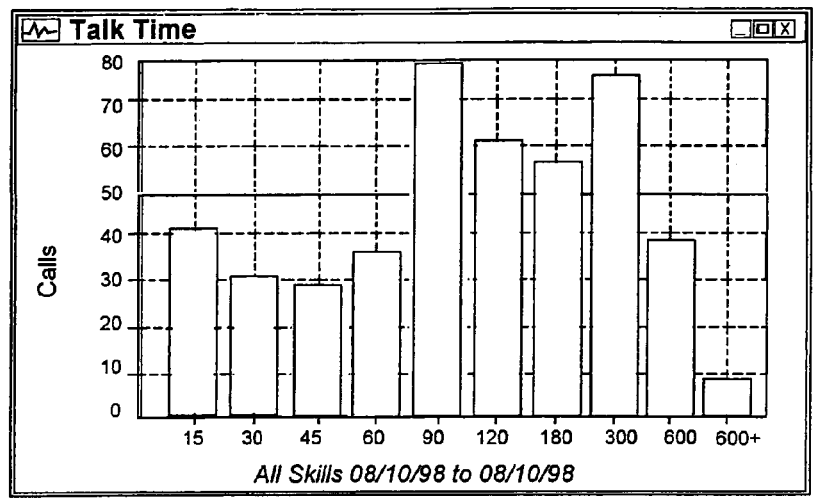
Figure 63:
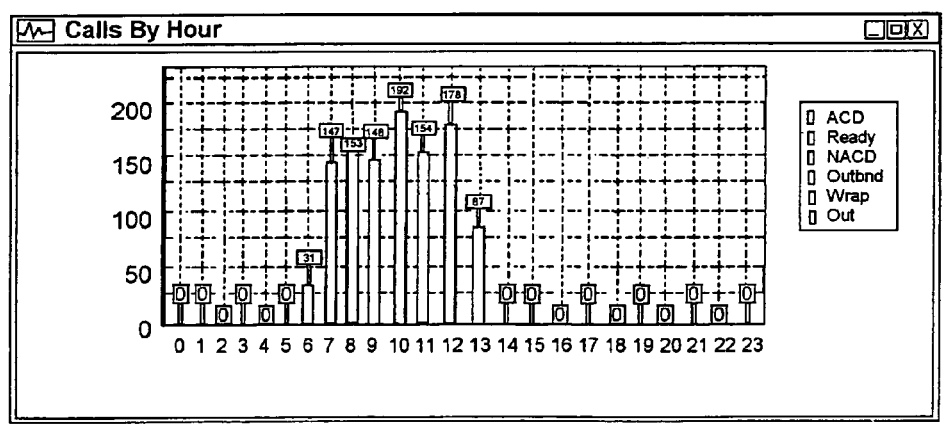
Figure 64:
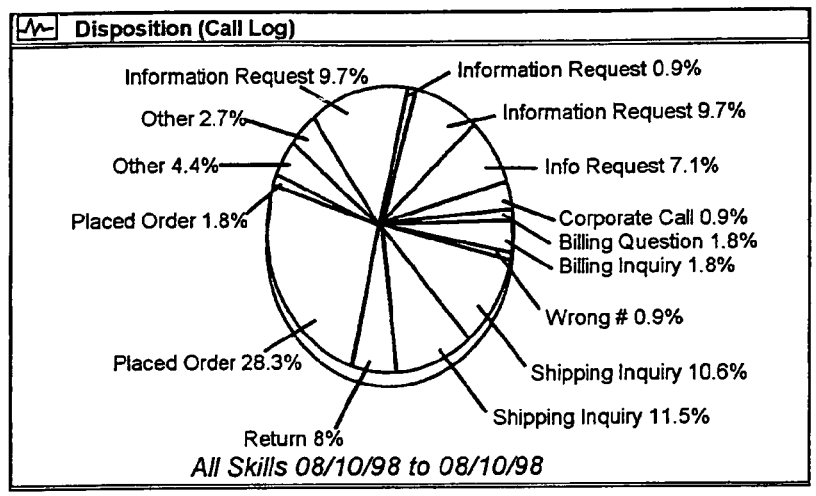
Figure 65:
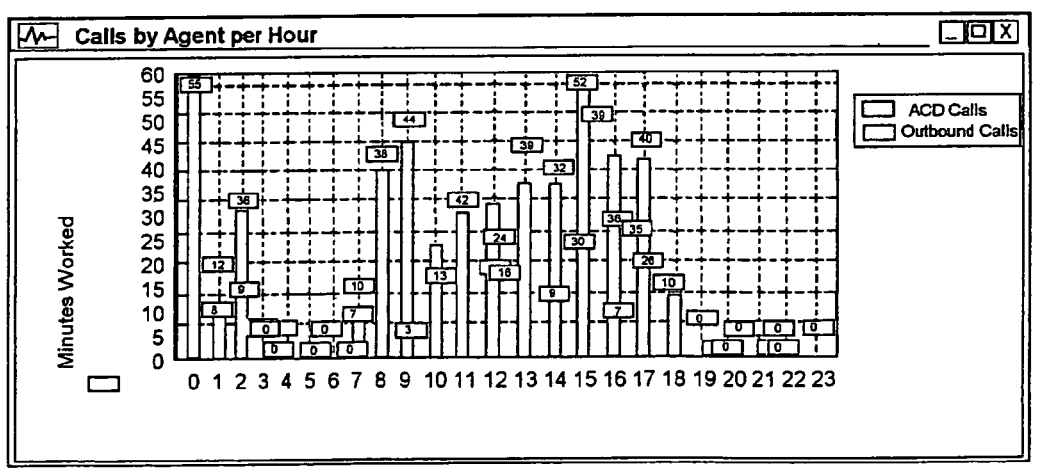

The following categories are available for custom on-screen reporting as shown in FIG. 57: agent productivity; agent productivity by hour; agent time sheet; call statistics/history; bucket history; calls by hour or fifteen minute; disposition code (call log), and calls by agent per hour.

Agent productivity (FIG. 58) displays the percentage of time that the selected agents were in various states. Agent productivity by hour (FTG. 59) displays agent statistics in hourly increments. Agent time sheet (FIG. 60) displays when the first agent "logged in" in the morning, when the last agent "logged out" in the evening and the total number of hours that all agents were "logged in" during the day. Total hours for the time period and average daily hours are displayed in the bottom text information area 560.

Call statistics (FTG. 61) displays different call statistics for a selected time period. Setting the report properties gives many different options, such as total calls, answered calls, abandoned calls and average answer time, among others. The time period to display, agents and other information to display can also be set. Bucket history (FIG. 62) displays answer time, talk time or abandon time for the selected time period. Calls by hour or fifteen minute (FIG. 63) displays various call statistics over a selected date range in either hourly or fifteen minute increments. Disposition code (call log) (FIG. 64) displays a log of all calls over a selected date range. For this to be accurate, a system must be in place so that all calls can be logged by type of call (disposition). Calls by agent per hour (FIG. 65) shows the total number of calls by respective agents per hour.

The call center system of the present invention also includes a software agent phone interface, i.e., dial pad application 140 (FIG. 66), which is preferably a Windows 95, 98 or NT client application residing on the agent's PC. It is a flexible, non-obtrusive graphical user interface design and is easily minimized and can be keyboard or mouse driven. It can be multilingual. It has speed dial pull down lists and automated call code entry. Agents can quickly view their productivity with text based and graphical statistics. The soft phone requires minimal desk space (i.e., a headset and compact dial pad) and is easily customized to work with popular help desk applications such as Remedy. The dial pad has three main functions: (1) to act as an ACD phone; (2) present information and statistics to the user; and (3) send messages to other windows applications.

The dial pad 140 gives users the information required to measure their performance. The following types of information are available for viewing on the dial pad: 1) total ACD calls taken at the particular day; 2) total outbound calls placed at that day; 3) total inbound non-ACD (NACD) calls taken at that day; 4) average talk time for ACD, outbound and NACD calls taken that day; 5) calls in queue for the call center; 6) calls in queue charted for the last 15 minutes; 7) longest call waiting in queue; 8) time spent in the current state; 9) service level for the call center (e.g., percent of calls answered in 30 seconds); 10) percent of time spent in each state (ACID, ready, out, wrap, outbound); 11) personalized speed dial numbers; and 12) current skills and proficiencies.

Dial pad 144 also has the following historical information available for the user who is logged in: 1) time card data; 2) upcoming work schedules; 3) call log; 4) customized speed dial list; 5) last ten outbound dials; and 67 current skills and proficiencies.

Dial pad has three ways of placing outbound calls: 1) direct dial, 2) speed dial, and 3) smart dial. In direct dial, the user keyboards the number in and hits dial (just like a cell phone). Characters are automatically converted to numbers (e.g., 1800-FLOWERS equals 1800-3569377). A list is kept of the last ten numbers dialed so that the user can quickly redial.

In speed dial, the dial pad has a drop down list that shows the names a user has previously set up. A user can click one of these names and the number is dialed. Whenever the user logs in, the user will obtain their own speed dial list.

In smart dial, the dial pad will automatically dial and track numbers of an outbound campaign. A database table is populated with names and numbers for a campaign. Dial pad requests the next number and the ACD server 110 dispatches it to the user. The dial pad user identifies the result of the call. The ACD server is notified and reclassifies the number accordingly. Smart dial is not as powerful as a predictive dialer, such as those dialers known to those skilled in the art, but a smart dial application enhances an agent's ability to manage an outbound campaign.

Dial pad will also locate another agent (who is logged in) for the station. A user types 11@11 and the agent's user name (e.g., @RickW) and dial pad determines the extension where they are logged in and rings that phone.

The LED 600 is used for the primary display of data. The dial pad keys 602 provide fourteen (14) fixed function keys and a standard dial pad.

Upper and lower information panels 604, 606 provide call and state information and agent statistics. The lower panels 606 of the dial pad remain visible regardless of which tab is showing. Both panels also remain visible when the auto-hide feature is activated. There are two information panels: upper and lower 604, 606.

The upper panel 604 has information about incoming and outgoing calls. Skill names are listed in a skill name field for incoming ACD calls to help the user answer calls appropriately. Dialing XXXXXXX displays the number that is being dialed for an outgoing call. A "conversation . . . " text appears while an outgoing call is in progress. An "unavailable . . . " text appears when a user's phone is not plugged in properly.

Call and state information and agent statistics is displayed on the lower panel 606. The time is listed in a current state field 610, and indicates how long the agent has been in the current state, including incoming or outgoing calls. This will restart as the state changes or in new call begins. A number of calls in queue field 612 indicates how many callers matching the agent's skills are waiting in queue.

A longest wait in queue field 614 indicates how long the first caller matching the agent's skills has been in queue. The current state field 616 indicates which state the agent is currently in. A green light 618 indicates connectivity, i.e., the station is connected to the server, and a red light indicates that the server is down or the station is otherwise not connected.

As noted before, the dial pad keys 602 include various function keys. Xfer 628 allows the agent to transfer an incoming or outgoing call to another party. The user enters the number of the new party in the data screen, clicks Xfer, and after announcing the call, clicks Xfer to connect the two parties. To abort the transfer, the user clicks restore (hold).

Mute 662 allows the user to mute his/her voice from the caller. This does not place the caller on hold. To cancel, the user presses mute again and redial 624, i.e., redials the last dialed number.

Conf 626 adds multiple parties to a conversation. During an existing call, the user enters the additional number in the data screen, clicks Xfer 620, and after announcing the call, clicks Conf 526 to add the new party to the conversation.

Hold 628 places an incoming or outgoing call on hold. The button changes to Restore while the call is on hold. The user clicks Restore to return to the call. Restore takes a call off hold. Cancel 630 allows the user cancel both incoming and outgoing calls. The Cancel function can also be used with Xfer 620 and Conf 626 to transfer calls or add additional parties to a conversation.

Dial 632 allows the user to enter a number in the data screen and dial the number. Return and enter on the computer keyboard are the same as clicking dial. To enter a number, the user clicks on the dial pad numbers with the mouse or types the numbers using the computer keyboard. For a number such as 123-ACME, the hang up or agent can simply type the corresponding letters on the computer keyboard.

Ready 634 places the station in ready sate, allowing the agent to accept calls. Other tabs could include wrap, which places the station in wrap states. Wrap is a temporary work state to use while finishing up call-related activities. Restore takes a call off hold. "Log on" logs the station onto the server at the beginning of the agent's shift. A password or agent number may be required. "Log off" logs the station off the server at the end of the agent's shift. To log off while in ready or wrap state, the user first clicks out 636, and then log off.

Figure 67:
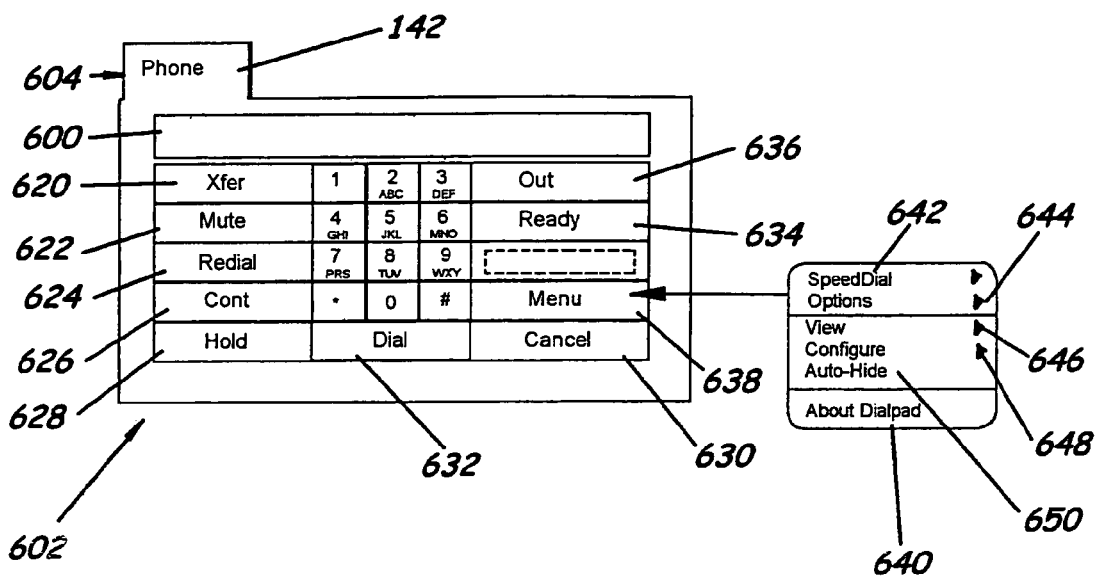
FIG. 67 shows further details when the phone tab is selected and the menu option is pressed.

Menu 538 opens up an additional menu of options. Clicking anywhere on the dial pad with the right mouse button will also open the options menu 640, as shown in FIG. 67. Speed dial 642 saves the last number and allows the agent to save the last number dialed into the speed dial list. A dialog box will open asking for the name to use with the number. By editing entries in a window, the agent can add, delete and edit entries in the speed dial list found on the speed tab. There are also various options 644 available, but not illustrated. These are included in the window that opens clicking options.

A forward option forwards all calls to another extension. A window will open to enter the extension for calls to be forwarded. A forward or no answer option is the same as forward, but only forwards if there is no answer (e.g., if the agent is away from the desk or on another call). A clear forward option cancels call forwarding. The set message option allows the agent to enter a short message that will be displayed on an internal caller's telephone when they call the agent's extension (e.g., gone to lunch or in staff meeting). The clear message option clears the message the agent has entered.

The view 646 option has several functions including a skill list that lists the skills that the agent has been trained to perform. A call log function displays a log of all call activity for the agent showing type of call, time that the call was made, customer, skill, DNIS, handling time, length of the call and the call status. A call queue opens a chart showing the number of calls currently in queue.

The configure 648 option allows the agent to modify station configuration settings such as distinctive ring and auto-hide position for the dial pad. Configure also contains a debugging tool for troubleshooting. other configure functions that are part of a pull-out menu may include:

1. Set Ring Sound File—If the station is set to ring through desktop speakers, this will allow the agent to choose a wav file for the station ring so he/she can discern his/her station's ringing from others.

2. zest Ring—Plays back the wav file that was chosen for the station's ring.

3. Set Auto-Hide Position—Sets the location where the dial pad will reside when in auto-hide mode. The user can enter the number of pixels from the left edge of the screen.

4. Open Debug Window—Opens a window showing a log of all station activity. This is used by system administrators to trace down problems.

The auto-hide configuration 650 allows the dial pad to become a drop down toolbar while another program is used. Dial pad will still show the bottom two panels of information and will return to its full state when the mouse cursor moves over it.

Figure 68:
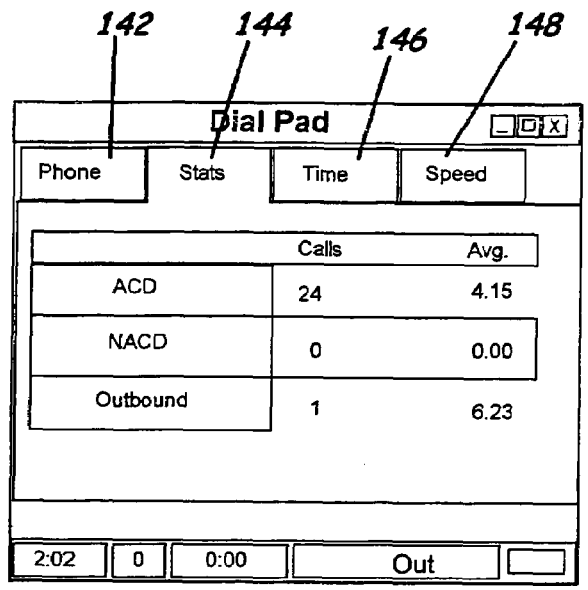
FIG. 68 shows details of the stats tab.

The Stats tab 144 shows the stats (statistics) (FIG. 68) and provides the agent with information on total ACE) calls, total non-ACID calls, total outbound calls, and total amount of average time spent on each type of call.

Figure 70:
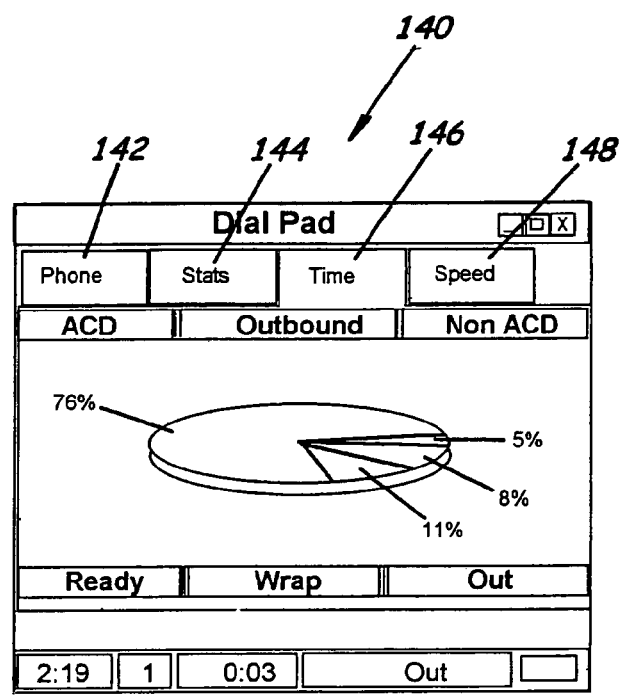
FIG. 70 shows details when the time tab is selected.

The Time tab 145 (FIG. 70) shows a pie chart of time spent in the various states, including ACD, outbound, non-ACD, ready, wrap and out. Automatic call distribution are calls that are automatically routed to the agent based on agent skills and caller queue time. Outbound calls are any outgoing calls made by the agent. NACD (non-ACD) calls are calls that were placed directly to the agent or were transferred to the agent from another station.

Figure 69:
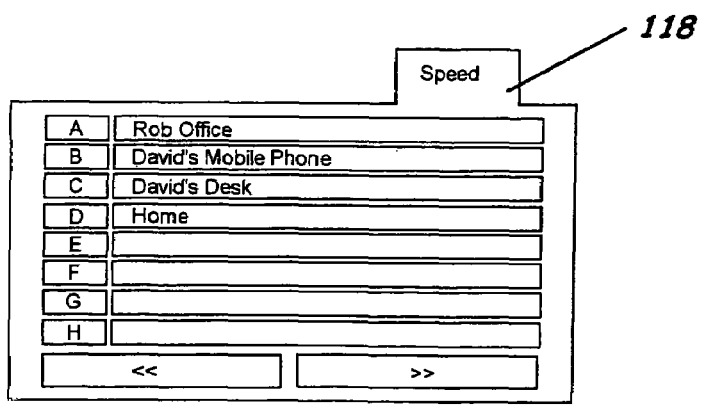
FIG. 69 shows details when the speed tab is selected.

Speed tab 148 (FIG. 69) opens a list of speed dial numbers. These are numbers that the agent frequently calls from the station. The user clicks on the letter next to the name to dial that number. These numbers can be edited in speed dial which is accessed from the menu button on the phone tab.

There now follows a more complete description of an example of the type of graphical user interface (GUI) and interactive voice response (IVR) functions that are used with the ZVR server 108 and ACD server 110. The graphical user interface used with the IVR scripting is the interface used for the ACS scripting functions as described above. Thus, in accordance with the present invention, the scripting for the ACD and IVR are done together as compared to prior art systems where scripting for an IVR was separate from any ACID routing.

The IVR functions, in one aspect of the present invention, can consist of three primary components: (1) IVR server or service; (2) IVR administrator; and (3) IVR script editor.

The IVR server can operate on a Windows NT server as illustrated, which allows the system to operate with minimal user intervention and allows the system to automatically restart without requiring the administrator to log back into the system. The IVR administrator is an interface to the IVR server 188 and provides the tools to configure, monitor, initiate and terminate the IVR server. As noted before, the GUI interface used for the IVR administrator software can be the same as the GUI interface used for the ACD software.

Figure 71:
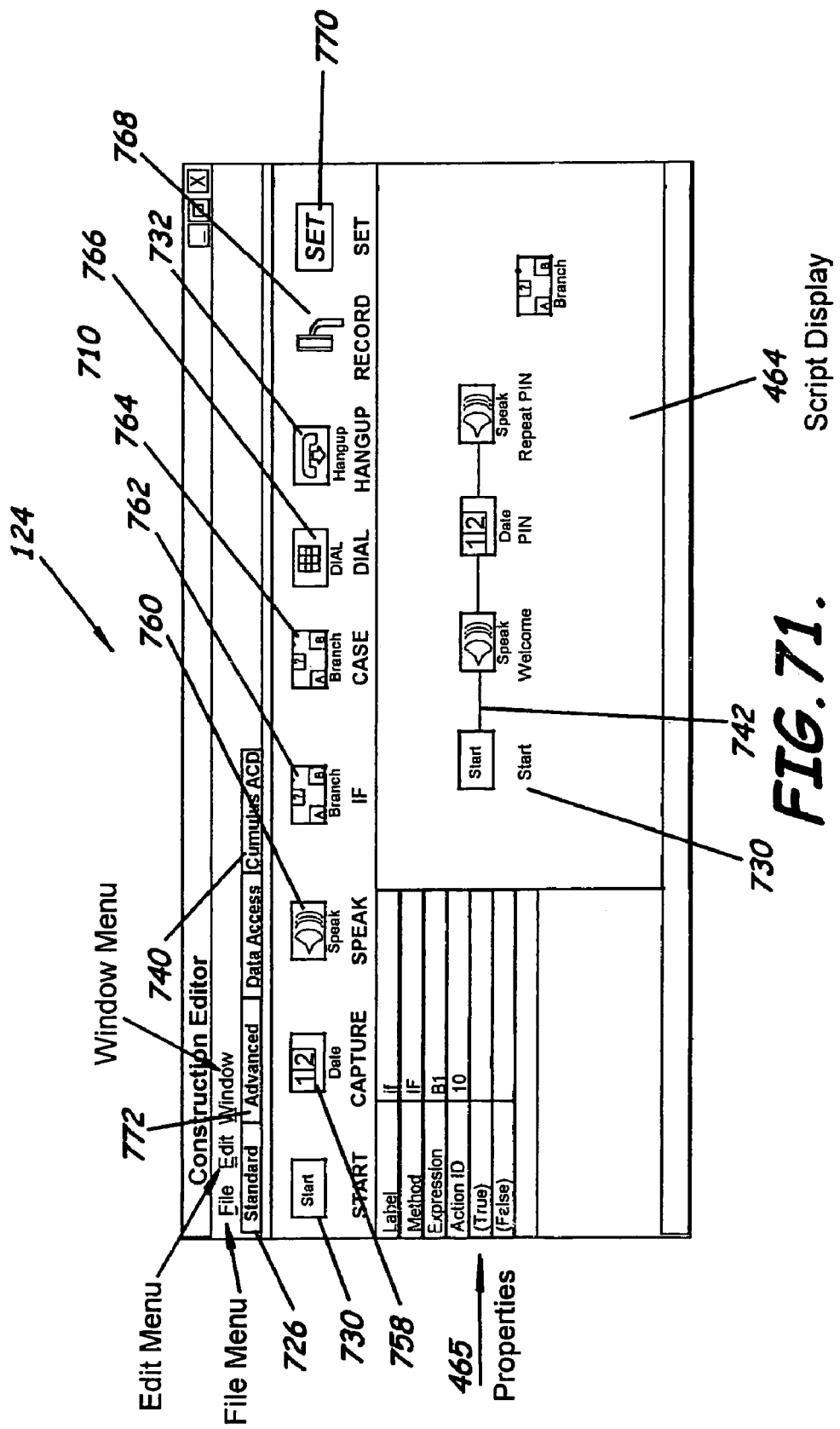
FIG. 71 shows the main menu window for the IVR construction editor with the script display and properties area.

The IVR administrator application provides a GUI interface to the IVR server, providing the tools to configure, monitor, initiate and terminate the IVR server. The various drawing figures in FIGS. 2, 13 and 71 show different icons that can be used for constructing and editing scripts. The IVR administrator application allows the user to define the number of lines to be defined within the IVR server and the number of allowable ports, which can be configurable and dependent upon the maximum number of licenses purchased in a desired commercial setting. Each IVR line can be configured as either a digital or an analog line, dependent upon the type of hardware configuration purchased. Under certain configurations, it is possible for a single IVR server to support. both digital and analog lines.

Routing scripts can be assigned to each line individually, or to the entire group of lines in order to define the routing treatment that callers are to receive when they are being processed through the IVR server. This routing treatment may include the transfer to another dialed number. The IVR administrator application allows the user to configure the transfer characteristics of a trunk to trunk transfer via an IVR.

The IVR ports can be monitored via a display (not shown), which could be color coded. The colors could toggle as different line events occur, informing the administrator of the real-time status of each line.

The script (or construction) editor, as exemplified by the open window 720 shown in FIGS. 2, 13 and 71, is a stand-alone application that allows for custom IVR scripts to be built, which operate on the IVR service. It is part of the common interface to the IVR platform(s) and can reside either on the IVR server itself or on a networked PC. It can be divided into four sections: (1) command toolbar; (2) action toolbar; (3) property display; and (4) main script.

The IVR script editor in one aspect of the present invention can include a command toolbar (not shown) as part of the GUT interface. A command toolbar could be used and consist of icons (not shown) that provide a shortcut to a menu command. The icons perform the several functions, and can also be entered through the File menu shown in FIGS. 13 and 71.

1. New Script—Clears the main script display in order to start a fresh script.
2. Open Script—Loads an existing script from the database for editing.
3. Save Script—Saves the active script. If the script has never been saved before, a Save As dialog will appear prompting you for the name of the new script.
4. Run—Executes the script in a debugging mode.
5. Stop—Stops interactive debugging.
6. Import Script—Loads a script from a text file. When a script is saved normally, it is stored in a local database along with all other scripts in the system_To transport scripts to and from other systems, they can be exported to text tiles.
7. Export Script—Writes the active script to a text file. This feature allows the administrator to back up scripts or transport them to another system.
8. Step—Executes the next action of the script in a debugging mode. This is the same as Run, but only one action at a time will be executed.
9. Pause—Pauses the execution of the script. Some actions, like PLAY, RECORD, CAPTURE, MENU (such as shown by icons in FIGS. 13 and 71), and others normally pause to await user input or to indicate the current activity. A step button is used to proceed action by action after pause or the user clicks Run to continue.

An action toolbar 720 contains tabs, as illustrated in FIG. 2, each of which contains an assortment of icons. Each of FIGS. 2, 13 and 71 show similar and different tabs, with the addition of an ACD tab, which allows entry to ACD icons and commands for ACD routing, while other tabs are used for IVR script editing. Each icon represents an action that can be placed in a script, and each tab represents a specific category of actions. The standard categories for actions for the IVR (FIG. 2) include: (1) standard; (2) advanced; (3) data access; (4) system; and (5) external.

The script editor in one aspect of the present invention includes a property display 465. The property display 465 is a versatile input and information tool. It has three modes of display: action properties, connection info and script variables. When an icon is highlighted in the script display window, the property display indicates the action properties pertaining to that icon or action.

The behavior of each action is determined by its properties and results. Properties may be entered at design time through the property display and govern things such as the voice prompt to play and the number of digits to capture. Results are the resulting condition of the action after execution and govern the next action to be executed. They are also listed in the property display with their names enclosed in parenthesis, such as the (Term Digit) of FIG. 13 on the (true) and (false) of FIG. 71. Results are often referred to as branch conditions because they determine the direction of script flow.

Each item in the property display is an individual property of the highlighted action. Each property is of three different types: read-only, string and list. A read-only property is for viewing purposes only and cannot be changed through the property display. A string property can be directly edited by clicking that property and typing_A list property provides a drop down list next to the value from which a selection can be made. When the value of a list property is double-clicked, the next item in the list is automatically chosen.

Figure 72:
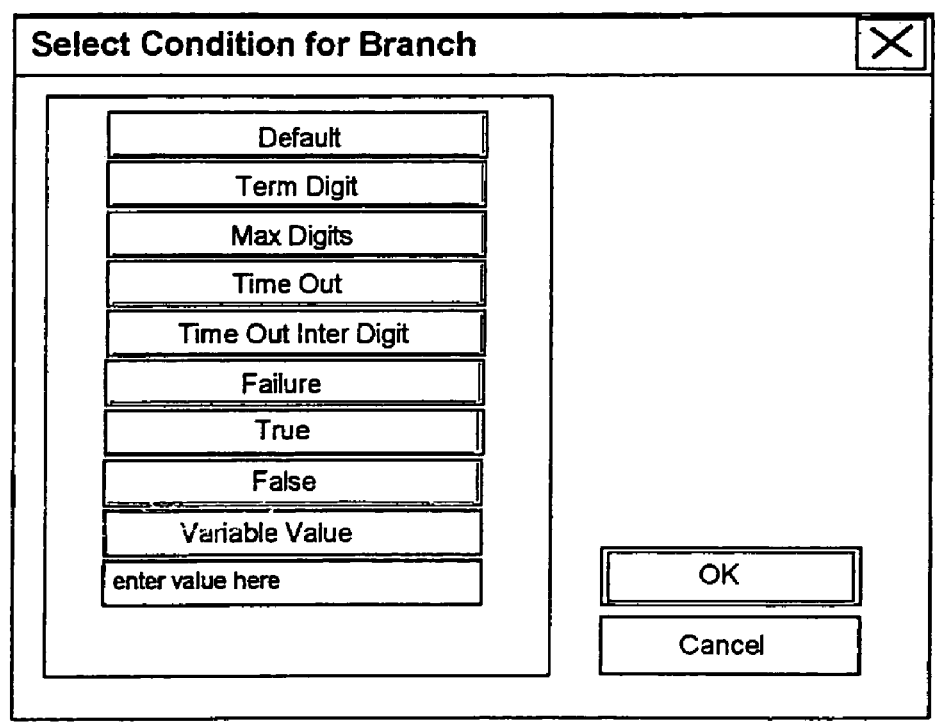
FIG. 72 shows an open window for the select condition for the branch when the case icon is selected.

Actions can be represented as icons in the script as shown in the display window 464 in each of FIGS. 2, 13 and 72. A script is made up of many actions connected together in a manner that is logical and flowing. All scripts begin with a START action 730 and end with one of the actions that terminate the script. These termination actions can include: HANGUP 732 (FIG. 13), XFER (734) and RUNAPP. Between these actions reside the body of the script.

Connection into is shown whenever a connection is clicked on. No items in the connection into may be directly modified. They include: source, destination, type and condition pertaining to the line connecting two icons. The property display may also indicate script variables when a script is running in a debug mode. In this mode, each script variable is listed with its value. Values may be changed while the script is PAUSED.

The script for construction) editor includes a main script display 464, which is the largest window in the IVR construction editor mode. Scripting is performed in this window. Scroll bars 740 on the right and bottom allow a script larger than the screen to be edited. To add an action to the script, a user clicks a respective icon in the action toolbar 720, moves the mouse to the desired location in the script display, and clicks a second time. While the icon is selected, it will appear in place of the mouse cursor while inside the script display 464. When adding consecutive actions to a script, if the previous action is appropriate, a line 742 (called a connection) will automatically be drawn between the previous icon and the newly added icon. Connections are preferably shown as black or red lines with an arrow in the middle. The arrow indicates the direction the script will flow when it reaches that point. A red line indicates the flow is from right to left, while black is from left to right.

Once several actions have been added to the script, they may be selected so their properties 465 can be edited. For example, a red box surrounding active icons indicates that they are available to be edited. A selection of icons can be cut, copied and pasted following standard Windows procedures. Commands are available in the edit menu (FIG. 71) with their appropriate short cuts. Some actions have a supplementary property sheet to simplify their configuration. Double-clicking those icons will open a custom property dialog (not shown). A user can right click any icon to open a menu of choices. The last choice is edit properties, which will only be available for certain actions.

The lines 742 connecting the icons in the script display 464, referred to as connections, can be clicked on to reveal their properties in the property display. When selected, a connection will have red dots at either end. A connection can be deleted when it is selected by pressing the delete key on the keyboard (or clicking edit-delete connection).

Although different menus could be used in the present invention, the following examples are representative of what can be used in the call center system 100 of the present invention.

File Menu

| | |
|---|---|
| New | Clears the construction area to make a new script. Before choosing New, be sure to save any changes in the currently open script or the changes will be lost. Open opens an existing script. |
| Save | Saves a script. |
| Save As | Saves a script using a new name. |
| Import/Export Close | Closes the construction editor. |

-continued

Edit Menu

| | |
|---|---|
| Undo Delete | If a tool icon has been deleted (by highlighting the icon and pressing the delete key), this menu item will undo that action. |
| Cut | Cuts a highlighted tool icon and saves a copy on the clipboard. |
| Copy | Copies a highlighted tool icon onto the clipboard. |
| Paste | Pastes a previously copied tool icon into the construction area from the clipboard. |

Window Menu

| | |
|---|---|
| Line Up Icons | Lines up icons based on the grid spacing set in set icon spacing. |
| View | Choose among the following icon views; Large icons: tool icons are larger and easier to read but take up more space. Small icons: tool icons take up less space. Useful for a large script. Report: tool icons are displayed in columns ordered according to their ID. |

Set Icon

| | |
|---|---|
| Spacing | Sets the amount of distance between icons when Line Up Icons is selected. |

In another aspect of the present invention, various tools permit the construction of scripts in accordance with the present invention. String substitution allows variables to be substituted in any field that expects a string. To invoke substitution, a user can enclose a variable name in angled brackets (e.g., <var>). An expression evaluation allows complex mathematical expressions to be evaluated in real time. Several actions expect numeric values as parameters. In these cases, an expression may be used in place of a pure number. An expression includes numbers, variables and math operators.

When any place allows the use of variables (in string substitution as well as expressions), a variable method may be used. A variable method is a function attached to a variable separated by a dot (.). For example, to reference the length of a string variable, a length method can be used: phone.length. Methods may accept parameters enclosed in square brackets ([param]). Examples include:

| | |
|---|---|
| LENGTH | Returns the variable's string length. |
| SUBSTR[st, en] | Returns a sub-string of the variable starting at character position st through en. A one refers to the first character. |
| LEFT[num] | Returns the left—most num characters of the variable. |
| RIGHT[num] | Returns the right—mast num characters of the variable. |
| INSTR[str] | Returns the character position where str is found in the variable. |

Because the IVR software interface of the present invention uses a dynamic scripting language, variables do not have a defined type. When a variable is referenced as a string, it is treated as a string. Variables which are referenced as numbers are treated as such. Any time a variable is created, two values are stored internally. One is the string value and the other is the numeric value, Numbers are all stored as extended floating point values. Therefore, any computations will maintain a high degree of precision. When a number is converted to a string, the conversion uses the minimum number of digits to represent the value. Dates and times can be stored as numbers where the data is a whole integer number representing the number of days since Dec. 31, 1999. Time is stored as a fraction of a day. A few special variable names can be reserved, such as DATE and TIME, for current data and time. Another example includes TIME STAMP, which returns the current date and time.

When an icon is added to a script, it becomes the active action. In one aspect of the invention, a colored box surrounds any active action. The properties 465 listed show three standard items. They are listed below.

| Property | Description |
| --- | --- |
| Label (750) | Label refers to the text that appears below the icon representing the action. A user chooses descriptive labels to document the scripts. As a script is executing, the label will display in any monitoring tools that are active. |
| Method (752) | Method refers to the type of action being represented. The method name is always in upper case letters. A user cannot change the method through the property editor. |
| Next Action (754) | The next action is the label of the action which follows the active one. The next action is also referred to as the default result and indicates the flow of the script under normal circumstances. Almost all actions have a default result. |

The property display 465 contains variable information depending on which action is active. Some information is directly editable through the property display, while other data is strictly read-only. While every action has its own set of properties, many actions also support a set of results. It is not mandatory that each result be assigned. An example of a result is the PLAY 756 action. This action plays a voice prompt to the caller. If the caller presses a digit on the phone pad before the prompt completes, an event is signaled called Term Digit. The result associated with that event allows a script to behave differently when that event is triggered. If it is not handled, the script will proceed following the default condition (or next action as it is listed in the property display).

In still another aspect of the present invention, there are a number of standard actions (chosen by the standard tab 760) within the action toolbar, which in one aspect of the present invention, are identified as the more commonly used actions. These actions are also typically the simplest to implement. From the standards actions toolbar, these items are incorporated into the IVR script through simple point-and-click mouse operations. Some of the icons are not illustrated in the drawing figures, but could be included in one aspect of the present invention. A brief description of each action follows:

START (730) Defines the initial entry point for an IVR script. Each script must have a START method.

| Parameters: | |
| --- | --- |
| Application Path | Optional. Specifies the directory where all the voice files reside. If left blank the default directory is . . . |
| Hook DLL Name | Optional. Specifies the name of an external dynamic link library (DLL) for use by HOOK methods. see the hook function in the advanced tools section. HOOK methods are . . . if left blank, the default DLL is . . . |

CAPTURE (75$)—Captures Dual Tone Multi-Frequency (DTMF) digits entered by the caller and stores the data in a local variable. (collects the digit value WD using DTMF tone recognition].

| Parameters: | |
| --- | --- |
| Variable | The name of the variable (file) that will store the captured DTMF digits. |
| Max Digits | Specifies the maximum number of digits to collect. |
| Terminator | Specifies a terminator digit—the digit the caller presses when finished entering the required information, including the pound key M or the star key (*). |
| Timeout | The maximum time the system will wait before proceeding. |
| Inter-Digit | |
| Timeout | The maximum time the system will wait before proceeding after at least one digit has been pressed. |
| Results: | |
| max Digits | Specifies a destination to branch to if the maximum number of digits was received. |
| Time Out | Specifies a destination to branch to if the timeout was reached. |
| Term Digit | Specifies a destination to branch to if the terminating digit was received. |
| Time Out | |
| Inter-Digit | Specifies a destination to branch to if the inter-digit timeout was reached. |
| Line Dropped | Specifies a destination to branch to if the line was dropped while capturing digits. If no action is attached to this result, the script will automatically terminate after a line drop. Otherwise, the script will continue until another voice-related action is encountered or a hang up action is reached. This feature allows any database processing or pipe messaging to proceed if the caller hangs up while capturing digits. |

SPEAR (750) (FIG. 72)

Plays sound files (.wav or .vox) or speaks characters, numbers, dates or monetary amounts.

| Parameters: | |
| --- | --- |
| Params | A list of items to play. Each item is separated with a single space. In order to recognize the various parts of the list, the following conventions must be followed:<br>Sound files include the way or vox extension.<br>Monetary amounts are prefixed with a dollar ($) character.<br>Dates are prefixed with an "at" (~) character.<br>Times are prefixed with an exclamation mark (!),<br>Regular characters are entered with no prefix. |
| Results: | |
| Term Digit | Specifies a destination to branch to if a terminating digit was pressed before the function completed. |

PLAY (755) (FIG. 13)—Plays a voice prompt or communicates information to a customer. It can include the wave files (.wav) or Dialogic T voice files (.vox). The IVR also utilizes a built-in voice processor with an assortment of pre-recorded system voice prompts to pronounce values as numbers, currency, dates and times to callers when configured to do so. [Thank you for calling, please press ONE for Sales, TWO for service, or stay on the line for further assistance . . . ].

| Parameters: | |
|---|---|
| IF (762) (FIG. 72) | Evaluates an expression and branches one direction if the result is true and another direction if the result is false. |
| Parameters: | |
| Expression | This is a mathematical expression. The expression is false if the result is zero and true if the result is any other value. The expression may contain comparison operators such as +, ~,, , >=, <=, != (not equal). Variables that contain strings may be compared with the string values by enclosing the value in double quotes (e.g., string). |
| Results: | |
| Note: | This action does not use the default action. |
| True | The destination to branch to if the result of the expression is true. |
| False | The destination. to branch to if the result of the expression is false. |

CASE (764)—Defines decision branch nodes and directs the flow of the script based on the value contained in the local variable (routes the call to the branch associated with digit value [DTMF tone] TWO (Service]). As shown in FIG. 72, conditions for a branch are selected by clicking appropriate buttons in a selection condition for branch box.

| Parameters: | |
|---|---|
| Variable | Any variable name. |
| Case | For each possible value of variable, a case parameters is shown followed by the name of the next method to branch to. To assign a new resulting action, drag the case icon and drop in on the desired method to follow. ?! dialog will prompt for the criteria for the branch. Click on variable values and enter the value in the input box. |
| Results | There are no result actions for this action. The default action will follow if none of the cases match. |

DIAL (766)—Dials digits through the phone system.

| Parameters: | |
|---|---|
| DialString | The digits to dial. Any digit available on a phone keypad may be used. An ampersand {&j issues a flash hook. |
| Results - There are no result actions for this action. | |

HANGUP (732)—Terminates the script by disconnecting the caller. Parameters—There are no parameters for this action.
Results There are no result actions for this action.

RECORD (768)—Records speech captured from the caller and also allows standard voice prompts to be recorded. Creates wav or vox file(s).

| Parameters: | |
|---|---|
| Handle | The name of the variable that will contain the recorded file handle. |
| File Type | Choose between Windows WAVE or Dialogic VOX file format. Click on the field and choose a format from the list. |
| RecordTimeOut | Specifies the maximum recording time tin seconds). When. the maximum time is reached, the recording will stop. |
| RecordBeep | Set to true to play a short beep before recording begins. Set to false to begin recording immediately. |
| TermDigits | Specifies which digits a caller may press to terminate the recording. An "at" ((c~,) sign is a wildcard meaning any digit. |
| AutoClearDigits | Digits that the caller has previously entered during the call are stored in. a buffer until a capture action is reached and can terminate a record action unexpectedly. Set this action to true to clear the buffer before recording. Set this action to false to leave the buffer intact. Specifies the maximum amount of silence time (in seconds) before the recording will terminate. Set to zero (d) to disable this function. |
| Results: | |
| Term Digit | Specifies a destination to branch to if any of the TermDigits were pressed while recording. |
| Time Out | Specifies a destination to branch to if the RecordTimeOut was reached. |
| Max Silence | Specifies a destination to branch to if the MaxSilence was reached following a period of non-silence. |
| Line Dropped | Specifies a destination to branch to if the line was dropped while recording. if no action is attached to this result, the script will automatically terminate after a line drop. otherwise, the script will continue until another voice-related action is encountered or a hang up action is reached. This feature allows any database processing or pipe messaging to proceed if the caller hangs up while recording. |

SAVEREC (icon not shown)—Follows the record action and saves a previously recorded speech to a file. The speech is saved in either MS Windows wav or Dialogic vox format.

| Parameters: | |
|---|---|
| Handle | A variable containing the recorded file handle. Destination |
| Path | The drive and directory to save the recording to. |
| New File Name | The name the file is to be saved as. Using <handle>, wav/vox will ensure a unique file name, where <handle> is the variable name used in handle (above). |
| Results: | |
| Failure | Specifies a destination to branch to if the save operation fails. One reason for failure may be because the destination path is invalid. |

SET (770) (FIG. 73.)—Assigns a value to a variable. Parameters:

| | |
|---|---|
| Variable | The name of the variable to store value in. |
| value | A string value. Results! |
| Failure | Specifies a destination to branch to if the value is not able to be assigned to the variable. |

Numerous advanced actions are available for use within TVR scripts that add a higher level of functionality to call handling capabilities of script. The following provides a brief description of several advanced actions that the construction editor can offer by clicking the advanced tab 772. Some of these icons can be used as standard icons, or other advanced icons, depending on how the call center system is set up.

XFER (734)—Transfers a caller to a new specified number by issuing a flash hook and dialing.

Note: The phone system must support flash hook transfers for this to work.

| Parameters: | |
|---|---|
| DialString | The digits that will be dialed after the flash hook. Any digit available on a phone keypad can be used. The flash hook character {&} should not be used because the flash hook is automatically part of this function. Results - There are no result actions for this action. |

MENU (774) (FIG. 13)—Combines the three actions (play, capture and case) into one to facilitate easier implementation of prompting nodes.

| Speak Params | This is the same as the parameters for the speak function. See "speak" for information. |
|---|---|
| Max Digits | Specifies the maximum number of digits to collect. |
| Terminator | Specifies a terminator digit - the digit the caller presses when finished entering the required information, including the pound key (#) or the star key (*). |
| Timeout | The maximum time the system will wait before proceeding. |
| Inter-Digit Timeout | The maximum time the system will wait before proceeding after at least one digit has been pressed. |
| Results: | |
| Max Digits | Specifies a destination to branch to if the maximum number of digits was received. |
| Time Out | Specifies a destination to branch to if the timeout was reached. |
| Term Digit | Specifies a destination to branch to if the terminating digit was received. |
| Time Out Inter-Digit | Specifies a destination to branch to if the inter-digit timeout was reached. |
| Line Dropped | Specifies a destination to branch to if the line was dropped while speaking or capturing digits. If no action is attached to this result, the script will automatically terminate after a line drop. Otherwise the script will continue until another voice-related action is encountered or a hang up action is reached. This feature allows any database processing or pipe messaging to proceed if the caller hangs up before the action is complete. |

EXPRESSION (776) (FIG. 2)—Assigns the results of an expression to a variable.

| Parameters: | |
|---|---|
| Params | The parameters should follow the format variable=expression, where variable is any variable name and expression is any mathematical expression. Boolean expressions return true as one (1) and false as zero (0). |
| Results: | There are no result actions for this action. |

RUNAPP—Executes a previously saved IVR script while terminating the exisiting IVR script.

| Parameters: | |
|---|---|
| Script Name | Enter the name of a existing script. All variables assigned in the current script are preserved so there is no need to pass parameters or variables to the new script. Results - There are no result actions for this action. |

HOOK—Calls an external DLL hook routine. The routine is a function declared and exported in the DLL specified in the start function. See start in the standard tools section. The function must follow a predetermined format shown below.

| Parameters: | |
|---|---|
| Reference Method | Choose by name to use a function name or by ordinal to use a function number. |
| Function Name | The name of a correctly exported function declared in the DLL that was entered in the start method. |
| Ordinal | The ordinal number of a correctly exported function declared in the DLL that was entered in the start method. This is unused if the reference method is set to by ordinal. |
| Param 1 | The first parameter passed to the function. |
| Param 2 | The second parameter passed to the function. |
| Return Variable | The name of a variable that will contain the return value. |
| Results: | |
| Failure | Specifies a destination to branch to if the DLL could not be loaded or the function was not found. |

MSGPIPE—Sends data to an external program via a data pipe.

| Parameters: | |
|---|---|
| Pipe Name | The name of the pipe. This can be any string of characters, but cannot contain the tilde [-] character. |
| Data Items | The number of data parameters to send. |
| DataX | Place any data to be sent to the external program. |
| Results: | |
| Failure | Specifies a destination to branch to if the data pipe service could not be connected to. |

E-MAIL—Sends an e-mail message with an optional file attachment. Parameters:

| Address | The e-mail address of the recipient. Follow standard Internet e-mail format (e.g., name@domain.com). |
|---|---|
| Subject | Enter the text to be sent as the subject of the message. |
| Attachment | Optional. Enter the filename of the attachment to be sent with the e-mail. |
| Body | Enter the body text of the e-mail message. Results: |
| Failure | Specifies a destination to branch to if the data pipe service could not be connected to. |

PAGER—Sends a message to a pager.

| Parameters: | |
|---|---|
| Service | The phone number of a TAP paging service to be dialed. |
| Pager ID | The pager identification number of the recipient. |
| Message | The content of the message. This is limited by the paging service provider of the recipient's pager. |
| Results: | |
| Failure | Specifies a destination to branch to if the data pipe service could not be connected to. |

In accordance with another aspect of the present invention, system actions are designed to provide operating system level functionality, such as copying, deleting and renaming of files, as well as providing additional tools for tracking and debugging IVR scripts. The system tab 780 shown in FIG. 2 can be clicked to bring up the icons for the actions. The following is a brief description of the system actions currently available for IVR scripts:

| | |
|---|---|
| WRITEFILE | Generates text output to a local disk file for use such as a custom log output. |
| COPY | Performs an operating system level copy of a disk file. |
| DELETE | Performs an operating system level delete of a disk file. |
| RENAME | Performs an operating system level rename of a disk file. |
| FILEEXIST | Checks for the existence of a disk file. |
| NEWFOLDER | Creates a new sub-folder or directory on the disk. |
| DUMPLOG | Records responses tracked from both MENU and CAPTURE actions. |
| DEBUG | Generates output in the debug window during interactive debugging. |

External actions can be brought up by clicking the External tab 782. These actions provide a communication link between the call center system IVR and external applications or services. The following is a brief description of external actions currently available for IVR scripts:

| | |
|---|---|
| LIVEEDIT | Enables live prompt editing. This feature enables an administrator to record or re-record a voice prompt while a script is executing. |
| HOOK | Calls a function in an external Dynamic Link Library (DLL,). |
| FA%BACK (783) (FIG. 2 window 464) | Sends a fax document to a recipient's fax number. |

The strings and files tab 784 allows various functions in accordance with the present invention. FIG. 2 shows some of these actions included under the advanced options tab 772.

SUBSTR (786) (FIG. 2)—Extracts specific characters from a string. The result is stored in a local variable.

| Parameter | |
|---|---|
| String | The string to parse. |
| Start | Starting character position in string. The first character is position one. |
| End | Ending character position in string. The first character is position one. |
| Variable | The name of a variable to store the results. Results - There are no result actions for this action. |

INSTR (788) (FIG. 2)—Looks for a string or character within another string and stores the character position in a local variable.

| Parameters: | |
|---|---|
| String | The string to scan. |
| string to rind | The string to find in string. |
| variable | If string to find is found in string, the result will be a number greater than zero, indicating the character position in string where it was found. |
| Results. | True specifies a destination to branch to if the string to find was found in string. False specifies a destination to branch to if the string to find was not found in string. |

TOKEN (790) (FIG. 2)—Extracts a token or field from a string based on a delimiter character. The resulting token is stored in a local variable along with the number of tokens identified.

| Parameters: | |
|---|---|
| String | The string to parse. |
| Delimiter | A character or string to use as the field/token separator. |
| Index | The index of the field/token to extract. The first is number one. |
| Result Var | A name of a variable to store in the extracted token. |
| Field. # Var | A name of a variable to store the total number of tokens in the string. Results - There are no result actions for this action. |

WRITEFILE—Writes a line of text to a file. It can be appended to an existing file or create a new one.

| Parameters: | |
|---|---|
| File Name | The name of a new or existing file to write to. |
| Output | A string to write to the file. A CR/LF is automatically appended. |
| Results | Failure specifies a destination to branch to if the operation fails. |
| COPY | Copies an existing file on disk to a new filename. Parameters: |
| Source File | The name of an existing file to copy. Destination File The name of a new file to be created. Results - Failure specifies a destination to branch to if the operation fails. |

DELETE—Deletes a file from disk.

| Parameters: | |
|---|---|
| File Name | The name of an existing file to be deleted. Results - Failure specifies a destination to branch to if the operation fails. |
| RENAME | Renames an existing file on disk. Parameters: |
| old File Name | The name of an existing file on disk to be renamed. |
| New File Name | The new name for the file. |
| Results | Failure specifies a destination to branch to if the operation fails. |

The graphical user interface of the present invention is also used for scripting Automatic Call Distributor (ACD) functions by clicking the ACD tab 792, such as shown in FIGS. 13 and 71.

QUEUE—Retrieves ACD queue statistics from the operating ACD server of the present invention.

| Parameters: | |
|---|---|
| Skill Set | choose between all skills or single skill. |
| Skill Number | A numeric value representing a single skill. This parameter is unused if the skill set is set at all skills. |
| Store # in Queue | Choose a variable name to store the number of calls in queue for the specified skill or all skills. |
| Store Longest in Queue | Choose a variable name to store the number of seconds the longest cal' in queue has been waiting. |
| Results: | True specifies a destination to branch to if the number of calls in queue is greater than zero. False specifies a destination to branch to if the number of calls in queue is zero. |
| CALLBACK | Sends a message to the ACD server to initiate an agent callback. |

-continued

Parameters:

| | |
|---|---|
| Phone Number | The phone number of the caller that the agent is to call. |
| Results | Failure specifies a destination to branch to if the data pipe service could not be connected to. |

The present invention also provides for an integrated voice mail option that provides features and functionality comparable to external Voice Mail Systems (VMS). The embedded nature of this type of system helps to minimize the integration efforts required to implement feature-rich functionality in. a complex call center environment. Call recording uses the same platform as the IVR. It also allows supervisors and business entities to record calls for quality monitoring, legal or security purposes. Calls can be recorded based on system-wide, random, scheduled or individual requirements_Supervisors and agents can review calls that are recorded and stored in sound file formats (_wav and .vox). This type of storage medium allows for voice compression to minimize file size, rile archives that can be saved onto disk or remotely, and files that can be distributed individually via mediums {e.g., e-mail} for review at a sound-enabled desktop PC or workstation.

This application is related to copending patent applications entitled, "CALL CENTER IVR AND ACD SCRIPTING METHOD AND GRAPHICAL USER INTERFACE," "INTEGRATED ACD AND IVR SCRIPTING FOR CALL CENTER TRACKING OF CALLS," "SYSTEM AND METHOD FOR EVALUATING AGENTS IN CALL CENTER," and "METHOD AND SYSTEM FOR COLLECTING REPORTS FOR CALL CENTER MONITORING BY SUPERVISOR," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A method of configuring the scripting of a call center that includes an interactive voice response (IVR) server and automatic call distributor (ACD) server that is a functionally integrated with the IVR server, the method comprising the steps of:
displaying as a result of user input a script editor window on a call center computer as part of a graphical user interface for the call center, the script editor window including a script display area;
providing script icons that are representative of ACD and IVR scripting actions in the script display area; and
linking the script icons based on user input in the order which represents IVR and ACD scripting within the call center.

2. A method according to claim 1, wherein the script editor window includes a property display area that lists properties of scripting actions represented by script icons.

3. A method according to claim 2, and further comprising the step of highlighting a script icon that has been provided in the script display area such that as a result of highlighting the script icon, the properties for the scripting action represented by the script icon are displayed within the script display area.

4. A method according to claim 1, and further comprising the step of beginning a script flow with a START script icon representing the start of script flow and terminating the script flow with a script icon that represents a terminating action for the script flow.

5. A method according to claim 1, wherein said script editor window further comprises a series of tabs that each can be selected for displaying a set of different script icons within the action toolbar.

6. A method of configuring the scripting of a call center that includes an interactive voice response (IVR) server and automatic call distributor (ACD) server that is functionally integrated with the IVR server, comprising the steps of:
displaying as a result of user input a script editor window on a call center computer as part of a graphical user interface for the call center, said script editor window including a script display area;
providing script icons that are representative of ACD and IVR scripting actions in the script display area; and
positioning the script icons in an order corresponding to a script flow through the call center, such that if a previous action within the script flow is appropriate, a connection line is drawn between the previous script icon and newly added script icon representing the respective actions of the script flow.

7. A method according to claim 6, and further comprising the step of indicating the direction of script flow by a different colored connection line.

8. A method according to claim 6, and further comprising the step of selecting a predetermined number of connected script icons that are displayed within the script display area, and cutting, copying and pasting the selected script icons to other portions of the script display area for completing a script flow.

9. A method according to claim 6, wherein the script editor window includes a property display area that lists properties of scripting actions represented by script icons.

10. A method according to claim 6, and further comprising the step of clicking on a connection line and displaying the properties of the connection between two connected scripting actions within a property display area of the script editor window.

11. A method according to claim 6, and further comprising the step of highlighting a script icon that has been dragged into the script display area such that as a result of highlighting the script icon, the properties of the scripting action represented by the script icon are displayed within the script display area.

12. A method according to claim 6, and further comprising the step of beginning a script flow with a START script icon representing the start of script flow and terminating the script flow with a script icon that represents a terminating action for the script flow.

13. A method according to claim 6, wherein said script editor window further comprises a series of tabs that each can be selected for displaying a set of different script icons within an action toolbar.

14. A method of configuring the scripting of a call center that includes an interactive voice response (IVR) server and automatic call distributor (ACD) server that is functionally integrated with the IVR server, the method comprising the steps of:
displaying as a result of user input a script editor window on a call center computer as part of a graphical user interface for the call center, said script editor window including a script display area;

providing script icons that are representative of ACD and IVR scripting actions in the script display area, wherein the script icons are selected from a plurality of sets of displayed script icons by user selecting an action tab representative of a selected set of script icons; and positioning the script icons in an order corresponding to a script flow through the call center, such that if a previous action within the script flow is appropriate, a connection line is drawn between the previous script icon and newly added script icon representing the respective scripting actions of the script flow.

15. A method according to claim 14, and further comprising the step of selecting a standard action tab for displaying script icons representative of at least one of (a) the start of an IVR script, (b) the capture of dual tone multi-frequency (DTMF) digits, (c) the playing of sound files, (d) the playing of voice prompts, (e) evaluating an expression and branching a call flow direction based on the evaluation, (f) the defining of branch nodes, (g) the recording of speech, (h) the terminating of a script, and (i) the dialing of digits through a phone system.

16. A method according to claim 14, claim and further comprising the step of selecting an advanced action tab for displaying script icons representative of at least one of (a) transferring a call, (b) combining actions, (c) assigning the results of an expression to a variable, (d) executing a previously saved IVR script, (e) sending an external DLL hook routing, (f) sending data to an external program via a data pipe, (g) sending an e-mail message, and (h) sending a message to a pager.

17. A method according to claim 14, wherein the script editor window includes a property display area that lists properties of scripting actions represented by script icons.

18. A method according to claim 17, and further comprising the step of highlighting a script icon that has been provided in the script display area and highlighting a selected script icon such that as a result of highlighting the script icon, the properties for the scripting action represented by the script icon are displayed within the script display area.

19. A method according to claim 14, and further comprising the step of beginning a script flow with a START script icon representing the start of script flow and terminating the script flow with a script icon that represents a terminating action for the script flow.

20. A method according to claim 14, and further comprising the step of indicating the direction of script flow by a different colored connection line.

21. A method according to claim 14, and further comprising the step of selecting a predetermined number of connected script icons that are displayed within the script display area and cutting, copying and pasting the selected script icons to other areas of the script display area for completing a script flow.

22. A method according to claim 14, wherein the script editor window includes a property display area that lists properties of scripting actions represented by script icons.

23. A method according to claim 14, and further comprising the step of selecting a connection line and displaying the properties of the connection between two connected scripting actions within a property display area of the script editor window.

24. A method according to claim 14, wherein said script editor window further comprises a series of tabs that each can be selected for displaying a set of different script icons within an action toolbar.

25. A method according to claim 14, wherein said script editor window further comprises a series of tabs that each can be selected for displaying a set of different script icons within an action toolbar.

26. A graphical user interface contained on a computer screen of a call center computer and used for configuring the scripting of a call center that includes an interactive voice response (IVR) server and an automatic call distributor (ACD) server that is functionally integrated with the IVR server, the graphical user interface comprising:

a script editor window having a script display window containing script icons that represent respective ACD and IVR scripting actions, the script icons being provided in the script display window and linked together to represent IVR and ACD script flow within the call center.

27. A graphical user interface according to claim 26, wherein said script editor window further comprises a property display area that lists properties of scripting actions representative of the script icons.

28. A graphical user interface according to claim 26, wherein said script icons that are provided in the script display window can be highlighted to display the properties for the scripting action represented by a highlighted script icon.

29. A graphical user interface according to claim 26, wherein said script display window further comprises a series of tabs that each can be selected for displaying a set of different script icons within an action toolbar.

30. A configurable call center scripting system comprising:

an interactive voice response (IVR) server, an automatic call distributor (ACD) server functionally integrated with the IVR server, and a graphical user interface performing the steps of:

displaying as a result of user input a script editor window on a call center computer as part of a graphical user interface for the call center, the script editor window including a script display area;

providing script icons that are representative of ACD and IVR scripting actions in the script display area; and linking the script icons based on user input in the order which represents IVR and ACD scripting within the call center.

31. The configurable call center scripting system comprising according to claim 30, wherein the script editor window includes a property display area that lists properties of scripting actions represented by script icons.

32. The configurable call center scripting system comprising according to claim 30, and further comprising the step of highlighting a script icon that has been provided in the script display area such that as a result of highlighting the script icon, the properties for the scripting action represented by the script icon are displayed within the script display area.

33. The configurable call center scripting system comprising according to claim 30, and further comprising the step of beginning a script flow with a START script icon representing the start of script flow and terminating the script flow with a script icon that represents a terminating action for the script flow.

34. The configurable call center scripting system comprising according to claim 30, wherein said script editor window further comprises a series of tabs that each can be selected for displaying a set of different script icons within an action toolbar.

35. A method of configuring the scripting of a call center that includes an interactive voice response (IVR) server and automatic call distributor (ACD) server that is a functionally integrated with the IVR server, the method comprising the steps of:

displaying as a result of user input a script editor window on a call center computer as part of a graphical user interface for the call center, said script editor window including a script display area;

receiving in the script display area script icons dragged from an action toolbar that are representative of ACD and IVR scripting actions; and linking the script icons based on user input in the order which represents IVR and ACD scripting within the call center.

36. A method according to claim 35, wherein the script editor window includes a property display area that lists properties of scripting actions represented by script icons.

37. A method according to claim 36, and further comprising the step of highlighting a script icon that has been dragged into the script display area such that as a result of highlighting the script icon, the properties for the scripting action represented by the script icon are displayed within the script display area.

38. A method according to claim 35, and further comprising the step of beginning a script flow with a START script icon representing the start of script flow and terminating the script flow with a script icon that represents a terminating action for the script flow.

39. A method according to claim 35, wherein said script editor window further comprises a series of tabs that each can be selected for displaying a set of different script icons within the action toolbar.

40. A method of configuring the scripting of a call center that includes an interactive voice response (IVR) server and automatic call distributor (ACD) server that is functionally integrated with the IVR server, the method comprising the steps of:

displaying as a result of user input a script editor window on a call center computer as part of a graphical user interface for the call center, said script editor window including a script display area;

receiving in the script display area script icons dragged from an action toolbar that are representative of ACD and IVR scripting actions; and positioning the script icons in an order corresponding to a script flow through the call center, such that if a previous action within the script flow is appropriate, a connection line is drawn between the previous script icon and newly added script icon representing the respective actions of the script flow.

41. A method according to claim 40, and further comprising the step of indicating the direction of script flow by a different colored connection line.

42. A method according to claim 40, and further comprising the step of selecting a predetermined, number of connected script icons that are displayed within the script display area, and cutting, copying and pasting the selected script icons to other portions of the script display area for completing a script flow.

43. A method according to claim 40, wherein the script editor window includes a property display area that lists properties of scripting actions represented by script icons.

44. A method according to claim 40, and further comprising the step of clicking on a connection line and displaying the properties of the connection between two connected scripting actions within a property display area of the script editor window.

45. A method according to claim 40, and further comprising the step of highlighting a script icon that has been dragged into the script display area such that as a result of highlighting the script icon, the properties of the scripting action represented by the script icon are displayed within the script display area.

46. A method according to claim 40, and further comprising the step of beginning a script flow with a START script icon representing the start of script flow and terminating the script flow with a script icon that represents a terminating action for the script flow.

47. A method of configuring the scripting of a call center that includes an interactive voice response (IVR) server and automatic call distributor (ACD) server that is functionally integrated with the IVR server, the method comprising the steps of:

displaying as a result of user input a script editor window on a call center computer as part of a graphical user interface for the call center, said script editor window including a script display area;

receiving in the script display area script icons dragged from an action toolbar that are representative of ACD and IVR scripting actions, wherein the script icons are selected from a plurality of sets of script icons that are displayed within the action toolbar by user selecting an action tab representative of a selected set of script icons; and positioning the script icons in an order corresponding to a script flow through the call center, such that if a previous action within the script flow is appropriate, a connection line is drawn between the previous script icon and newly added script icon representing the respective scripting actions of the script flow.

48. A method according to claim 47, and further comprising the step of selecting a standard action tab for displaying script icons representative of at least one of (a) the start of an IVR script, (b) the capture of dual tone multi-frequency (DTMF) digits, (c) the playing of sound files, (d) the playing of voice prompts, (e) evaluating an expression and branching a call flow direction based on the evaluation, (f) the defining of branch nodes, (g) the recording of speech, (h) the terminating of a script, and (i) the dialing of digits through a phone system.

49. A method according to claim 47, claim and further comprising the step of selecting an advanced action tab for displaying script icons representative of at least one of (a) transferring a call, (b) combining actions, (c) assigning the results of an expression to a variable, (d) executing a previously saved IVR script, (e) sending an external DLL hook routing, (f) sending data to an external program via a data pipe, (g) sending an e-mail message, and (h) and sending a message to a pager.

50. A method according to claim 47, wherein the script editor window includes a property display area that lists properties of scripting actions represented by script icons.

51. A method according to claim 50, and further comprising the step of highlighting a script icon that has been dragged into the script display area and highlighting a selected script icon such that as a result of highlighting the script icon, the properties for the scripting action represented by the script icon are displayed within the script display area.

52. A method according to claim 47, and further comprising the step of beginning a script flow with a START script icon representing the start of script flow and terminating the script flow with a script icon that represents a terminating action for the script flow.

53. A method according to claim 47, and further comprising the step of indicating the direction of script flow by a different colored connection line.

54. A method according to claim 47, and further comprising the step of selecting a predetermined number of connected script icons that are displayed within the script display area and cutting, copying and pasting the selected script icons to other areas of the script display area for completing a script flow.

55. A method according to claim 47, wherein the script editor window includes a property display area that lists properties of scripting actions represented by script icons.

56. A method according to claim 47, and further comprising the step of selecting a connection line and displaying the properties of the connection between two connected scripting actions within a property display area of the script editor window.

57. A graphical user interface contained on a computer screen of a call center computer and used for configuring the scripting of a call center that includes an interactive voice response (IVR) server and an automatic call distributor (ACD) server that is functionally integrated with the IVR server, the graphical user interface comprising:

a script editor window having a script display window, and an action toolbar containing script icons that represent respective ACD and IVR scripting actions, wherein the script display window receives script icons dragged and linked together to represent IVR and ACD script flow within the call center from the action toolbar.

58. A graphical user interface according to claim 57, wherein said script editor window further comprises a property display area that lists properties of scripting actions representative of the script icons.

59. A graphical user interface according to claim 57, wherein said script icons that are dragged into the script display window can be highlighted to display the properties for the scripting action represented by a highlighted script icon.

60. A graphical user interface according to claim 57, wherein said script display window further comprises a series of tabs that each can be selected for displaying a set of different script icons within the action toolbar.

* * * * *